(12) United States Patent
Zimmer

(10) Patent No.: US 8,417,755 B1
(45) Date of Patent: Apr. 9, 2013

(54) SYSTEMS AND METHODS FOR REDUCING MEMORY TRAFFIC AND POWER CONSUMPTION IN A PROCESSING ENVIRONMENT BY SOLVING A SYSTEM OF LINEAR EQUATIONS

(76) Inventor: Michael F. Zimmer, Niles, IL (US)

( * ) Notice: Subject to any disclaimer, the term of this patent is extended or adjusted under 35 U.S.C. 154(b) by 956 days.

(21) Appl. No.: 12/474,175

(22) Filed: May 28, 2009

Related U.S. Application Data

(60) Provisional application No. 61/056,759, filed on May 28, 2008.

(51) Int. Cl.
*G06F 17/14* (2006.01)
*G06F 1/02* (2006.01)

(52) U.S. Cl. .................. 708/446; 708/500; 708/607

(58) Field of Classification Search .............. 708/446, 708/500, 607
See application file for complete search history.

(56) References Cited

U.S. PATENT DOCUMENTS

| | | | |
|---|---|---|---|
| 4,580,229 A | 4/1986 | Koyama et al. | |
| 5,136,538 A * | 8/1992 | Karmarkar et al. | 708/607 |
| 5,301,342 A | 4/1994 | Scott | |
| 5,392,429 A | 2/1995 | Agrawal et al. | |
| 5,490,278 A | 2/1996 | Mochizuki | |
| 5,887,186 A | 3/1999 | Nakanishi | |
| 6,078,938 A * | 6/2000 | Pan et al. | 708/500 |
| 6,081,754 A | 6/2000 | Schlemmer | |
| 6,694,343 B2 | 2/2004 | Forrest et al. | |
| 6,826,585 B2 | 11/2004 | Mitsunaga et al. | |
| 6,907,513 B2 | 6/2005 | Nakanishi | |
| 6,950,844 B2 * | 9/2005 | Walster et al. | 708/446 |
| 7,089,275 B2 | 8/2006 | Garg | |
| 7,236,998 B2 | 6/2007 | Nutter et al. | |
| 7,451,173 B1 | 11/2008 | Van Benthem et al. | |
| 7,483,937 B2 | 1/2009 | Nakanishi | |
| 8,204,925 B2 * | 6/2012 | Vrancic et al. | 708/446 |

OTHER PUBLICATIONS

V.N. Faddeeva, Computational Methods of Linear Algebra, Dover Publications, New York, 1959, pp. 90-95, 105-109, 111-115.
L. Fox, An Introduction to Numerical Linear Algebra, With Exercises, Oxford University Press, New York, 1965, pp. 75-77.
O.H. Ibarra, S. Moran and R. Hui, A generalization of the fast LUP matrix decomposition algorithm and applications, Journal of Algorithms, 3, pp. 45-56 (1982), cf. pp. 45-52.
D.S. Watkins, Fundamentals of Matrix Computations, John Wiley & Sons, New York, 1991, pp. 43-45, 48-69, 167-182, 390-398.
V. Kumar, A. Grama, A. Gupta and G. Karypis, Introduction to Parallel Computing—Design and Analysis of Algorithms, Benjamin/Cummings, New York, 1994, pp. 1-9, 15-29.
R.F. Stengel, Optimal control and estimation, Dover Publications, New York, 1994, pp. 49-56.

(Continued)

*Primary Examiner* — Tammara Peyton
(74) *Attorney, Agent, or Firm* — McAndrews, Held & Malloy, Ltd.

(57) ABSTRACT

A system and methods for reducing memory traffic and power consumption when solving systems of linear equations. Certain embodiments provide several aspects for improved performance in solving a consistent system of linear equations and in computing a generalized inverse. One aspect involves performing row transformations on AX=B, so that the transformed A contains row vectors that are either zero or are part of an orthonormal set. Another aspect involves performing column transformations on A, so that A contains column vectors that are either zero or are part of an orthonormal set. Another aspect involves performing row eliminations differently so that a variation of an LU factorization is obtained that is in a more directly useful form.

21 Claims, 42 Drawing Sheets

ROP_1

OTHER PUBLICATIONS

J.J. Dongarra, I.S. Duff, D.C. Sorensen and H.A. van der Vorst, Numerical Linear Algebra for High-Performance Computers, SIAM Press, Philadelphia, 1998, pp. xvii-26, 31-38, 71-80, 107-112.

R.B. Bapat, Linear Algebra and Linear Models, 2nd ed., Springer, 2000, pp. 29-33.

O.C. Zienkiewicz and R.L. Taylor, The Finite Element Method, 5th ed.; vol. 1: The Basics, Butterworth and Heinemann, Oxford, 2000, pp. 8-10, 14.

C.S.R. Murthy, K.N.B. Murthy and S. Aluru, New Parallel Algorithms for Direct Solution of Linear Equations, Wiley, 2000, pp. 1-5, 24-32.

D. Carlson, C.R. Johnson, D.C. Lay, and A.D. Porter, eds., Linear Algebra Gems, Mathematical Association of America, 2002, pp. 5-7.

S. Russell and P. Norvig, Artificial Intelligence, a Modern Approach, 2nd ed., Pearson Education, 2003, pp. 631-640.

W. H. Steeb, Mathematical Tools in Signal Processing with C++ & Java Simulations, World Scientific, 2003, pp. 149, 160-163.

S.R. Buss, Introduction to Inverse Kinematics with Jacobian Transpose, Pseudoinverse and Damped Least Squares Methods, http://math.ucsd.edu/~sbuss/ResearchWeb/ikmethods/iksurveypdf, Apr. 17, 2004.

J.W Demmel, http://www.cs.berkeley.edu/~demmel/cs267_Spr05/Lectures/Lecture09/lecture_09_DenseLA_2_jd05.ppt slides 28, 59, Feb. 16, 2005.

H. Sutter, The Free Lunch is Over: A Fundamental Turn Toward Concurrency in Software, Dr. Dobb's Journal, 30(3), pp. 16-22 (2005); currently cited at http://www.gotw.ca/publications/concurrency-ddj.htm.

C.P. Jeanerrod, LSP matrix decomposition revisited, Research report No. 2006-28, http://www.ens-lyon.fr/LIP/Pub/Rapports/RR/RR2006/RR2006-28.pdf, pp. 2-4.

Numerical Recipes, The Art of Scientific Computing, 3rd ed., W.H. Press, S.A. Teukolsky, W.T. Vetterling, and B.P. Flannery, Cambridge University Press, 2007, pp. 46-54, 102-105, 526-535.

Algorithm—Expressing algorithms, http://en.wikipedia.org/wiki/Algorithm#Expressing_algorithms, 2009.

Markov chain, http://en.wikipedia.org/wiki/Markov_chain, 2009.

\* cited by examiner

ROP_1                FIG - 1

SYSTEMS AND METHODS FOR REDUCING MEMORY TRAFFIC AND POWER CONSUMPTION IN A PROCESSING ENVIRONMENT BY SOLVING A SYSTEM OF LINEAR EQUATIONS

RELATED APPLICATIONS

This application claims priority to U.S. Provisional Application Ser. No. 61/056,759, filed May 28, 2008. The content of U.S. Provisional Application Ser. No. 61/056,759 is hereby incorporated by reference in its entirety.

FIELD OF THE INVENTION

This invention pertains generally to the fields of computation and linear algebra, and more specifically to the efficient processing of systems of linear equations.

BACKGROUND

A system of linear equations is defined as $$a_{11}x_1 + \ldots + a_{1n}x_n = b_1$$
$$\ldots$$
$$a_{m1}x_1 + \ldots + a_{mn}x_n = b_m.$$

where (letting $j=1, \ldots, n$ and $i=1, \ldots, m$) the unknowns $x_j$ are solved in terms of the numbers $a_{ij}$ and $b_j$. These equations may be more compactly written as the matrix equation $Ax=b$ upon defining $$A = \begin{bmatrix} a_{11} & \ldots & a_{1n} \\ \ldots & \ldots & \ldots \\ a_{m1} & \ldots & a_{mn} \end{bmatrix}, x = \begin{pmatrix} x_1 \\ \ldots \\ x_n \end{pmatrix}, b = \begin{pmatrix} b_1 \\ \ldots \\ b_m \end{pmatrix}.$$

Note that the coefficient matrix A is m-by-n, x is an n-dimensional vector, and b is an m-dimensional vector. For purposes of illustration through the present application, the sizes of A, x and b will be fixed as they are here defined. No assumptions are made regarding the structure of the matrix; it may be dense, sparse, symmetric, etc.

In some cases one needs to solve $Ax=b$ for multiple b using the same A. This is equivalent to solving the matrix equation $AX=B$, where X and B are now non-vector matrices. When there are p instances of b, they become the p columns in the m×p matrix B; X is n×p; and A is still m×n. Also, note that $Ax=b$ may be thought of as a special case (p=1) of $AX=B$, and $AX=B$ may be thought of as $Ax=b$ repeated p times (with the same A).

The entries in A, b, and x may be real numbers, complex numbers, or a member of some other number field. In addition, some or all of the entries in these quantities may be left in variable form. Symbolic manipulation programs are able to compute with them in these cases. However, for purposes of clarity in the examples to follow it will be assumed that all numbers and variables belong to the complex number field.

An algorithm is also known as a method, a procedure, or a technique. It consists of a list of steps, conditions, manipulations, etc., that detail what should be done to take some input and produce the desired output. Following Sipser, the algorithms will be described at multiple levels (in this case, a "high" level and an "implementation" level). Also, it is pointed out that an algorithm can have seemingly unequivalent implementations, even though they represent the same computation.

Solving a system of linear equations is a relatively basic mathematical operation and so appears in applications across a multitude of quantitative fields. These fields include, but are not limited to: all branches of engineering (civil, mechanical, electrical, aeronautical, etc); applied areas of the sciences (physics, chemistry, biology, etc); applied and computational mathematics, control and estimation problems, medicine, economics, business, sociology, politics, and a number of technologies and industries, etc. Part of the reason for the ubiquitous presence of these linear algebra techniques is that they are used within other numerical techniques, which themselves have many applications. For example, they play a fundamental role in linear programming, Markov processes, the finite element method, control theory, etc. These applications will now be discussed.

Linear Programming

The field of linear programming (LP) is concerned with (linearly) optimizing allocations of limited resources to meet given objectives. It is used in the fields of operations research, microeconomics, transportation, business management, network flows, multi-commodity flows, resource management (in operations research), and other fields. Particular examples include food blending, inventory management, portfolio and finance management, resource allocation for human and machine resources, planning advertisement campaigns, etc. An LP problem may be formulated as finding x such that $Ax=b$, $x \geq 0$, and $c^T x$ is maximized (c is an n-dimensional vector). Constraints that are expressed as $Ax \leq b$ can be rewritten as $Ax=b$ by appropriately increasing the dimension of x. An example application is an activity-analysis problem, which might involve a manufacturing company that converts a set of resources (such as raw material, labor, equipment) into a number of commodities; the company's goal is to produce that combination of commodities which will maximize its profit. Let A, b, and x be as defined earlier. In relation to the formulation given above: m is the number of resources; n is the number of commodities; $a_{ij}$ is the amount of resource i required to produce one unit of commodity j; $b_i$ is the available amount of resource i; $c_j$ is the profit per unit of commodity j; and $x_j$ is the amount of the j-th commodity.

LP may be interpreted as a certain problem in game theory—a two person, zero-sum game with mixed strategies. In general, game theory relates to games of strategy, in which the participants have a conflict of interests; it is commonly applied to economic, social, political, and military situations. In this context, the participants are referred to as "players"; the first player here is named player-1. The probability player-1 will use strategy j is $x_j$; A is now the payoff matrix. The expected payoff to player-1 if he uses strategy i is $\Sigma_j a_{ij} x_j$, which is expected to be less than some number M. Also, player-1 tries to maximize M while the second player tries to minimize it.

Markov Chains

Markov chains (MCs) are a formulation of a system in which the states of the system and transitions between them are expressed probabilistically. MCs are formulated using the matrix equation $Tx=x'$, where $x(x')$ is the original (new) state vector and T the transition matrix. Thus $x_i$ is the probability to be in state i, and the probability to go from state j to i is the (i, j)-th entry in T. After many updates of x, the system may reach an equilibrium, which is characterized by $Tx=x$. This is equivalent to $Ax=b$ upon defining $A=T-I$ and $b=0$. In this case one is interested in the homogeneous solution $x_h$. Also, one might in some cases be interested in the fundamental matrix, which involves the computation of an inverse (which is a by-product of some of the algorithms being introduced). Applications of this technique are widespread, including the fields of internet search engines, biological modeling, psychology and genetics, and a number of other fields. When applied to search engines, $x_i$ represents the probability the user (of the search engine) is at web site i. The probability that he will then go to web site j is represented by the (j, i)-th entry of T.

Finite Element Method

The finite element method (FEM) is used for finding numerically stable, approximate solutions of integral and partial differential equations. It is especially useful over complex domains. Common applications include structural engineering, the airflow around cars, the flow in oil pipelines, stresses in physical bodies, and magnetostatic configurations. After choosing a mesh and a parameterization (u) for the function of interest, one generically obtains a system of linear equations– Lu=Mf, and solves for u. For example, the vector u might refer to the nodes of a triangulated surface. The matrices L and M are referred to as the stiffness and mass matrices, respectively. The relation of this matrix equation to Ax=b is manifest.

Control Theory

Control theory deals with controlling a dynamic system and estimating its behavior, all in the presence of uncertainty. It has been applied to a great many fields, including engineering, science, economics, sociology, and politics. Some example applications include trajectory control for vehicles and robots, process control, decision making strategies for economic and social systems, certain stochastic decision systems in artificial intelligence, etc. A simplified model that nevertheless captures the spirit of some of these applications begins with the equation y=f(x), where the output vector y is a function (f) of the input vector x. After linearizing about a stable point, this takes the form y=Ax. The goal could be to find the input vector x such that a certain output vector y is followed. For example, given the target trajectory of a vehicle (y), determine the appropriate set of inputs (x). Mathematically, this involves the inversion of the matrix A, and if A is singular it involves the generalized inverse of A. This type of situation could be handled by some of the new algorithms introduced herein.

Other Applications

Other applications include those where sparse matrices arise. Specialized methods exist for solving these, but they at some point require the solution of Ax=b for dense A. Sparse matrices commonly arise in the solution of integral and differential equations, which is known to occur throughout engineering and applied sciences. Another application is within linear predictive coding, where it is used to help fit sampled speech to a model of the vocal tract, for example. Finally, other assorted applications include Leontief economic models, data fitting, least-squares analysis, tomography, interpolation, computer simulations, scientific software packages, etc.

What is common to many of these applications is that a solution is needed as quickly as possible for as large a system as possible. The reason for this is that many of these applications are models or simulations of some real physical system. To represent such a system more accurately, smaller grid-sizes must be used, which means a larger matrix equation to solve. For example, halving the grid-size in a 3-dimensional simulation leads to an eight-fold increase in the number of unknowns.

To meet this need, computers have been made faster mainly by increasing the frequency of the central processor and by changing the architecture. This approach has been successful, but has basically reached an end. The reason for this is that increasing the frequency also increases the power consumption, which increases the temperature of the processor and the likelihood for failure.

Parallel Computing

In discussing the efficacy of certain computational systems and methods, it is necessary first to classify the types of computers available. To begin with, the traditional computer operates through sequential execution of a single instruction stream. This results in data movement from memory to functional unit and back again. In more detail these steps are:

fetching and decoding a scalar instruction;
calculating addresses of the data operands to be used;
fetching operands from memory;
performing the calculation in the functional unit; and
writing the resultant operand back to memory In contrast to the sequential execution computer is a parallel execution computer. A parallel computer can be understood as a set of processes that can work together to solve a computational problem.

There are many varieties of parallel computers. Even with a single processor, there are many architectures that can be used to allow concurrent execution, including redundant functional units, pipelining, multiple pipelines, overlapping, RISC (superscalar processor), very long instruction word (VLIW) architectures, vector instructions, chaining, memory-to-memory and register-to-register organizations, register set (vector registers), stripmining, reconfigurable vector registers, various memory organizations (e.g., hierarchical), instruction-level parallelism, and others. Throughout this application, a single processor may be referred to as a "processor module," or simply a "processor."

When dealing with multiple processors/processor modules, two of the four Flynn architectures should be mentioned. First, there is SIMD (single instruction stream/multiple data stream), which has multiple processors and parallel memory modules managed by a single control unit. These are also referred to as array processors, of which vector processors are a subclass. In the MIMD (multiple instruction stream/multiple data stream) classification, processors are connected to memory modules via a network. MIMD machines can be further classified according to how the memory modules are organized (i.e., shared or distributed). By comparison, the traditional, sequential execution computer is classified as SISD (single instruction stream/single data stream).

Finally, there are a number of other computers which are hybrids according to the previous classifications. Moreover, memory can be local or global, or a combination of the two. Throughout this application, a single integrated memory unit may be referred to as a "memory module," or simply as a "memory." Note that computers can be named differently, while still being a "parallel computer"—examples of this are multi-core, many-core, supercomputers, mini-supercomputers, vector mainframes, novel parallel processors, multiprocessor with a vector processing chipset, etc.

Other aspects of parallel computers not discussed herein are treatments of the address space, communication and connection topologies.

Efficient Computing

During a typical computation on a computer, data flows into and out of registers, and from registers into and out of functional units (e.g. arithmetical logic units), which perform given instructions on the data. This leads to the situation where, especially on hierarchical memory machines, the performance of algorithms is as much determined by the cost of memory traffic as by the cost of arithmetical operations. As a consequence, the strategy has emerged of trying to make maximal use of the data while it is in the registers, before transferring it back to memory.

When a computational problem can be (naturally) cast as operations between matrices, reusing data becomes especially feasible. In that case one or more matrices are partitioned into blocks, and the operations on the original matrices are instead performed on the blocks. This allows parallel computation at two levels (the block level, and within each block). Thus, if a computational problem can be in large part cast as operations between matrices, this blocking technique can be used and the organization of memory can be exploited. This is best done with algorithms that are naturally formulated in terms of matrices (such as those discussed in this application)—otherwise, too much time is lost in rewriting the problem to appear as a matrix computation. For this reason, the new systems and methods introduced herein are ideally suited for more efficient computation on parallel computers.

The efficiency of computations is directly related to another significant issue: heat production. To illustrate the problem, a single query on the Google search engine can require computations that consume 1000 Joules of energy. This is equivalent to a production of 0.2 grams of the greenhouse gas $CO_2$. On the processor level, excessive heat generation has been the root cause of the decline of the use of "frequency scaling" as a means of increasing a CPU's performance. It has been cited as a reason for using computers with a parallel architecture. On the system level, computers are now being manufactured with water-cooling to counter heat generation.

As stated earlier, certain methods are better suited for certain machines (e.g., matrix-based methods for parallel computers). Depending on the method that is used on a given machine, the machine may operate more or less efficiently—as a result it may require varying amounts of energy to operate, and produce different levels of greenhouse gases. Consequently, efficient methods (such as those that have been introduced herein) may be described as means for reducing energy consumption and environmental impact while solving a given task on a given computer.

Vector and Matrix Operations and Solutions

Computing numerical linear algebra on parallel computing devices is made easier by standards such as the Basic Linear Algebra Subprograms (BLAS), which has become the de facto Application Program Interface (API) for libraries that perform basic vector and matrix operations. BLAS is characterized by three levels: level-1 is for certain basic vector operations; level-2 for certain vector and matrix operations; and level-3 for certain basic matrix operations. Normally, higher levels of BLAS run more efficiently. This is due in part to a rewriting of matrix multiplication that can take advantage of a parallel execution.

Many vendors have produced highly optimized implementations of this standard on their machines, and the industry-wide emphasis has been to write programs in terms of BLAS calls. For example, the software library LAPACK uses BLAS, and is used on modern cache-based architectures. BLAS, which is for shared memory systems, has been extended to a parallel version PBLAS, which is meant for distributed memory systems. PBLAS is implemented in ScaLAPACK, for example. Given this situation, the level of description of the flowcharts for the new algorithm will be in terms of vector and matrix operations. Finally, it should be emphasized that researchers in the field of numerical linear algebra have lamented that there is an unfilled need for algorithms that show more parallelizability. To date, the algorithms in high use are basically the original serial algorithms adapted for parallel computing. Because the industry has reached a point where new, versatile algorithms for numerical linear algebra are clearly needed, it becomes necessary to develop all promising candidates.

A solution to Ax=b is defined as the determination of x (and/or related quantities) given A and b. Also, the problem can be cast into the form Ax=b, even though it may initially appear differently; examples include $b^T=x^TA$; Ax=x; and x=Ax+b. In these examples and in others, it is possible to rewrite the equations in the form Ax=b.

When the equations in Ax=b are consistent, the solution (x) exists and may be generally expressed as the sum of two terms: $x=x_p+x_h$, where $x_p$ is the particular solution (satisfying $Ax_p=b$), and $x_h$ is the homogeneous solution (satisfying $Ax_h=0$). Likewise, when AX=B is being solved, X, $X_p$, and $X_h$ take the place of x, $x_p$ and $x_h$. In the case when A is invertible, the solution is unique and equals $x=A^{-1}b$. When A is not invertible, a generalized inverse G may be computed to play an analogous role to the inverse (i.e., the particular solution may be expressed as $x_p=Gb$). In this case, the homogeneous solution may be expressed as $x_h=Py$, where P is the null space projection operator and y is an arbitrary n-dimensional vector.

The above discussion points out that a solution is made up of the features $x_p$, $x_h$, G, and P, and possibly other related quantities as well. Thus, when a practitioner in the field is seeking a solution, he or she in fact may only be interested in some subset of all possible features. This subset will hereafter be referred to as the "feature set", and in the next section it will be specified by the user near the beginning of an algorithm (when relevant) to define the objective of the algorithm.

Today, algorithms that solve linear systems of equations may be usefully classified as either iterative or direct (although there are some with features of both). The distinguishing characteristic of iterative algorithms is that they gradually converge on a solution after beginning from some starting condition. Direct methods, on the other hand, provide an answer in an estimable number of steps. Depending on the application, direct or iterative may be preferred. For example, when there is sufficient memory, and solutions for multiple b and dense A are sought, direct methods are generally preferred. However, when the matrix A is sparse, or too large for memory, then iterative methods are normally preferred. However, note that direct methods are often used at some point in the solution of a sparse system. Because certain embodiments introduce a new direct method for dense A, it is the existing set of direct methods (for dense A) that are of interest here.

Traditionally, software has been executed on uniprocessor machines, in which the instructions are executed sequentially. In that setting it was enough to judge them based on the number of flops (floating point operations) used, their stability, and their memory usage (and perhaps secondary criteria such as portability, simplicity, flexibility, etc). However, these metrics are no longer good predictors of performance on modern machines. As discussed above, today's high performance machines often employ vector processors, distributed and hierarchical memory, as well as a number of different connection topologies, and the individual steps of the algorithm must now be re-organized, as much as possible, to be done in parallel and with a minimum of data movement and communication. Thus algorithms are better evaluated in terms of their parallelizability. This may be estimated by metrics such as the speedup, efficiency, isoefficiency, and scalability, as well as "strong" and "weak" scaling. Finally, given that many parallel programs are written in terms of vector and matrix operations (e.g., using BLAS), it becomes reasonable to estimate the performance of an algorithm (in part) by the degree to which it can be naturally cast in terms of matrix and vector operations.

There exist a number of algorithms which provide a direct solution to Ax=b. Judging by their appearance in well-known software libraries (e.g., LAPACK, PLAPACK, and ScaLAPACK), the LU and QR methods are the most useful. There are a number of other methods, and they will now be reviewed. Of note is that many of them (including LU and QR) require a solution by back-substitution, which is not an intrinsically matrix/vector operation. It has however been cast as a BLAS call (because of its high use), although it has only limited parallelism.

The LU method is based on a matrix decomposition of the form A=PLU, which expresses A as a product of a permutation matrix P, a lower triangular (L), and an upper triangular (U) matrix. Once the decomposition is formed, it can be substituted into Ax=b, and x can be found by solving two sets of triangular equations (for y in $Ly=P^T b$, and then for x in $Ux=y$). The LU method with partial pivoting (e.g., with the use of P as shown above) normally leads to a stable computation. However, this is not provably the case, and examples exist in which the method produces an incorrect result. The LU method seems to have remained in use because of its low flop count and traditional use. The LU algorithm is implemented in a variety of ways: sequentially, in parallel, as right- and left-looking algorithms, and with the Crout and Doolittle algorithms, for example. Algorithms closely related to LU are the Gaussian elimination (GE) and Gauss-Jordan (GJ) methods. The LU is preferred over GE since LU can reuse some of its computations when solving Ax=b for multiple b. Also, LU is preferred over GJ since LU has a lower floating point operation ("flop") count.

Another oft-used algorithm is the QR method, which employs the factorization A=QR, where Q has orthonormal columns and R is upper triangular. The factorization is used to rewrite Ax=b as $Rx=Q^T b$, which is a triangular system of equations that can be solved by substitution. There are other versions of the QR algorithm (e.g., the RQ, QL, and LQ algorithms), which also lead to a triangular system of equations. The factorization is derived by applying a method such as the Gram-Schmidt orthogonalization procedure, Householder reflections, or Givens rotations. There are multiple versions of each of these as well as parallel implementations. Note that when a solution is sought for multiple b, then a system of triangular equations must be solved for each b. Also, when A is not of full rank, then column permutations are normally used. In this situation, other orthogonal factorizations may be used, such as the WZ, UTV or SVD methods; they are relatively slower.

Other methods include Cramer's rule, and the use of the matrix inverse. Both however use a determinant, which involves a much greater number of computations, as well as an increased likelihood for over/underflow. Neither is normally used for large computations. Other methods which are known but not widely used (for varying reasons) include: the Faddeeva algorithm, the quadrant interlocking factorization, the modified parallel Cramer's rule, the (parallelized) bi-directional methods, and a method based on *-semirings. There are numerous other less well-known algorithms that exist but for various reasons are not preferred.

The most straightforward computations of a generalized inverse proceed from a partitioned or factorized matrix (e.g., with QR, LU, or the singular value decomposition). There are a number of other approaches that are based on partitioned matrices. Generalized inverses are classified according to which of the four Penrose conditions they satisfy. The conditions involve the matrix A and its generalized inverse G:

| (1) | $AGA = A$ |
| (2) | $GAG = G$ |
| (3) | $AG = (AG)^*$ |
| (4) | $GA = (GA)^*$ | where the superscript * indicates the transpose of the complex conjugate. Following convention, a generalized inverse that satisfies, for example, the 1st, 2nd, and 4th condition will be referred to as a {124}-inverse. Different generalized inverses have different properties, making some preferred over others, depending on the application. For example, a {14}-inverse will produce a solution with a minimal norm, and a {13}-inverse will lead to a least-squares solution. Note that {124}-inverses are a type of {14}-inverse, and {123}-inverses are a type of {13}-inverse. Finally, there does not appear to be a simple, direct means of computing a generalized inverse of type {124} or {123}.

BRIEF SUMMARY OF THE INVENTION

Certain embodiments of the present invention provide a system for reducing memory traffic and power consumption in a processing environment by efficiently solving a consistent set of linear equations represented by AX=B. The system comprises one or more memory modules and one or more processor modules. The one or more memory modules store the matrices A and B. The one or more processor modules perform one of (i) transforming the rows of augmented matrix [A|B] to form [A'|B'], such that the rows of A' are zero, effectively zero, or part of an orthonormal set, (ii) transforming the rows of augmented matrix [A|$I_m$] to form [A'|M], such that the rows of A' are zero, effectively zero, or part of an orthonormal set, and (iii) transforming the rows of augmented matrix [A|B|$I_m$] to form [A'|B'|M], such that the rows of A' are zero, effectively zero, or part of an orthonormal set. The one or more processor modules also form one or more solution features, including at least one of (i) a generalized inverse G formed as (A')*M, (ii) a particular solution formed as (A')*B', (A')*MB or GB, and (iii) a null space projection operator formed as $I_n - (A')^* A'$ or $I_n - GA$.

Certain embodiments of the present invention provide a system for reducing memory traffic and power consumption in a processing environment by efficiently solving a set of linear equations represented by AX=B with an auxiliary matrix M initialized as $I_n$. The system comprises one or more memory modules and one or more processor modules. The one or more memory modules store the matrices A, B and M. The one or more processor modules transform the columns of A and M to effectively form $A'M^{-1}X=B$, such that the columns of A' are zero, effectively zero, or part of an orthonormal set. The one or more processor modules also form one or more solution features, including at least one of (i) a generalized inverse G formed as M(A')*, (ii) a particular solution formed as GB or M(A')*B, and (iii) a null space projection operator formed as $I_n - GA$ or $I_n - M(A')^* A$.

Certain embodiments of the present invention provide a system for reducing memory traffic and power consumption in a processing environment by efficiently solving a consistent set of linear equations represented by AX=B with an auxiliary matrix M initialized as $I_m$. The system comprises one or more memory modules and one or more processor modules. The one or more memory modules store the matrices A, B and M. The one or more processor modules transform the rows of A and M to form A'X=MB, such that M reduces A to row echelon form, and form a solution by computing a matrix C=MB and solving A'X=C.

Figure 1:
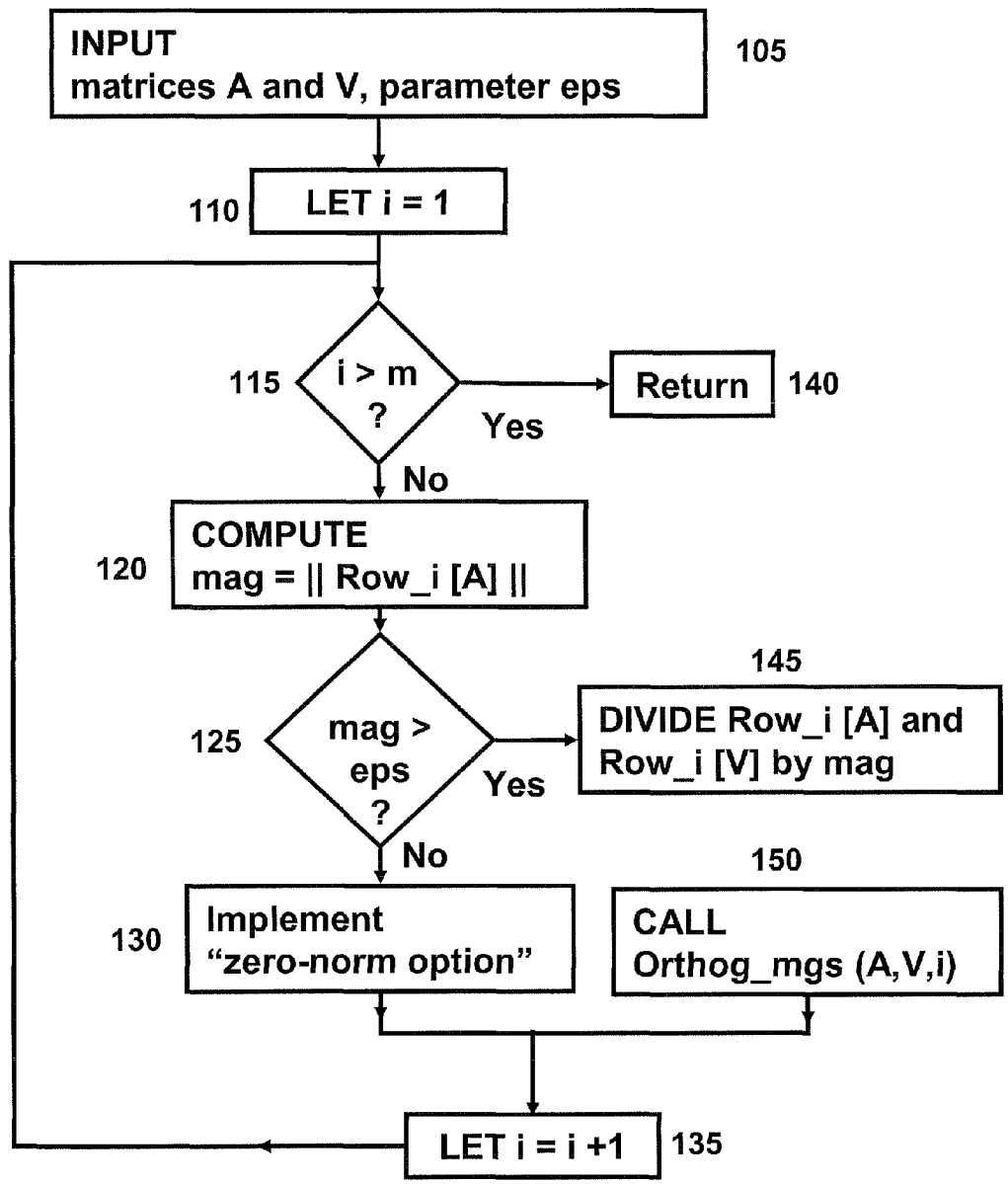
FIG. 1 illustrates a row orthonormalization procedure ("ROP") based on a (modified) Gram-Schmidt procedure altered to accept an auxiliary matrix V and a parameter eps, as well as implement a "zero-norm option" in accordance with an embodiment of the present invention.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentality shown in the attached drawings.

DETAILED DESCRIPTION OF THE INVENTION

Certain embodiments provide an algorithm and variants which offer increased performance in directly solving consistent systems of linear equations and in computing a generalized inverse. Methods and systems are described for more efficiently computing solutions to linear systems of equations and generalized inverses. The algorithms are based on manipulations of the row and/or column vectors of the coefficient matrix. Unlike the most common algorithms in use today, the linear solver does not need to solve a triangular system of linear equations. The algorithm is most naturally expressed in terms of operations involving vectors and matrices, which should facilitate its use on high performance parallel and vector computers.

Embodiments of this class of algorithms contain other desirable features, such as implementations that easily run in parallel or in an online mode. Additionally, certain implementations are capable of reusing much of the computation when solving for different linear systems with the same coefficient matrix. Finally, in some implementations, the generalized inverse is a natural result of other computations.

The notation that is used herein has similarities to modern computer programming languages; it is noteworthy, however, that herein indices begin with 1 rather than 0. If V represents a matrix then will be the element in the i-th row and j-th column. Likewise, $w_i$ represents the i-th entry of the vector w. Following Cullen and using the matrix A defined in the background section, the i-th row of the matrix A will be referred to as $$Row_i[A] = (a_{i1}, \ldots, a_{in})$$

and the j-th column of A as $$Col_j[A] = \begin{pmatrix} a_{1j} \\ \ldots \\ a_{mj} \end{pmatrix}$$

Observe that $Row_i[A]$ is a 1×n matrix, and $Col_j[A]$ is an m×1 matrix. Assume entries in A, x and b belong to the complex number field. In this number field, the inner product of two n-dimensional vectors v and w is defined as $$<v, w> = w^*v = \sum_{i=1}^{n} \tilde{w}_i v_i$$

where the overbar denotes complex conjugation. These vectors may be row or column vectors. The magnitude of a vector v is defined via the Euclidean (or $l_2$) norm, $\|v\|$, which equals $$\sqrt{\langle v, v \rangle}.$$

As used herein, a matrix designated as a capital letter (e.g. "B") can be of any size, including a 1×p or m×1 vector, unless the surrounding context clearly would limit its size in some way. However, a matrix designated as a lower-case letter (e.g. "b") is understood to be a vector.

Row Orthonormalization Procedures

The algorithm to be described may be used to solve a system of linear equations AX=B for X, as well as compute the generalized inverse of A. The exact nature of the solution will be clarified later. The algorithm makes heavy use of row operations on A, which can be realized by multiplication on the left by a product of suitable matrices. Note the matrices $M_k$ need not be elementary matrices. In practice, one does not normally explicitly form these matrices, but rather directly implements the row operations on A.

Figure 2:
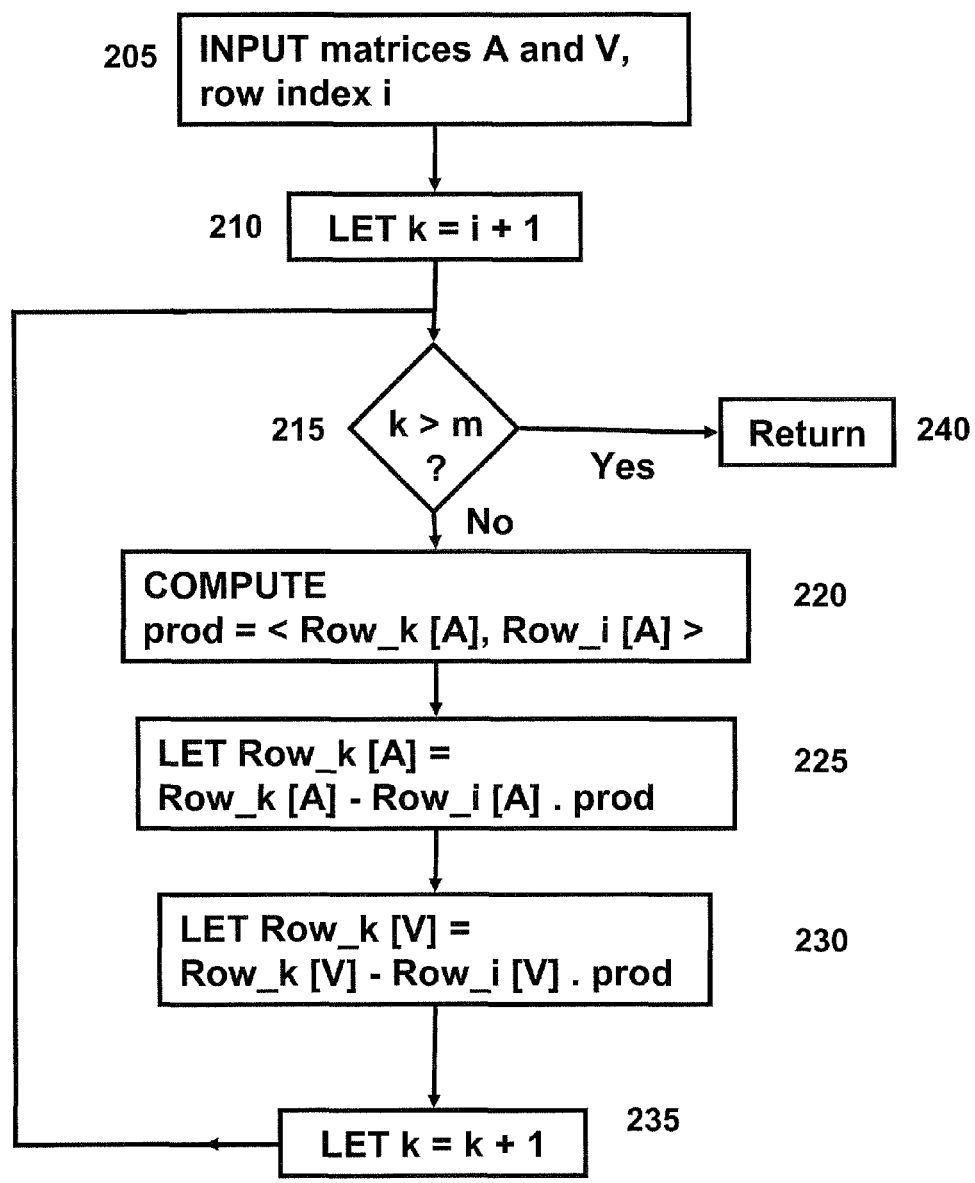
FIG. 2 illustrates a function which performs a series of orthogonalizations between the i-th row of A and rows with higher indices, as well as similar operations on the auxiliary matrix V in accordance with an embodiment of the present invention.
Figure 3:
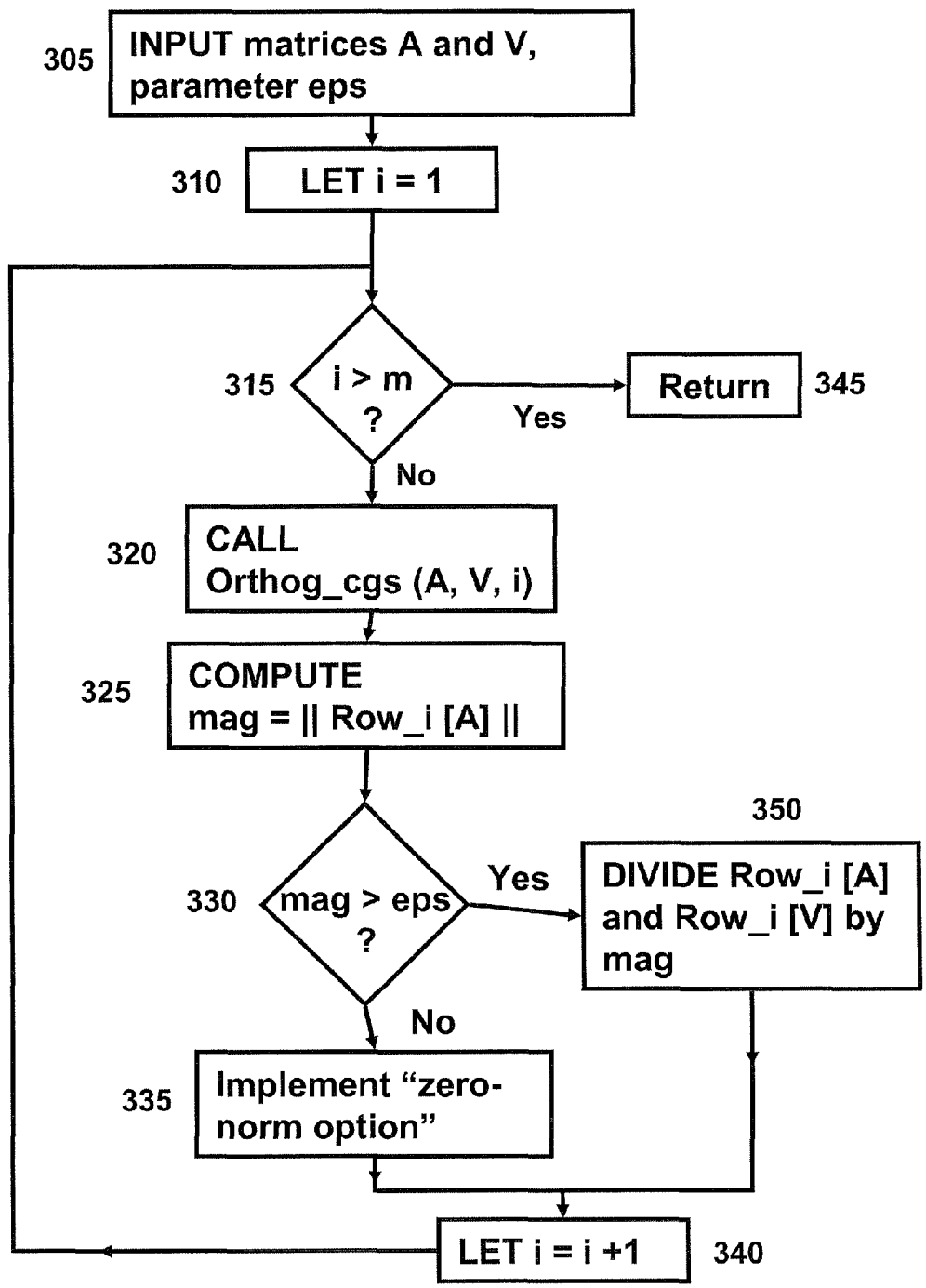
FIG. 3 depicts a ROP based on a Gram-Schmidt procedure altered to accept an auxiliary matrix V and a parameter eps, as well as implement a "zero-norm option" in accordance with an embodiment of the present invention.
Figure 4:
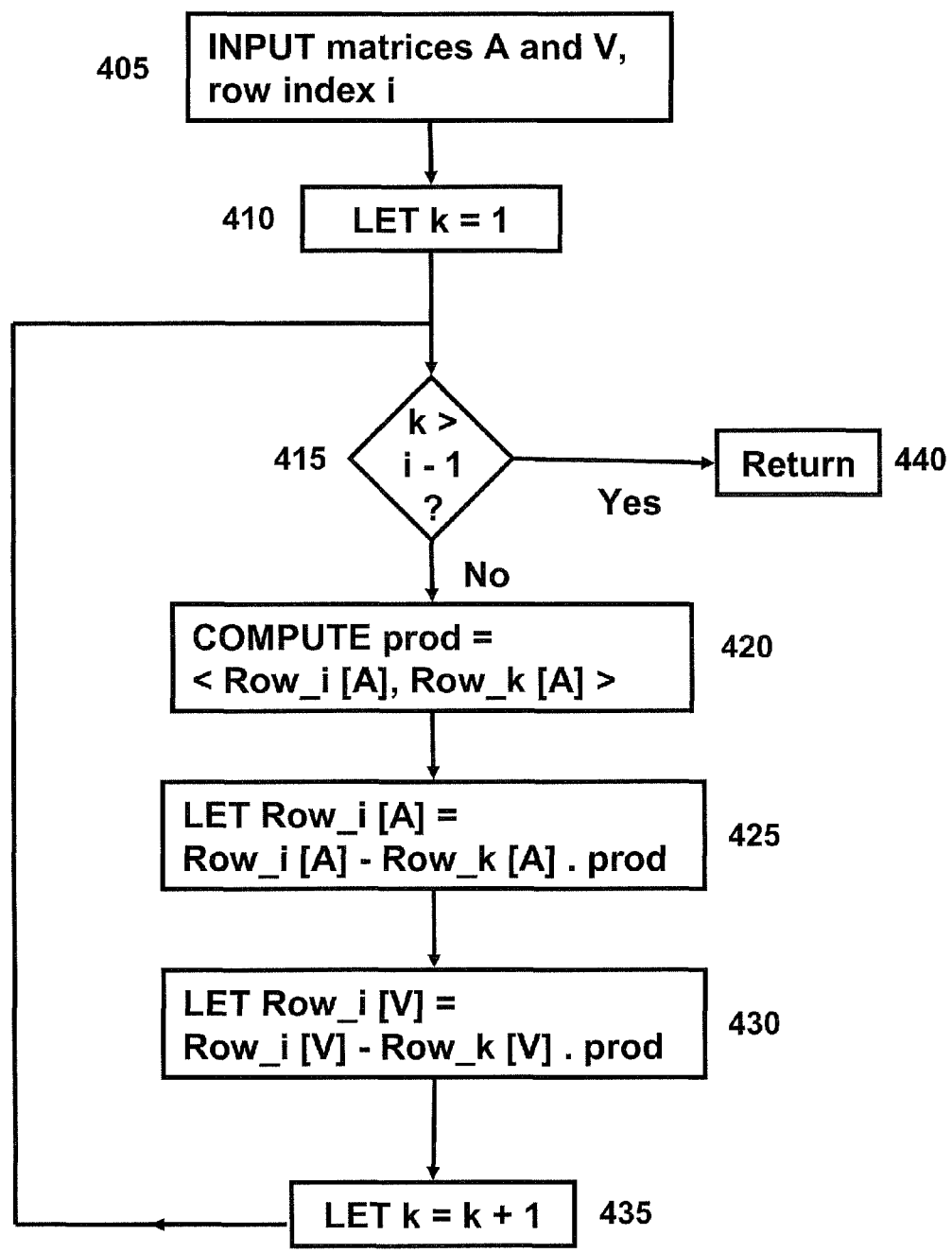
FIG. 4 shows a convenience function which performs a series of orthogonalizations between the i-th row of A and rows with lower indices, as well as performing similar operations on an auxiliary matrix V in accordance with an embodiment of the present invention.

Two methods will be relied on here that attempt to orthonormalize the row vectors of A; they are defined as "row orthonormalization procedures" (ROP). The first is named $ROP_1$, and is based on a modified Gram-Schmidt (MGS) method (see FIG. 1), and the second is named $ROP_2$ (see FIG. 3) and is based on a classical Gram-Schmidt (CGS) method. While each procedure is closely aligned with a Gram-Schmidt method, they are augmented with certain features (see FIG. 2 and FIG. 4). For example, each procedure allows for input of an auxiliary matrix V, and performs similar operations on V as with A. Also, each procedure uses a cutoff to account for limitations of machine precision for decimal numbers. Each ROP gives a user options for dealing with row vectors that are effectively zero; these choices are named "zero-norm options". Some (but not all) of the "zero norm options" for an (effectively) zero row are to: 1) remove the row from A and re-size the matrices/vectors; 2) set the row exactly to zero; and 3) delay having the ROP operate on the row. Also, note that the order in which the rows are treated in the ROP is at the discretion of the implementer of the algorithm. For purposes of illustration only, the following discussion addresses the rows sequentially, but this is not required. In addition, one could also choose to apply the orthonormalization procedure twice, to improve its accuracy. Another point is that the ROPs could be modified to check for whether the equations in Ax=b are sufficiently consistent. Also recall that orthonormalization consists of orthogonalization and normalization. As such, the ROP could be split up to perform these tasks separately; this type of approach is considered as an equivalent variation. Finally, other algorithms could be used to affect the same result as ROP. These and other minor changes are considered to merely be variations on the ideas already presented.

The algorithm begins by applying an ROP to AX=B. The sequence of row operations that implement the ROP may be represented by the matrices $M_1, M_2, \ldots$; they will act on the left of A. Thus, upon defining $M=(\ldots M_2 M_1)$, the ROP acting on A is equivalent to multiplying A on the left by M. Because A appears in the context of the equation AX=B, there are (at least) two ways to go about applying the ROP to it. The first way is to directly apply the ROP to A and B, which causes AX=B to become A'X=B'. In this process, the entries in A and B are written over; the new matrices are defined by A'=MA and B'=MB. This may also be understood as applying the ROP to the augmented matrix [A|B]. The second way is to again directly apply them to A, but to accumulate them as a factor multiplying B. Likewise, this may also be understood as applying the ROP to the augmented matrix $[A|I_m]$. In this approach AX=B becomes A'X=MB.

In the first approach the solution is formed as $$X_p = (A')^* B'$$

$$P = I_n - (A')^* A'$$

$$X_h = PY$$

$$X = X_p + X_h$$

where Y is an arbitrary but suitably-sized matrix. In the second approach, the solution is formed as $$G = (A')^* M$$

$$X_p = GB$$

$$P = I_n - GA (\text{or } I_n - (A')^* A')$$

$$X_h = PY$$

$$X = X_p + X_h$$

for a similar Y. The characteristic that distinguishes these two approaches is that in the former case B is transformed, while in the latter it is not. Whether one explicitly computes G in the second method is irrelevant. Also, one could combine the two approaches, computing B' and G; this is considered to be an equivalent variation. In this case, the ROP would be understood as being applied to the augmented matrix $[A|B|I_m]$. Depending on circumstances, one of the methods may be preferred over the other. For example, the first method involves less storage, while the second method offers more flexibility. Finally, the algorithm explicitly allows other operations to be performed on AX=B, or elements thereof. For example, it may be advantageous to transform AX=B, to increase numerical stability properties.

Given the above description, a complete set of solution features might be given as: $\{X_p, X_h, X, G, P, M, A'\}$. Of course $X_p, X_h$, and X are traditionally recognized as the solution, but the last four quantities are essentially equivalents: G easily leads to $X_p$ and P; M leads to A', B', and G; and A' leads to P. Depending on the embodiment, the user may only wish to (or be able to) compute a portion of these features; this is called the "feature set" and will be specified by the user at the beginning of each embodiment.

There are a number of features, or qualities, of this algorithm that deserve attention. The first item of note is that the columns of the particular solution $X_p$ are of minimum norm. This follows because they have no component in the null space of A (i.e., each column is a linear combination of the nonzero column vectors of (A')*). Second, the generalized inverse G is a {124}-inverse, and when A has full row rank it is a Moore-Penrose inverse. Such an easy and direct method for computing this type of generalized inverse is not known to already exist. Third, this algorithm nowhere requires the solution of a triangular system of equations, as is normally the case for solvers of Ax=b. Instead, the operations are (mostly) in terms of vectors and matrices. In fact, in one embodiment, all manipulations are in terms of either (row) vectors or matrices (cf. the second embodiment). This is advantageous for implementation on the newer architectures of today, which often utilize specially written libraries that are based on operations involving vectors and matrices. Fourth, because the solution accumulates linear combinations of the column vectors of (A')*, some useful opportunities arise: the solution can be computed in an online fashion; and a non-decreasing measure of the approach to the solution may be computed. Finally, while the algorithm does not use a QR decomposition per se, a QR decomposition does effectively appear. However, it is used in a new manner, and that opens the door to advantageous implementations, as will be presented in the following exemplary embodiments.

The fourth item mentioned above deserves more elaboration to explain why it occurs; it depends on two circumstances. The first circumstance is that after the i-th loop of the ROP, the i-th rows of A', B', and M will no longer change, and thus they may be used for other, intermediate computations. The second circumstance is that a matrix product may be expressed as a summation of outer products; the formulae for $X_p$, G, P, and $X_h$ may be rewritten with this summation. For example, the particular solution $X_p = (A')^* B'$ may be re-expressed as $$X_p = \sum_{i=1}^{m} Col_i[(A')^*] Row_i[B'].$$

This means that following the i-th step, one may compute the i-th term in this sum. Also, the generalized inverse $G=(A')^* M$ may be re-expressed as:

$$G = \sum_{i=1}^{m} Col_i[(A')^*] Row_i[M].$$

It is straightforward to use each term in this sum to incrementally compute $X_P$ or P, for example. Note that these summations depend on the columns of (A')*, which are either zero, effectively zero, or part of an orthonormal set. In any event, these fortuitous circumstances lead to the properties that were mentioned in the previous paragraph. Also, these are the properties that will allow concurrent computation of the solution with other steps of the algorithm; they will be discussed next.

Figure 5:
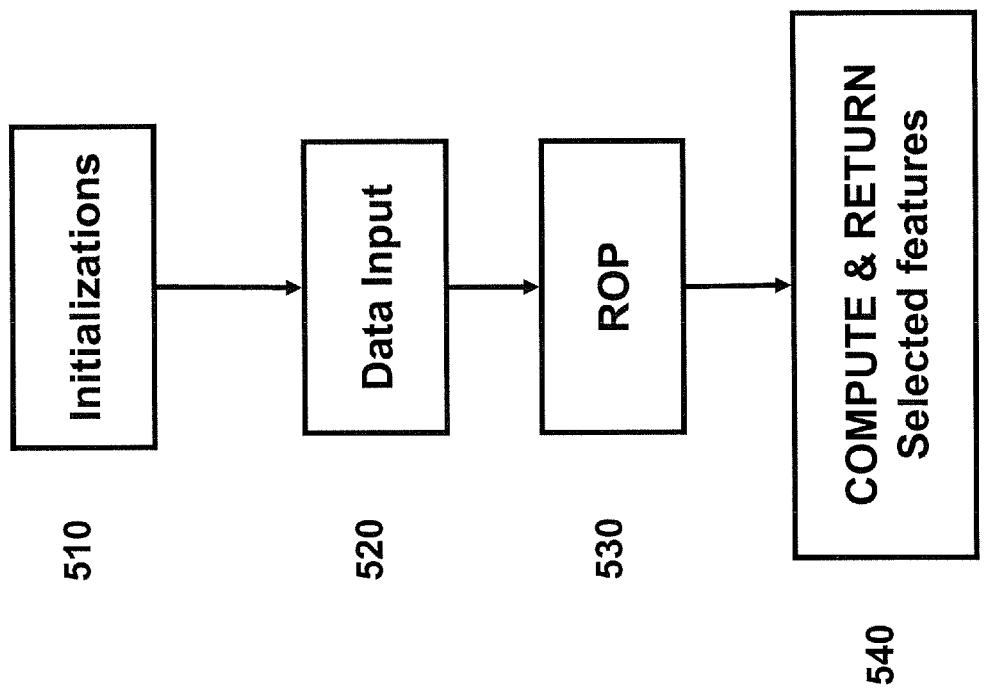
FIG. 5 illustrates a coarse-scale flowchart for an algorithm when the main steps are done sequentially in accordance with an embodiment of the present invention.
Figure 6:
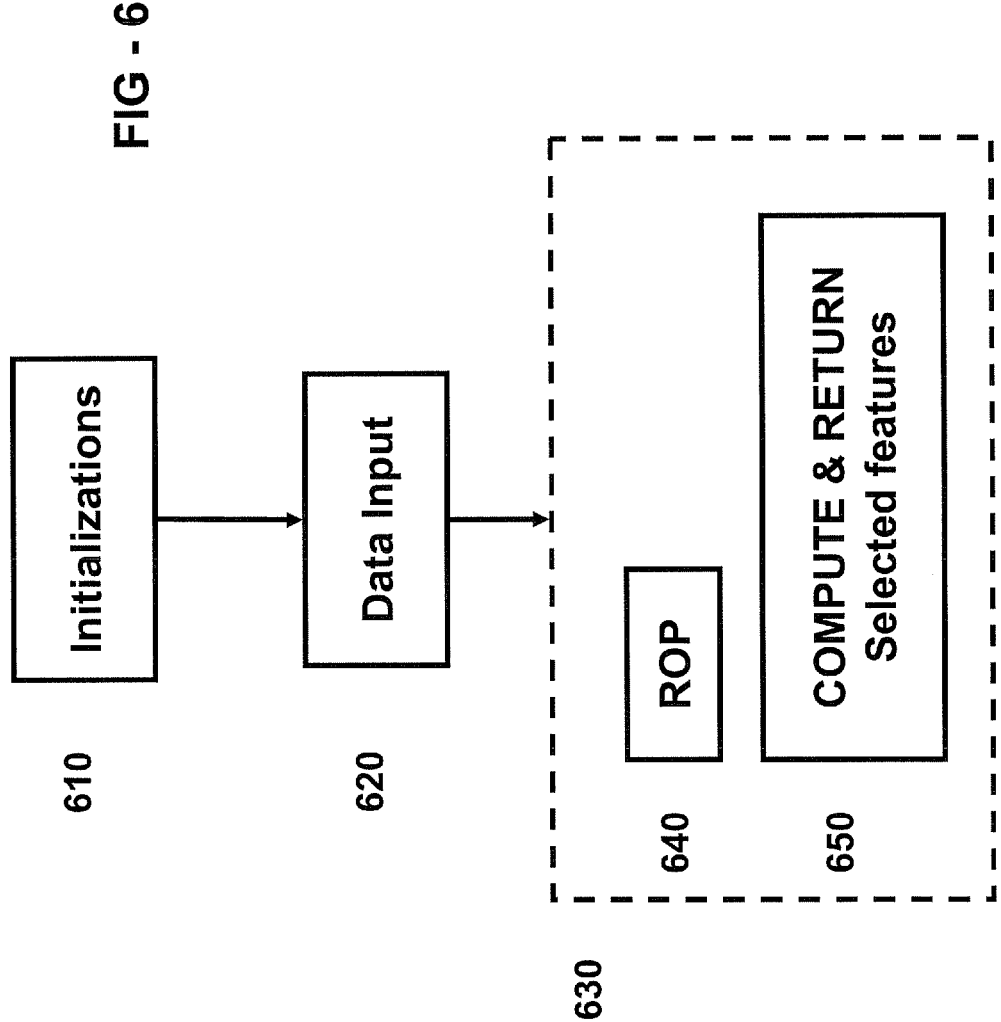
FIG. 6 illustrates a coarse-scale flowchart for an algorithm when ROP and computation/outputting of a solution are done concurrently in accordance with an embodiment of the present invention.
Figure 7:
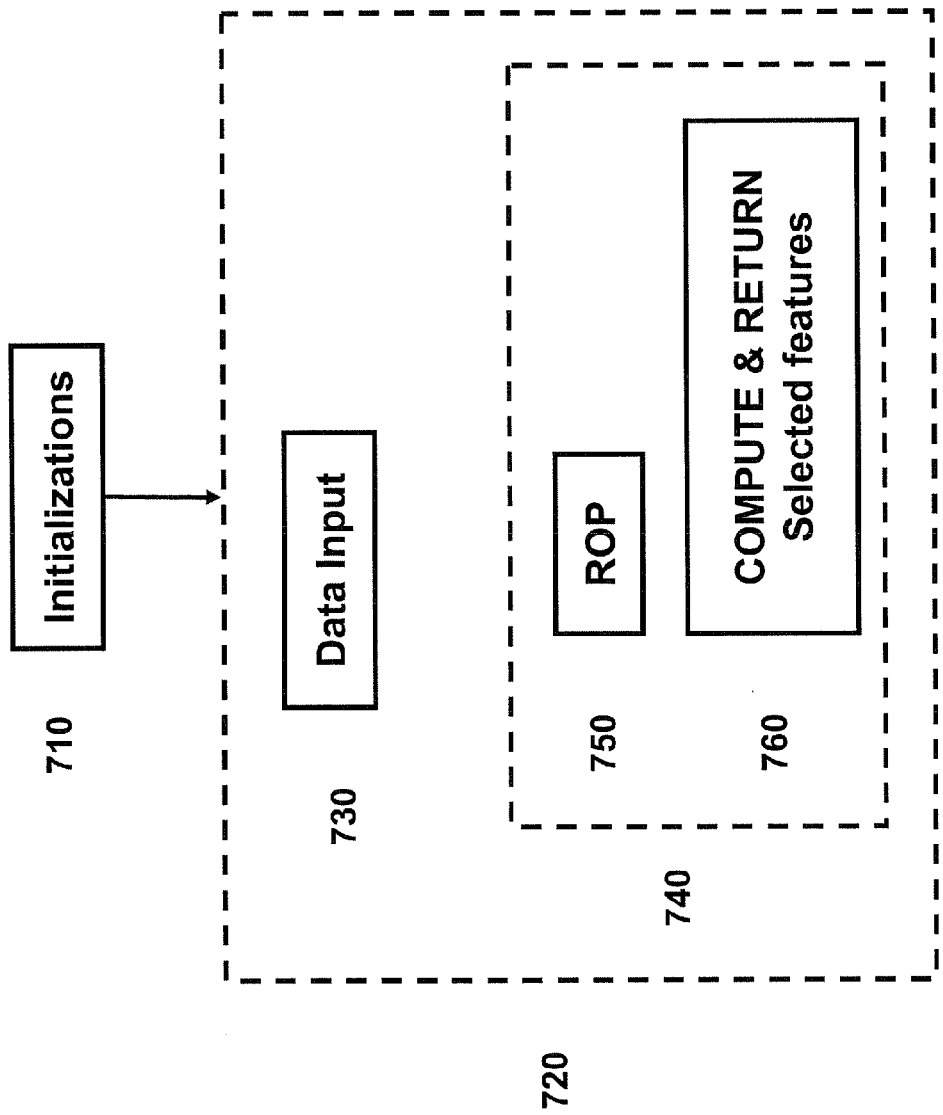
FIG. 7 illustrates a coarse-scale flowchart for an algorithm when data inputting, ROP, and computation/outputting of a solution are done concurrently in accordance with an embodiment of the present invention.
Figure 8:
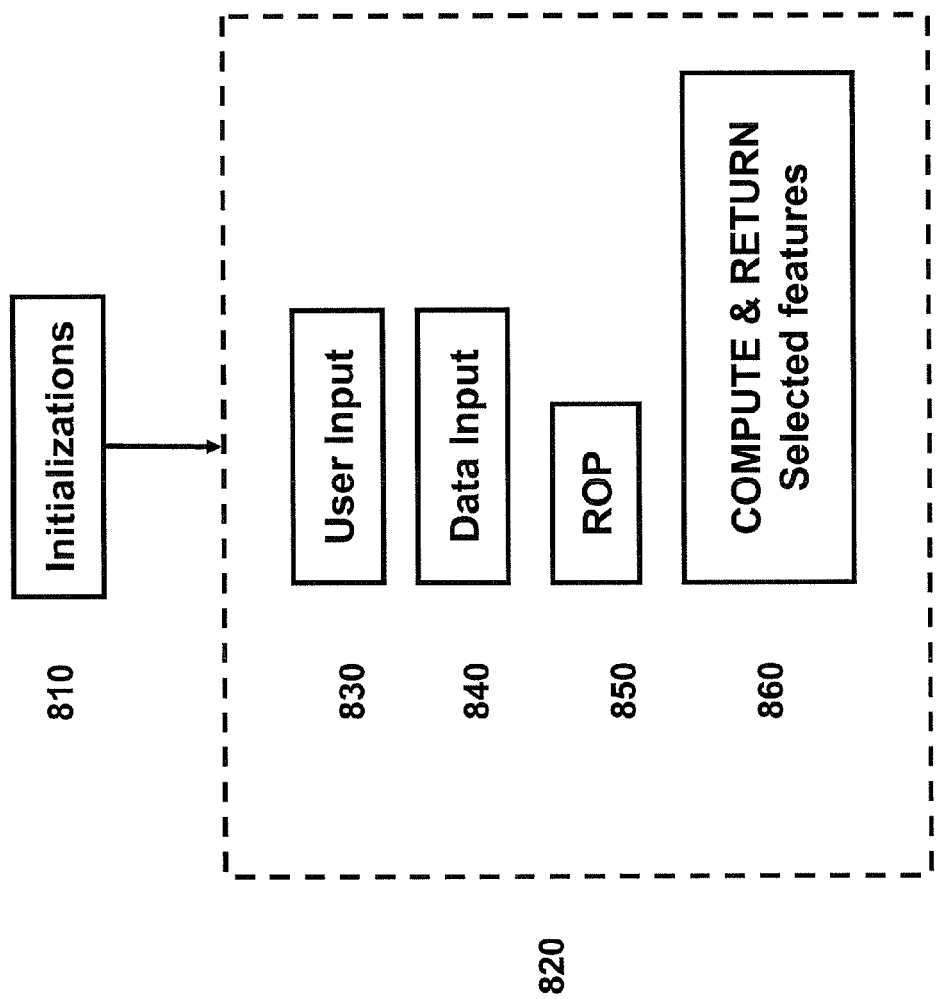
FIG. 8 illustrates a coarse-scale flowchart for an algorithm when all sub-processes are performed concurrently, or at least nearly so, in accordance with an embodiment of the present invention.

In formulating the above algorithm into a flow chart, attention will be paid not just to its variations but also to the order in which the steps are done (i.e., serially or in parallel). The reason for this is that the algorithm is naturally suited for concurrent execution on modern computers, such as those with vector, parallel, and distributed architectures. In addition, the flowcharts will first be shown at a coarse level of detail, and then at a moderate level; this follows the approach of Sipser. For example, if the steps of the above algorithm are done serially, a coarse level flow chart would be as in FIG. 5; the first two embodiments are consistent with this. Note that step 510 includes user input (e.g., feature set, eps, matrix dimensions), as well as program initializations (e.g., creating storage and initializing variables). When that is complete the data is read in at step 520, and the algorithm is performed at steps 530 and 540. It will be seen in the third embodiment that the steps of the ROP and the formation of the solution may be done concurrently. In this case, the flowchart can be represented as shown in FIG. 6; note that the steps inside the dashed box (i.e., step 630) are executed (nearly) simultaneously. Finally, in the fourth embodiment, it will be shown that it is possible to perform three or more of the steps concurrently. The appropriate coarse-scale flowchart for this case is shown in FIG. 7; note how the data inputting at step 730 is done concurrently with step 740. A variation on this flowchart would have steps 750 and 760 performed concurrently. The final logical step in this progression is to also allow for user input during the running of the algorithm; this might be preferred should the user wish to decide on zero norm options while the program is running, for example. In this instance all the steps would be grouped together as in FIG. 8; note how the user input at step 830 was separated from the initializations at step 810.

In certain embodiments, the algorithm under discussion is intended to be used within computer software/hardware as a program or set of instructions. There are not any notable restrictions on what kind of hardware or computer architecture is appropriate. For purposes of illustration only, an example architecture is given in FIG. 9. It is meant to display a shared address space, with distributed memory and processors. In this example, communication is achieved via a bus (920); it is also common to do so with message passing. Other interconnection topologies are also possible.

The processing elements are $P_{main}$ and $P_1$ through $P_n$. Each element contains a processor, registers, cache, memory, etc. $P_{main}$ is the main processor, and it is here that the program is launched by the user (910). Permanent storage for the data (e.g., one or more databases) is represented by $D_{main}$, $D_{extra}$, and $D_1$ through $D_n$. This is where the data for the matrices A and B are stored, as well as the output data M, G, etc. The input/output (I/O) subsystems are not explicitly shown, and are taken to be built into the hardware.

Figure 10:
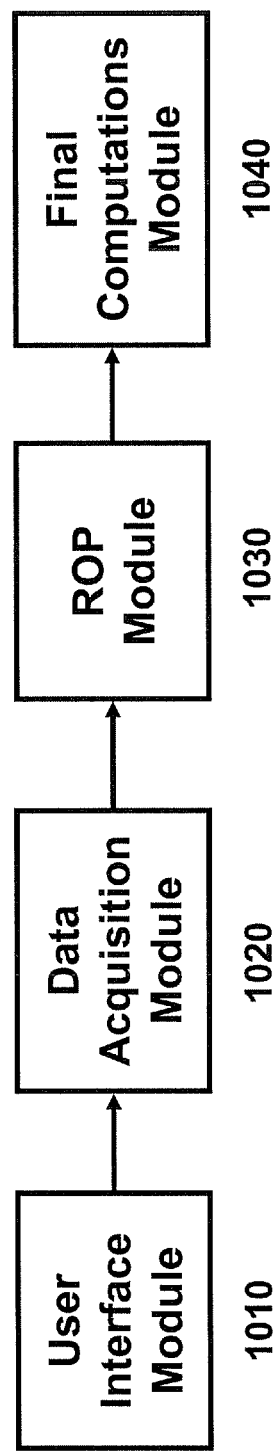
FIG. 10 depicts modules of a program that utilize an algorithm to execute sequentially in accordance with an embodiment of the present invention.

The main parts of this program are depicted in FIG. 10. The program begins with the "user interface module" (1010), which interacts with both user and program. This module is responsible for accepting parameter specifications from the user and launching the program. Following that, control in the program is passed to the "data acquisition module" (1020). This part is responsible for retrieving the data set specified in 1010 and loading it into local memory (in each processing element) or local storage. If all the data cannot fit into memory, data will have to be moved between local and non-local memory/storage during the program. Following this, the data is in local memory/storage and ready to be used. The program then passes control to the "ROP module" (1030), which performs the bulk of the computations. This module performs the computations and manipulations necessary to carry out the row orthogonalizations previously outlined in FIGS. 1 through 4. When this module has completed, the stored data that had represented A and B will now represent that for A' and B', respectively. Also, the storage for the identity matrix that was created in 1010 will now represent the data for M. The next major step is the "final computation module" (1040). This section of the program is responsible for carrying out the computations behind the formulae that were given earlier. For example, this module would compute the particular solution $X_p$ by forming the matrix product (A')*B'. When this module completes, the program terminates.

It is worthwhile to revisit the above modules in the context of one of the applications discussed earlier—that of ranking web pages on the internet; this is of paramount importance for an internet search engine. This situation may be modeled as a Markov process, in which the governing equation is Tx=x. The j-th component of the n dimensional vector x is the probability to be at the "j-th web page", and the (i,j)-th component of T represents the probability the user will go to page #i, starting from page #j. Without getting into the details of this application, it suffices to know that T may be determined by statistical data, and that one is interested in computing x. As mentioned in the applications section, this is equivalent to solving Ax=b upon identifying $A=T-I_n$ and b=0. With respect to the modules, the user would select to compute the null space projection operator P in 1010, since this leads directly to $x_h$ ($x_p$ is zero). Thus, the "feature set" includes P. The data would be pulled in by 1020 and brought into local memory/storage. If T had been stored, then it could be converted to $T-I_n$ at this point. At 1030, the ROP would act on $T-I_n$, orthogonalizing the rows of $A=T-I_n$ (as described earlier); the result of this is A'. The module 1040 contains the final computations, which implement the mathematical ideas and algorithms mentioned earlier. In this example the null space projection operator would be computed as $P=I_n-(A')*A$; the relation $x_h=Py$ allows one to compute $x_h$. Finally, this example is only representative. There are many more to choose from, such as the myriad applications that take advantage of the "minimal norm" nature of the solution.

The following numerical example for this application uses the transition matrix $$T = \frac{1}{6} * \begin{bmatrix} 0 & 3 & 0 & 3 & 0 \\ 2 & 0 & 0 & 3 & 0 \\ 2 & 0 & 0 & 0 & 3 \\ 2 & 3 & 6 & 0 & 3 \\ 0 & 0 & 0 & 0 & 0 \end{bmatrix}.$$

Note that the columns sum to 1.0, as they should. The (truncated) null space projection operator that is computed in 1040 is $$P = \begin{bmatrix} 0.3188 & 0.2834 & 0.1062 & 0.3543 & 0.0 \\ 0.2834 & 0.2519 & 0.0944 & 0.3149 & 0.0 \\ 0.1062 & 0.0944 & 0.0354 & 0.1181 & 0.0 \\ 0.3543 & 0.3149 & 0.1181 & 0.3937 & 0.0 \\ 0.0 & 0.0 & 0.0 & 0.0 & 0.0 \end{bmatrix}.$$

At this point the program is essentially finished, as one of the features of the solution (i.e., P) has been computed. The solution is found by noting that $x_h = Py$ and that the first four columns of P are proportional. Then, since the components of x must sum to 1.0, normalization of x (since x represents a probability) leads to the (truncated) homogenous solution $$x_h = \begin{pmatrix} 0.2999 \\ 0.2666 \\ 0.1 \\ 0.3333 \\ 0 \end{pmatrix}.$$

Figure 18:
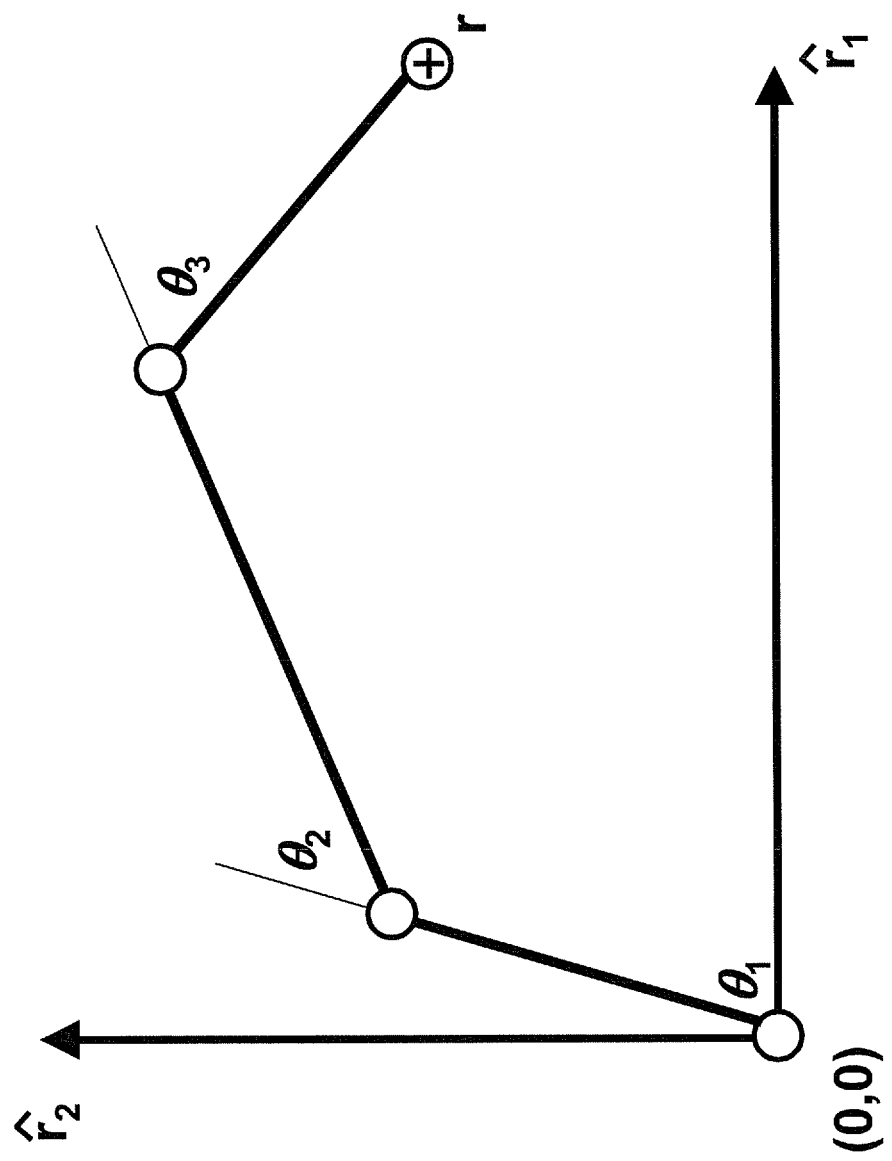
FIG. 18 depicts a two dimensional articulated arm in accordance with an embodiment of the present invention.

Another example, one that takes advantage of a minimum norm feature of the solution, relates to an inverse kinematics (IK) problem from the fields of robotics and computer animation. Suppose that one has an articulated arm (see FIG. 18) in which the limbs are rigid, the joints rotate freely, and, for reasons of simplicity, is confined to a two-dimensional plane. FIG. 18 depicts a two dimensional articulated arm, which is shown in boldface, with axes and other visual aids in light grey. The joints of the arm are open circles, with the end effector additionally having a cross drawn inside it. The first joint lies at the origin, while the end position lies at r. The arm may be a structure in virtual space (i.e. a computer-animated arm), for example. As another example, the arm may be a physical structure, as in the robotics field.

A primary goal is to move the end effector along some path. A secondary goal can vary, but is often obstacle avoidance. In the absence of a secondary goal, the algorithm automatically leads to a minimum of the turning of the joints. This is a desirable feature, since in a real application the joints are turned by servos, which require time and energy to adjust. It also looks more elegant in an animation for there to be less excess movement. Denoting the position of the end effector by $r = (r_1, r_2)$ and the angles by $\theta = (\theta_1, \theta_2, \theta_3)$, the relation between the two is taken as $r = f(\theta)$. In this example, one normally attempts to move the end effector slowly, which suggests that the governing control equation should actually be the following differential relation (wherein J represents a Jacobian of transformation between position r and joint angles $\theta$):

$$dr = Jd\theta, \quad J = \frac{\partial f}{\partial \theta}.$$

In the case that the joints may be rotational, non-rotational or both, one speaks of "joint parameters" rather than "joint angles."

In the example at hand, where there are three angles and the arm is in two dimensions, an instance of Ax=b is provided, wherein $$A = J = \begin{bmatrix} J_{11} & J_{12} & J_{13} \\ J_{21} & J_{22} & J_{23} \end{bmatrix}, \quad x = d\theta = \begin{pmatrix} d\theta_1 \\ d\theta_2 \\ d\theta_3 \end{pmatrix}, \quad b = dr = \begin{pmatrix} dr_1 \\ dr_2 \end{pmatrix}.$$

In short, the goal is to determine $d\theta$ from dr, and that constitutes the IK problem. The particular solution is the minimum norm solution, which in this case represents the Euclidean norm of the vector of joint angle changes.

Now consider the role of the modules in FIG. 10 with respect to this application. The user initiates the program in 1010 with certain input (which may actually be another program). It will be known to the user what the current $\theta$ is, and thus r and J are determined. Also, the user will have some primary and secondary goals for movement of the arm. A primary goal involves a particular solution, and a secondary goal involves a homogeneous solution and/or a null space projection operator. Thus, depending on the user's intent, one or more of these features may be included in the "feature set" the user specifies in 1010. Following this, the data is pulled in by 1020 and brought into local memory/storage. Also, at this stage, M is initialized to $I_m$. In 1030, the ROP operates on A and M, orthogonalizing the rows of A, and acting on M similarly (as described earlier); the result of this is A' and M. The module 1040 computes the features specified by the user, which in this case may include $x_p$, $x_h$, or P. This allows the user to update $\theta$ and r to $\theta + d\theta$ and $f(\theta + d\theta)$, respectively. As outlined above, a single run of this program only updates r by a small amount. To move r through some path, for example, the program would have to be iterated a number of times. Finally, of note is that the algorithm provides exactly what is needed for this application. Furthermore, in simulations, no erratic movements were seen near singular configurations, as has been the case with simulations in the robotics and computer animation literature. Finally, this same approach applies to many other kinds of articulated bodies; the application above is merely exemplary.

Figure 9:
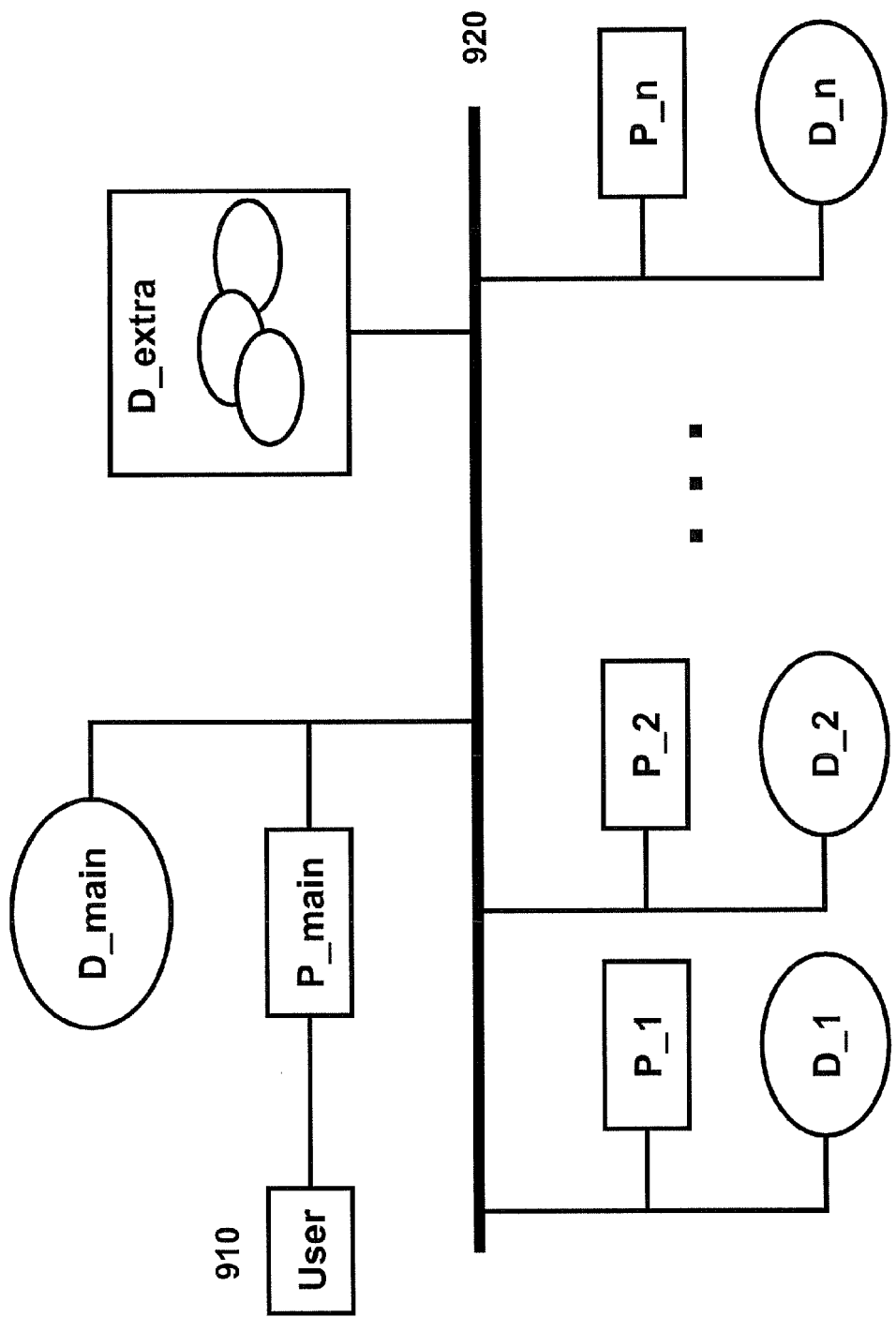
FIG. 9 shows an exemplary architecture that is meant to display a shared address space, with distributed memory and processors, in accordance with an embodiment of the present invention.
Figure 11:
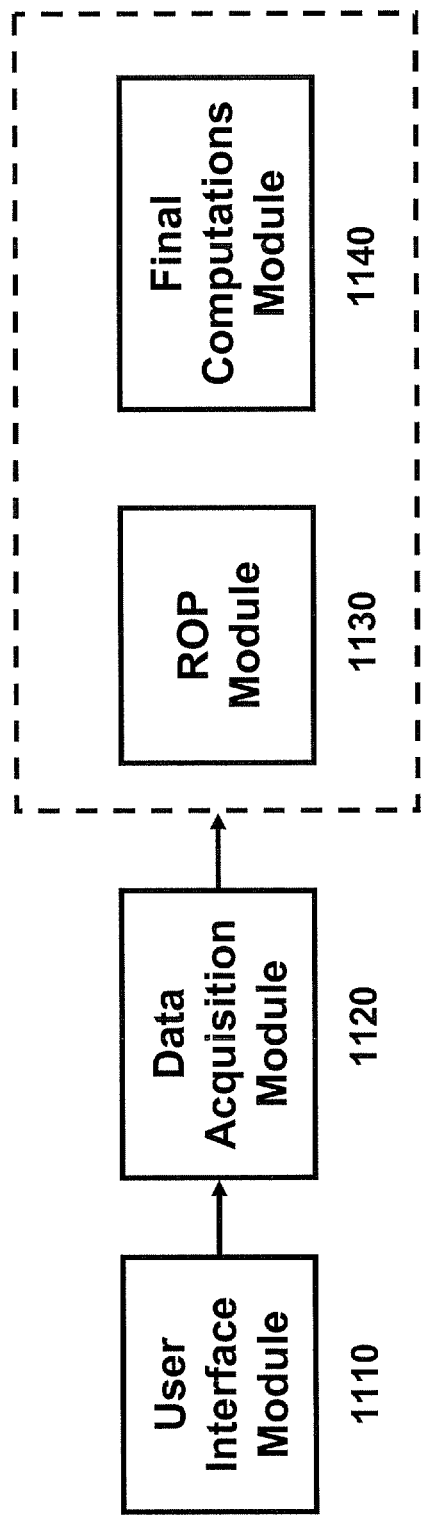
FIG. 11 depicts modules of a program that utilize an algorithm to execute some modules concurrently and others sequentially in accordance with an embodiment of the present invention.
Figure 12:
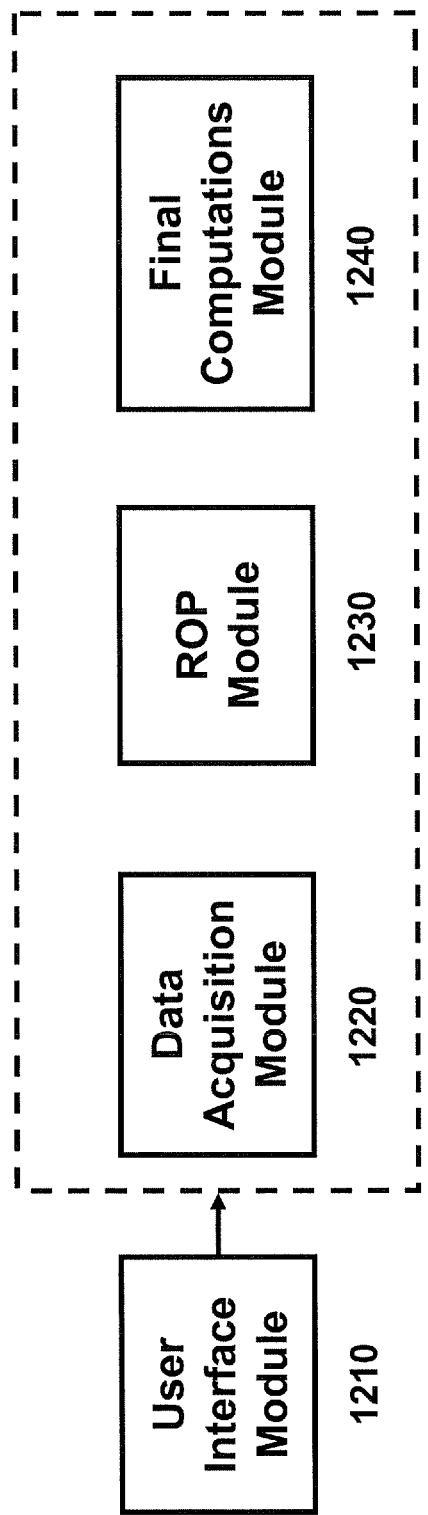
FIG. 12 depicts modules of a program that utilize an algorithm to execute several modules concurrently in accordance with an embodiment of the present invention.

Some final points regarding the usage of this program concern implementations that use concurrent processing. As shown in FIG. 9, no special consideration is given to this possibility. As will be seen in some of the embodiments, some of the modules may be executed concurrently. For example, in a third embodiment, the ROP and the computation of the solution are done concurrently. In terms of the modules, this is conceived as FIG. 11, in which the modules within the dashed box (i.e., 1130 and 1140) are computed concurrently. Also, a fourth embodiment displays more concurrency. This is similarly described in FIG. 12, in which the concurrent execution of 1220, 1230, and 1240 is denoted by enclosing them together in a dashed box.

Exemplary Embodiments

Next, several algorithms that are based on the above formulae and ideas will be displayed. In the mathematical formulae and text, a prime on A (i.e., A') was used to indicate that A had changed (and similarly for b, B). However, in the flowcharts to follow, primes will not be used and it will be understood that the entries in A, b, B, . . . are simply written over (as is the convention with computer code). Also, the dimensions of the matrices (i.e., m, n, and p) are taken to be global parameters, and do not need to be explicitly passed in function calls. Finally, these are not all the embodiments that are possible. They should not be viewed as limitations, but rather as examples.

Embodiment #1

Figure 13:
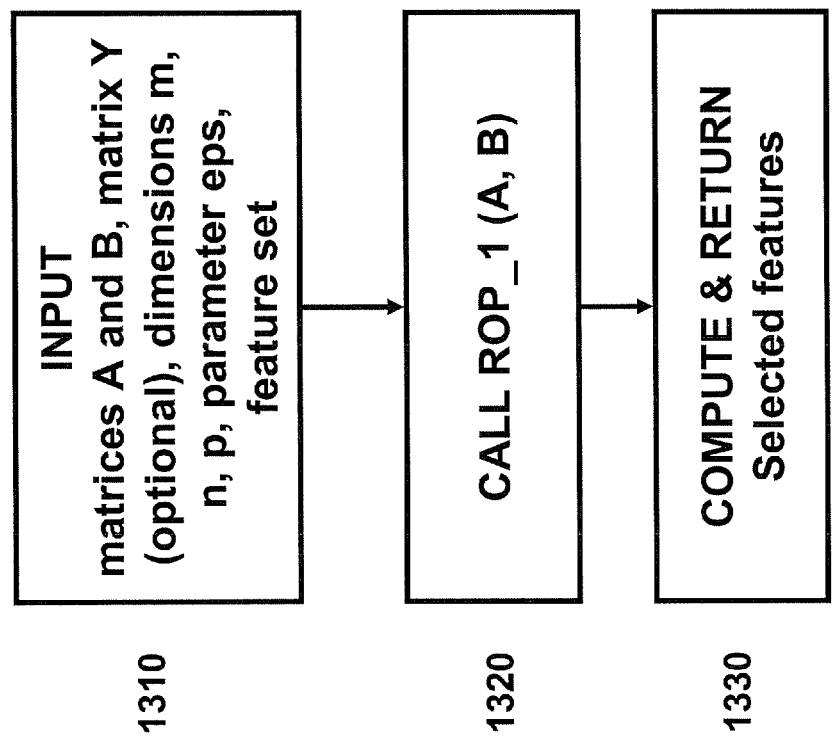
FIG. 13 shows a general sequence of steps for a first embodiment, in which AX=B is solved using an approach of updating B along with A in accordance with an embodiment of the present invention.

An intended application of this first embodiment is to solve a system of linear equations for a fixed number of instances of b; these instances are here stored as column vectors in the matrix B. Thus, this algorithm is able to solve the matrix equation AX=B, as well as compute related quantities. It uses the first approach (described above) for solving AX=B that was discussed earlier. As depicted in the flowchart (FIG. 13), the algorithm begins at 1310 with a user inputting A and B (and optionally Y); the dimensions m, n, and p; the "feature set"; and the parameter eps. Following this, at 1320, the procedure $ROP_1$ (A, B) is called, which transforms A into A' and B into B'. This step corresponds to transforming AX=B to A'X=B'. Finally, at 1330, the aspects of the solution that were specified at 1310 in the "feature set" are computed and returned. Note that the total set of available features in this embodiment is $\{X_p, X_h, X, P, A'\}$; from this the "feature set" may be chosen.

This embodiment may be illustrated using the following data:

$$A = \begin{bmatrix} 0 & -3i & 0 \\ 2i & 1 & -1 \\ 4i & 2-3i & -2 \end{bmatrix}, B = \begin{bmatrix} 1 & -3i \\ 2i & 2 \\ 1+4i & 4-3i \end{bmatrix}.$$

Following the call to $ROP_1$ at 1320, these quantities become $$A' = \frac{1}{\sqrt{5}} \begin{bmatrix} 0 & -i\sqrt{5} & 0 \\ 2i & 0 & -1 \\ 0 & 0 & 0 \end{bmatrix}, B' = \frac{1}{3} \begin{bmatrix} 1 & -3i \\ i\sqrt{5} & 3/\sqrt{5} \\ 0 & 0 \end{bmatrix}.$$

If the user had included $X_p$ in the feature set, it would be computed as $$X_p = \frac{1}{15} \begin{bmatrix} 10 & -6i \\ 5i & 15 \\ -5i & -3 \end{bmatrix}.$$

Likewise, if P were included the result would be $$P = \frac{1}{5} \begin{bmatrix} 1 & 0 & -2i \\ 0 & 0 & 0 \\ 2i & 0 & 4 \end{bmatrix}.$$

Recall that the general solution to AX=B is $X=X_p+X_h$, where $X_h=PY$ and Y is a 3×2 matrix (with arbitrary entries from the complex number field). Also, the choice of the size of eps depends on many practical issues. However, if the above example were implemented with a precision of 15 decimal digits, it would suffice to take eps=$10^{-10}$. This value for eps may be used in the other embodiments as well.

Embodiment #2

Figure 14:
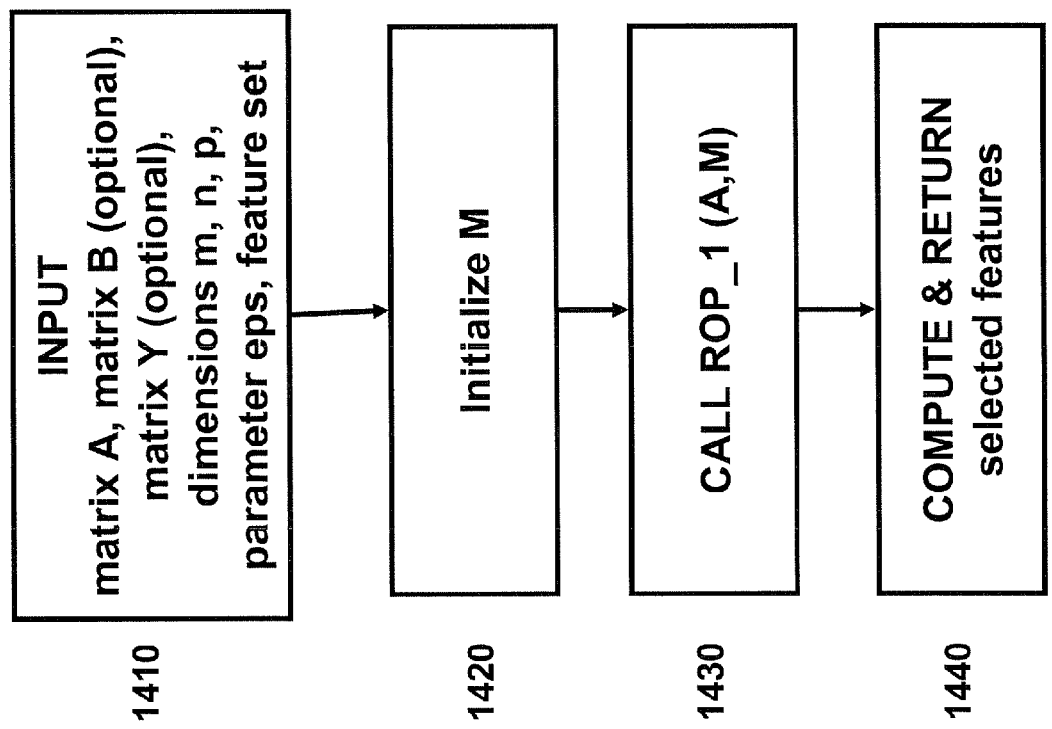
FIG. 14 shows a general sequence of steps for a second embodiment, in which AX=B is solved using an approach of updating an auxiliary matrix M along with A in accordance with an embodiment of the present invention.

This second embodiment computes the solution of AX=B for an arbitrary number of B. The intended application is one that seeks to solve a set of linear equations while minimizing the storage requirements due to B. Another intended application is one that primarily seeks quantities such as G or P. It uses the second approach (described above) for solving AX=B that was discussed earlier. As shown in the flowchart (FIG. 14), the algorithm begins at 1410 with the user supplying A (and optionally B and Y); the dimensions m, n, and p; along with the feature set and eps. The auxiliary matrix M is then created and initialized to an m×m identity matrix ($I_m$) at 1420. At step 1430, $ROP_1$ is called, and transforms A into A', and M($=I_m$) into M (= . . . $M_2M_1$). This step corresponds to transforming AX=B to A'X=MB. Finally, at 1440, the aspects of the solution that were specified at 1410 in the "feature set" are computed and returned. The total set of available features in this embodiment is $\{X_p, X_h, X, G, P, M, A'\}$; from this the "feature set" may be chosen. Because G is available, P may be computed in one of two ways, as described earlier. Note that a variation on this embodiment is to combine it with the first embodiment, so that both B' and G are computed. There are a number of such variations.

An important quality of this algorithm is that it is composed entirely of operations on matrices and vectors (and row vectors of A). This facilitates an implementation entirely in terms of BLAS calls, which is a desirable quality in an algorithm. Although this embodiment uses the second approach for computing the solution to AX=B, it is similar to the first embodiment in that the three main steps (e.g., 1420, 1430, and 1440) are done sequentially.

This embodiment may be illustrated using the previous data for A and B. After the user input at 1410 and the initialization of M=$I_3$ at 1420, the program calls $ROP_1$(A,M) at 1430, causing M to become $$M = \frac{1}{3} \begin{bmatrix} 1 & 0 & 0 \\ -i/\sqrt{5} & 3/\sqrt{5} & 0 \\ -3 & -6 & 3 \end{bmatrix}.$$

If the user had included G in the feature set, it would be computed as $$G = \frac{1}{15} \begin{bmatrix} -2 & -6i & 0 \\ 5i & 0 & 0 \\ i & -3 & 0 \end{bmatrix}.$$

The rest of the results are the same as in the first example, except that the presence of G means that P may be computed in an additional way.

Embodiment #3

This third embodiment is an example of how to change the order of the steps in the first embodiment so that some of them may be executed concurrently. The algorithm begins at step 1505 with the user inputting: A; B; the feature set; the dimensions m, n, and p; eps; and (optionally) Y. At 1510, $X_p$ is initialized as an n×p zero matrix. Other quantities that are to be incrementally updated at 1565 should be initialized to zero here as well. The remainder of the steps are very similar to $ROP_1$(A,B), with differences occurring at 1545 and 1555. Step 1555 involves the concurrent execution of the orthogonalization step (1560) and the incremental formation of the solution (1565). The latter step is possible because following 1550, the i-th rows of A and B will no longer change. The underlying equation on which the update is based comes from the outer product expansion of $X_p=(A')*B'$, as discussed earlier. Each term in the sum over i is computed with each pass through 1565. Other features of the solution may also be formed incrementally at 1555, but they are not shown in order to help clarify the exposition. In this embodiment, such additional features may be computed at 1545. The total set of available features in this embodiment is $\{X_p, X_h, X, P, A'\}$; from this the "feature set" may be chosen.

The split at 1555, in which work is divided between two concurrent processes, implies that it might be ideally designed for a two-processor machine. However, each of the steps 1560 and 1565 may be executed on a modern machine with multiple processors, using library functions such as those implementing BLAS or PBLAS. As such, this embodiment is well-suited to solve AX=B for large m, n, and p.

Note that each update to $X_p$ at 1565 may be considered to be an orthogonal update to each column of $X_p$. This means that the norm of each of the columns of $X_p$ is non-decreasing with respect to i. This feature may be useful since it essentially provides a running estimate (or "preview") of the solution while the overall computation is still ongoing. Such a useful and elegant formulation of the solution to AX=B is not known to already exist.

Figure 15:
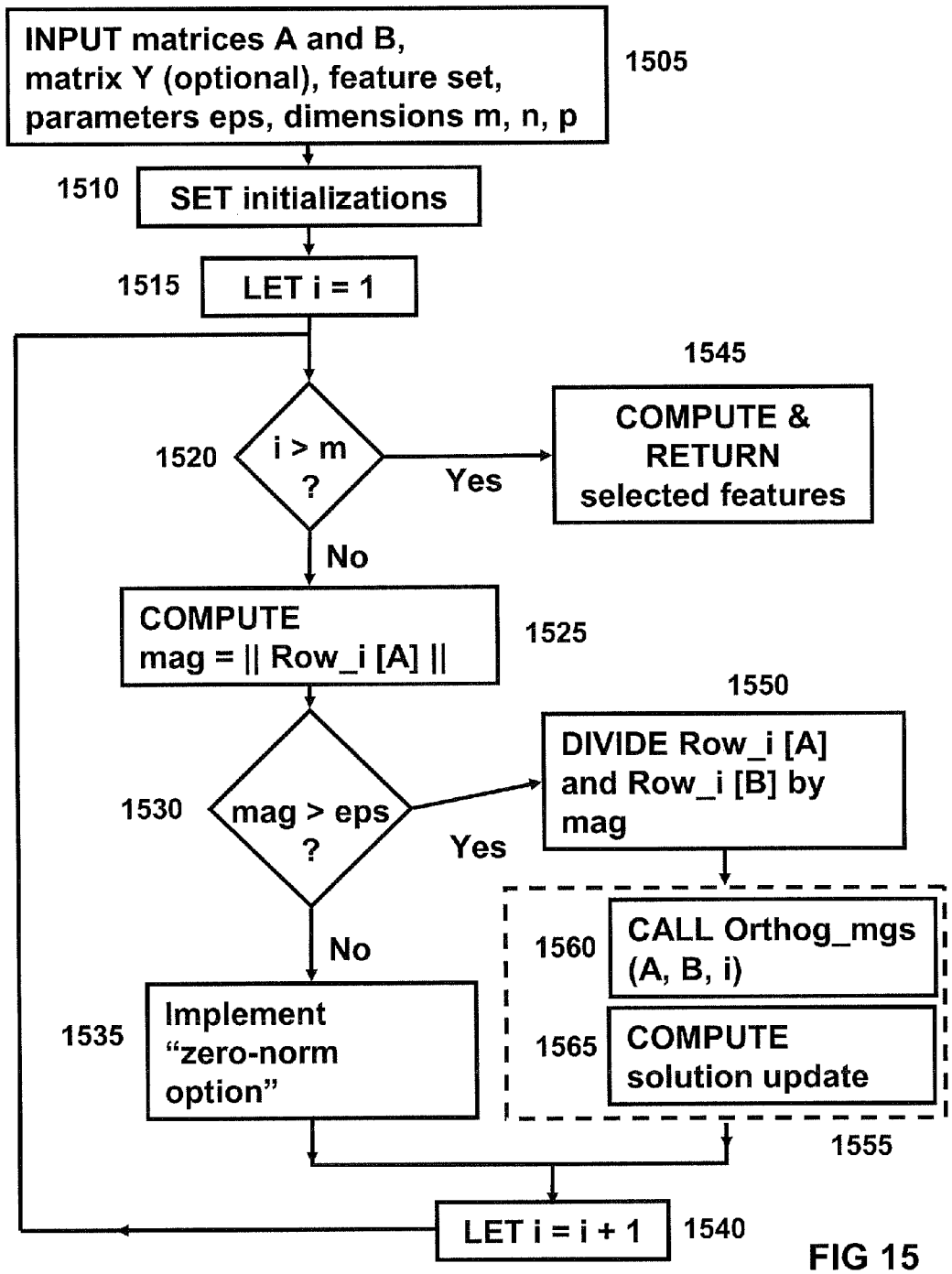
FIG. 15 shows a flowchart for a third embodiment, in which an orthogonalization step and solution update are done concurrently in accordance with an embodiment of the present invention.

This embodiment highlights the fact that when parallelizing an algorithm, it can be an inappropriate limitation to demand that some calculations be done sequentially. Indeed, any order is acceptable, so long as it computes the variables as specified by the formulae. Also, while the concurrency here is based on the first embodiment, it could equally well have been based on the second embodiment or some variation. Also, an extension of this embodiment could instead work concurrently on blocks of rows, rather than individual rows (as shown in FIG. 15).

In the following, the embodiment is used to process the same A and B as used previously. The solution matrix $X_p$ is incremented at 1565, and its intermediate value is shown below. This is done for each value of the loop index i.

$$X_p = \begin{bmatrix} 0 & 0 \\ i/3 & 1 \\ 0 & 0 \end{bmatrix} \text{(after } i=1\text{)},$$

$$X_p = \begin{bmatrix} 2/3 & -2i/5 \\ i/3 & 1 \\ -i/3 & -1/5 \end{bmatrix} \text{(after } i=2\text{)},$$

$$X_p = \begin{bmatrix} 2/3 & -2i/5 \\ i/3 & 1 \\ -i/3 & -1/5 \end{bmatrix} \text{(after } i=3\text{)}.$$

$X_p$ and other features are the same as found above. Also, note that the update for i=3 has no effect; this occurs because the third row of A is linearly dependent on the first two rows.

Embodiment #4

Figure 16:
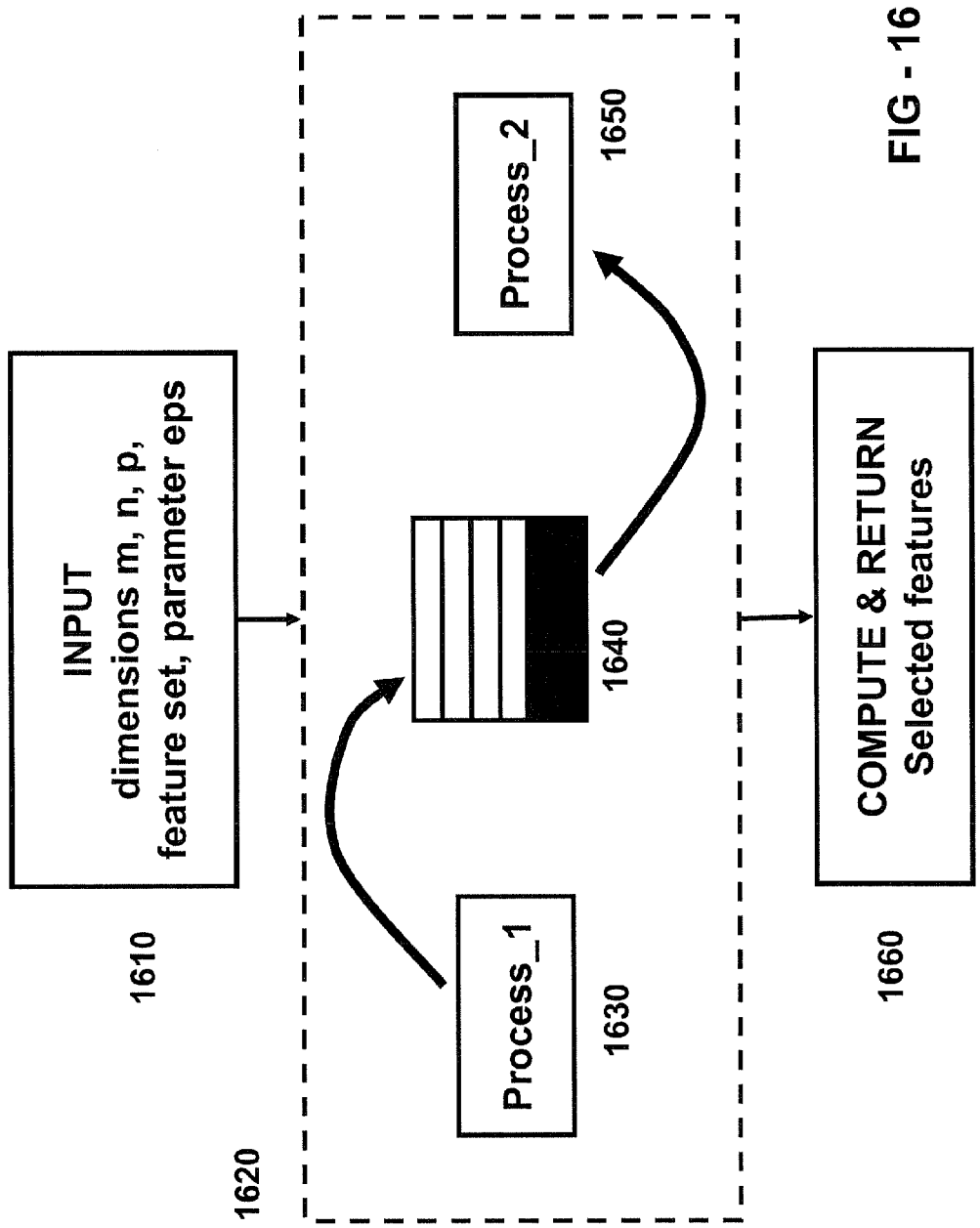
FIG. 16 illustrates a large-scale flowchart for a fourth embodiment, which is an "online" algorithm that processes data as it arrives in accordance with an embodiment of the present invention.

This fourth embodiment solves AX=B in the real-time case (i.e., "online", as the data arrives). It operates on AX=B by directly applying the row operations to A and B, and performs incremental updating of the solution. The ideal application for this algorithm is one in which the data (i.e., corresponding rows of A and B) become available on a relatively slow time scale. This could happen, for example, if the computer is input/output-limited, if it takes a long time to compute the rows of A and/or B, or if it takes a long time to compute the solution relative to the time required to access the rows of A and/or B in one or more memory modules. The solution can be incrementally updated as corresponding subsets of one or more rows of A and B (e.g., rows 1 and 2 of A and rows 1 and 2 of B) become available to the processors(s). The availability of the corresponding rows may be limited by many factors, such as the rows of A and/or B being moved into memory at a relatively slow pace, or the rows of A and/or B being transferred from one or more memory modules to one or more processor modules at a rate that is slow relative to the processing/computation speed. The current embodiment (depicted in FIG. 16) begins at 1610 with the user inputting the dimensions m, n, and p, as well as the feature set and the parameter eps. At 1620, there are two processes which may run concurrently: 1630 and 1650.

Figure 17:
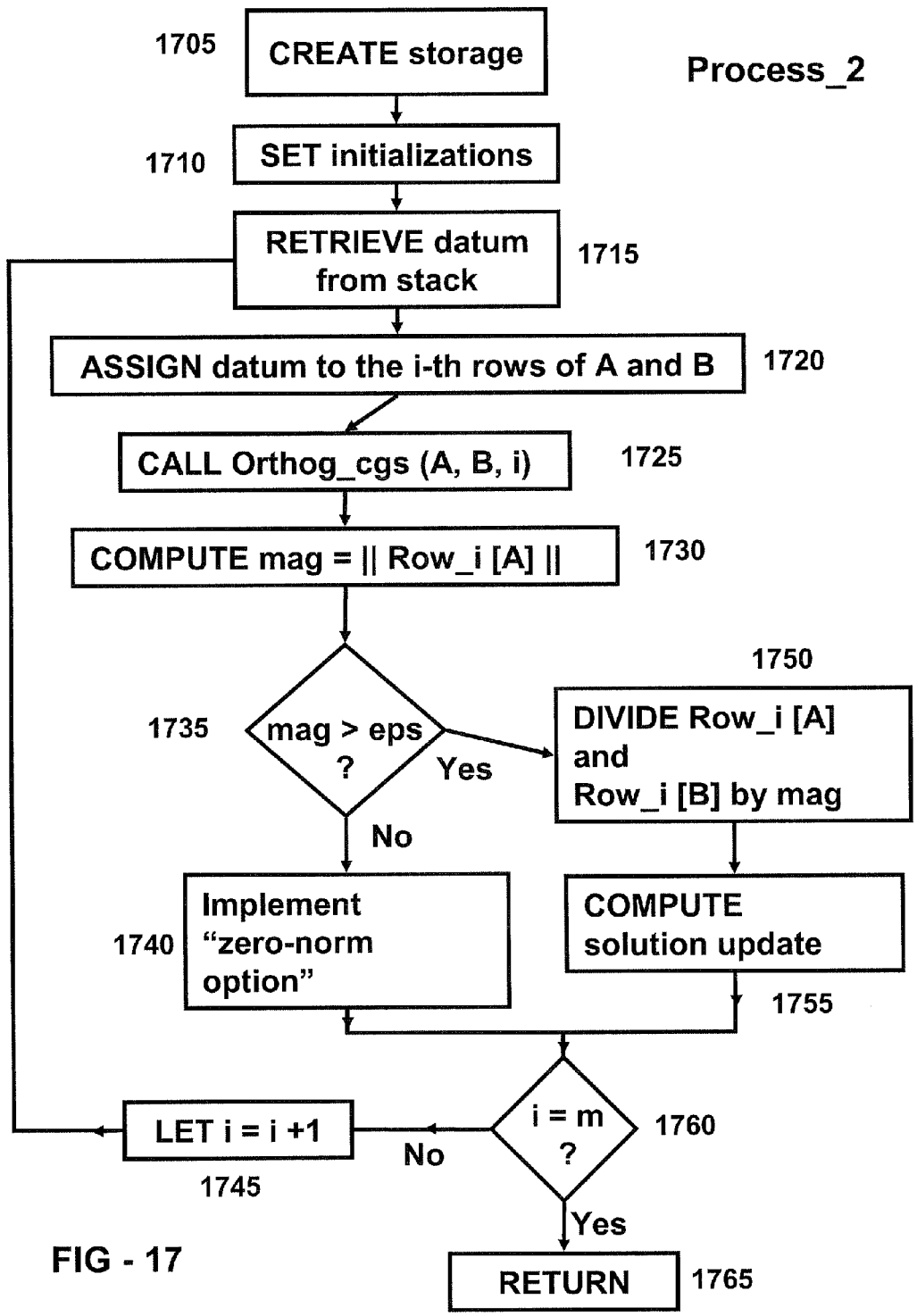
FIG. 17 illustrates a detailed flowchart corresponding to Process 2 in accordance with an embodiment of the present invention.

The first process (1630) is responsible for creating and/or transferring the data onto the stack (1640), from where it is accessed by the second process (1650). For this embodiment, each datum produced by 1630 corresponds to the numbers in one of the m equations in AX=B (i.e., the same row from A and B). Step 1640 may be conveniently implemented as a first-in-first-out stack, although other data structures are possible. Step 1650 is shown in expanded detail in FIG. 17. It begins at 1705 by creating storage for the matrices A and B. The details of creating storage for other quantities, such as $X_p$, are suppressed. At 1710 the particular solution matrix $X_p$ is initialized to an n x p zero matrix, and the index i is set to 1. The next step is 1715, which is the start of a loop structure (over i). Step 1715 accesses data from 1640, when it is available; if data is not available, 1715 waits. This situation is common in threading/signaling applications, the details of which should be well-known to the practitioner and are therefore omitted. When a datum has been retrieved at 1715, it is assigned as the i-th rows of A and B in 1720. The steps from 1725 to 1760 have basically already been seen in the function $ROP_2(A,B)$. The main difference is at 1755, in which $X_p$ is updated in each pass. Upon the i-th pass through 1755, $X_p$ is updated to $X_p + X_p^{(i)}$, where $$X_p^{(i)} = Col_i[(A')^*]Row_i[B']$$

After m rows of data have been retrieved by 1650 from 1640, the control step 1760 will pass to 1765. This will cause 1620 to exit and pass to 1660. At this point any computations that were not done in 1755 may be done. Following this the program is complete. Also, note that 1630 may finish before 1650.

This program is described as "online" because the computations (e.g., 1725 through 1760) are done concurrently or nearly concurrently with the data production process (1630). In fact, following the arrival of the last datum from 1640, there is very little work left to be done by 1650. Observe that in the other ("offline") algorithms, the total time involved is the time for the data to become available plus the time to solve AX=B. However, in this online case, the total time can be reduced, approximately, to only the time for the data to arrive. There are real-world examples where the delay due to the data availability is large enough for this to occur. In such circumstances, the extra time needed to solve AX=B is essentially zero with this algorithm. So with respect to this measure, this algorithm essentially cannot be improved upon. As another point of contrast, it is not feasible to similarly adapt the QR or LU methods to online versions, since both require full matrices at the outset in order to solve the triangular systems of equations (with back-substitution).

Another advantage results from the fact that the magnitude of the particular solution is non-decreasing. This permits a user or program to ascertain a feature of the solution before the full solution has been formed. There are many situations in which this could be useful: for example, in imaging problems where one may wish to know minimum values for the total density. In such a case, a user may have the option of ending the program before the solution is completed.

The total set of available features in this embodiment is $\{X_p, X_h, X, P, A'\}$; from this the "feature set" may be chosen. It would be straightforward to modify this so that G would be computed; in that case G and M would also be available as features. In that circumstance, G would be incremented at 1755 and M would be initialized to $I_m$ at 1710. Variations in addition to this are to concurrently compute multiple features within 1755. Still another variation is for 1650 to retrieve data from 1640 in blocks of rows, and operate on them concurrently; currently the rows are retrieved individually. Another variation is to place 1725 and 1755 into separate, concurrent processes (as alluded to earlier). These variations illustrate how this algorithm offers a rich set of possibilities for parallelization on modern computers.

In the following, the embodiment is used to process the same example data as used previously. In the expressions below, the "input data" for the rows of A and B are from the newly acquired datum that was retrieved by 1650 from 1640. Double-hyphens in a matrix indicate that no data has been entered there yet. Also, the "intermediate results" are how A, B, and $X_p$ appear following the i-th update at 1755. After i=3, the updates are complete, and the last A and B may be identified with A' and B', respectively. Also, note how the norm of each of the columns of $X_p$ is non-decreasing with respect to i.

i=1
input data:

$Row_1[A] = (0, -3i, 0)$ $Row_1[B] = (1, -3i)$ intermediate results:

$$A = \begin{bmatrix} 0 & -i & 0 \\ -- & -- & -- \\ -- & -- & -- \end{bmatrix}, B = \begin{bmatrix} 1/3 & -i \\ -- & -- \\ -- & -- \end{bmatrix}, X_p \begin{bmatrix} 0 & 0 \\ i/3 & 1 \\ 0 & 0 \end{bmatrix}$$

i = 2.

input data:

$Row_2[A] = (2i, 1, -1)$ $Row_2[B] = (2i, 2)$ intermediate results:

$$A = \begin{bmatrix} 0 & -i & 0 \\ 2i/\sqrt{5} & 0 & -1/\sqrt{5} \\ -- & -- & -- \end{bmatrix},$$

$$B = \begin{bmatrix} 1/3 & -i \\ i\sqrt{5}/3 & 1/\sqrt{5} \\ -- & -- \end{bmatrix}, X_p \begin{bmatrix} 2/3 & -2i/5 \\ i/3 & 1 \\ -i/3 & -1/5 \end{bmatrix}$$

i = 3.

input data:

$Row_3[A] = (4i, 2-3i, -2)$ $Row_3[B] = (1+4i, 4-3i)$ intermediate results:

$$A = \begin{bmatrix} 0 & -i & 0 \\ 2i/\sqrt{5} & 0 & -1/\sqrt{5} \\ 0 & 0 & 0 \end{bmatrix},$$

$$B = \begin{bmatrix} 1/3 & -i \\ i\sqrt{5}/3 & 1/\sqrt{5} \\ 0 & 0 \end{bmatrix}, X_p \begin{bmatrix} 2/3 & -2i/5 \\ i/3 & 1 \\ -i/3 & -1/5 \end{bmatrix}.$$

Column Orthonormalization Procedures

The algorithm to be described may be used to solve a system of linear equations AX=B for X, as well as compute the generalized inverse of A. The exact nature of the solution will be clarified later. The algorithm makes heavy use of column operations on A, which can be realized by multiplication on the right by a product of suitable matrices. Note the matrices $M_k$ need not be elementary matrices. In practice, one does not normally explicitly form these matrices, but rather directly implements the column operations on A.

Figure 19:
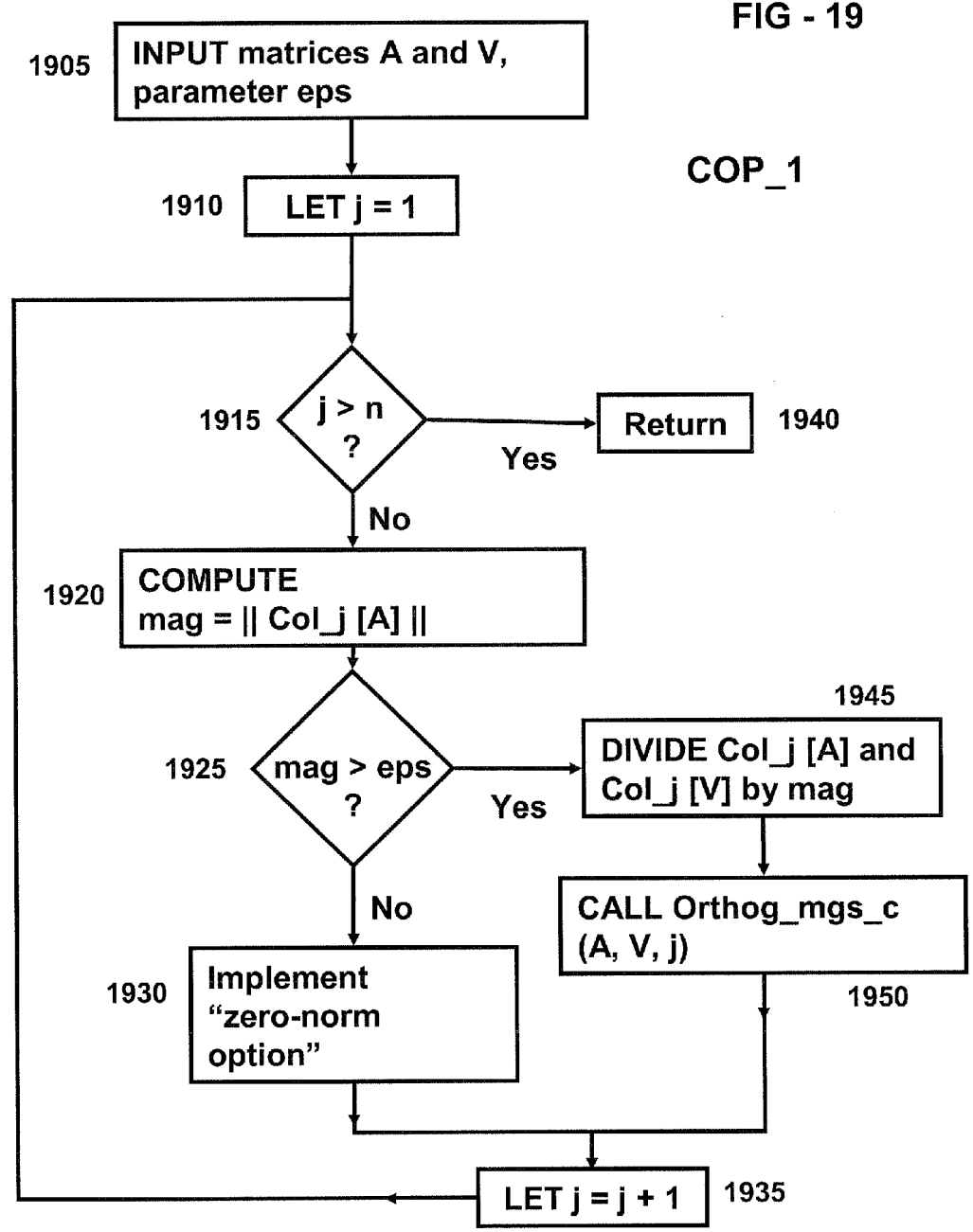
FIG. 19 illustrates a column orthonormalization procedure ("COP") based on the modified Gram-Schmidt procedure altered to accept an auxiliary matrix V and a parameter eps, as well as implement a "zero-norm option", in accordance with an embodiment of the present invention.
Figure 20:
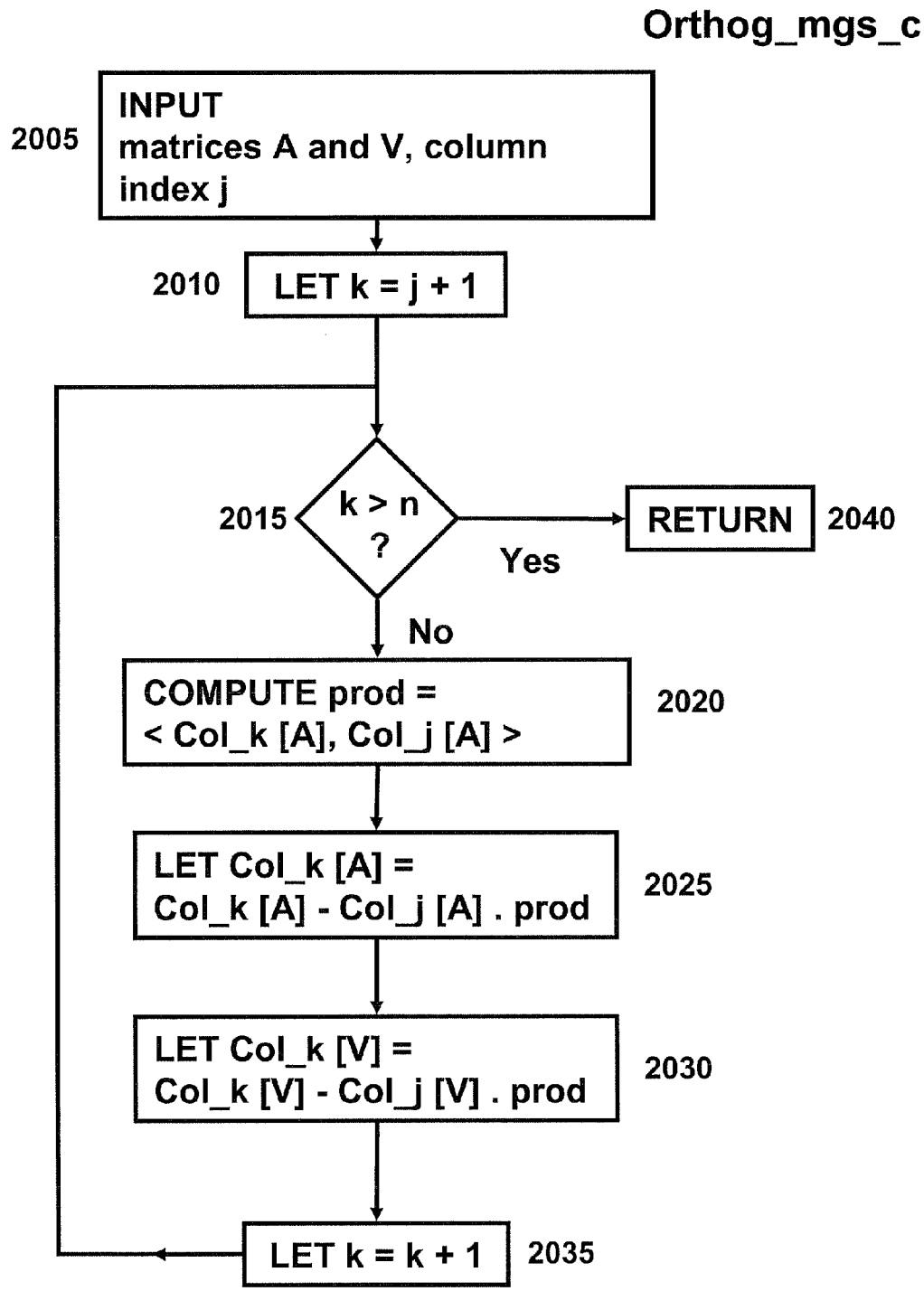
FIG. 20 illustrates a function which performs a series of orthogonalizations between the j-th column of A and columns with higher indices, as well as performing similar operations on an auxiliary matrix V in accordance with an embodiment of the present invention.
Figure 21:
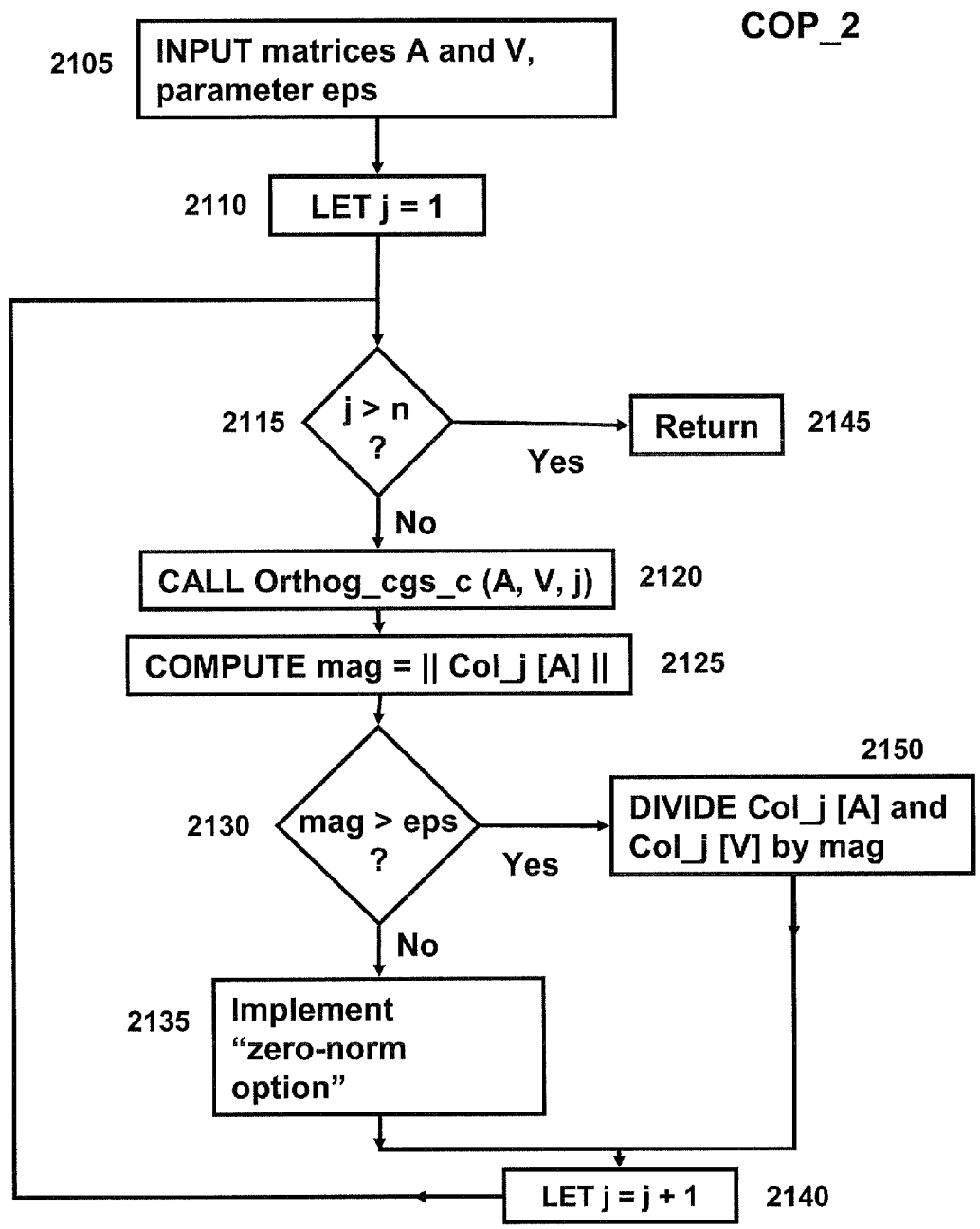
FIG. 21 shows a COP based on the classical Gram-Schmidt procedure altered to accept an auxiliary matrix V and a parameter eps, as well as implement a "zero-norm option", in accordance with an embodiment of the present invention.
Figure 22:
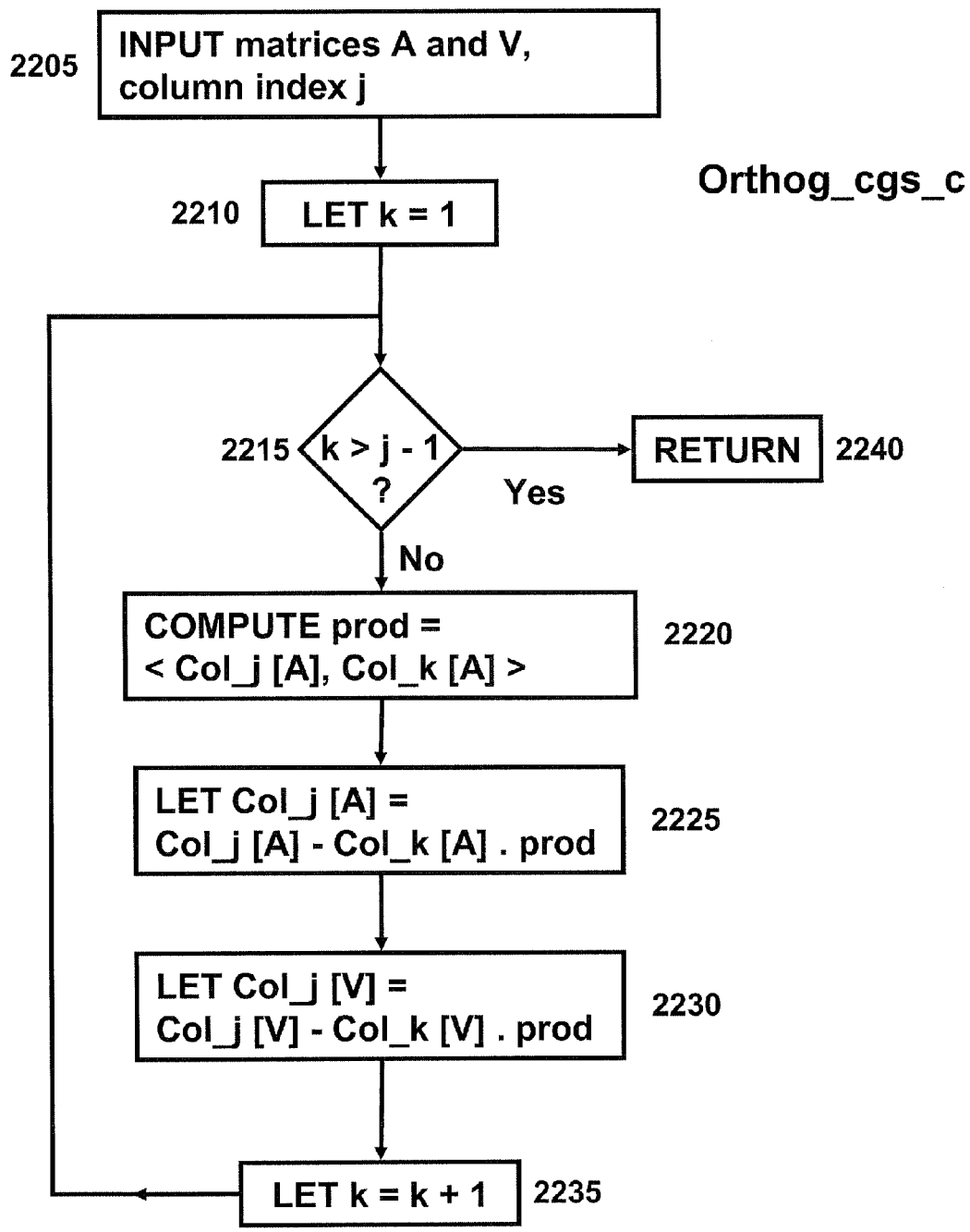
FIG. 22 depicts a function which performs a series of orthogonalizations between the j-th column of A and columns with lower indices, as well as performing similar operations on an auxiliary matrix V in accordance with an embodiment of the present invention.

Two methods will be relied on here that attempt to orthonormalize the column vectors of A; they are defined as "column orthonormalization procedures" (COP). The first is named $COP_1$, and is based on the modified Gram-Schmidt (MGS) method (see FIG. 19), and the latter is named $COP_2$ (see FIG. 21) and is based on the classical Gram-Schmidt (CGS) method. Each is closely aligned with the Gram-Schmidt methods, but is modified to more closely operate with the main algorithm (see FIG. 20 and FIG. 22). For example, each allows for input of an auxiliary matrix V (cf. 1905 and 2105), and performs similar operations on it as with A. Also, each uses a cutoff (cf. 1925 and 2130), to account for the limitations of machine precision of decimal numbers. Finally, each gives the user options for dealing with column vectors that are effectively zero; these are named the "zero-norm options" (cf. 1930 and 2135). Some (but not all) of the "zero-norm options" for an (effectively) zero column are to: 1) remove the column from A and re-size the matrices/vectors; 2) set the column exactly to zero; and 3) delay having the COP operate on the column. Also, note that the order that the columns are treated in the COP is at the discretion of the implementer of the algorithm. Thus items such as 1930 and 2135 represent a choice, not a necessity. In addition, one could also choose to apply the orthonormalization procedure twice, to improve its accuracy. Also recall that orthonormalization consists of orthogonalization and normalization. As such, the COP could be split up to perform these tasks separately. This type of approach is considered as an equivalent variation. Also, other algorithms could be used to affect the same result as a COP. These and other minor changes are considered to merely be variations on the ideas already presented.

The algorithm begins by applying the COP on the right hand side of A. Since A occurs in the context of the equation AX=B, a column operation on A must be paired with its inverse (which will always exist in the present case). For example, if successive column operations on A are represented in matrix form as $M_1, M_2, \ldots$, then AX=B will become $AMM^{-1}X=B$, where $M=(M_1M_2\ldots)$ denotes the cumulative effect of the column operations. Upon defining A'=AM, the transformed equation appears as $A'M^{-1}X=B$. At this point the nonzero columns in A' are orthonormal. From this the particular solution is easily found as $X_p = GB$ $G = M(A')^*$ where G is identified as the generalized inverse. The complete solution is written in general as $X=X_p+X_h$, where the homogeneous solution $X_h$ may be derived, for example, from the null space projection operator as $$X_h = PY$$

$$P = I_n - GA$$

for a suitably-sized, arbitrary matrix Y. The above description may be encapsulated in an algorithm as follows. Given A and B, initialize a matrix M as $I_n$. Next, perform identical column operations on A and M; the column operations should implement a COP on A, as described earlier. Finally, form the particular solution and generalized inverse as stated above. The algorithm allows for variations and additional operations. For example, it may be advantageous to precondition A, or to permute elements of A to help improve numerical stability.

Given the above description, a complete set of solution features might be given as: $X_p$, $X_h$, X, G, P, M. Of course, $X_p$, $X_h$, and X are traditionally recognized as the solution, but the last three quantities are essentially equivalents: G easily leads to $X_p$ and P; and M leads to G. Depending on the embodiment, the user may only wish to compute a portion of these features; this is called the "feature set" and will be specified by the user at the beginning of each embodiment.

A first feature is that the generalized inverse G is a Moore-Penrose inverse when A has full column rank, and is a {123}-inverse otherwise. Such an easy and direct method for computing this type of generalized inverse is not known to already exist. This G projects out the inconsistent pieces of B, yielding a least squares solution when the data are inconsistent. When the data are consistent, it yields an exact solution of AX=B.

A second feature is that this algorithm nowhere requires the solution of a triangular system of equations, as is normally the case for solvers of Ax=b. Instead, the operations are entirely in terms of vectors and matrices. This is advantageous for implementations on the newer architectures of today, which often utilize specially written libraries that are based on operations among vectors and matrices.

A third feature derives in part from a rewriting of a matrix product using the outer product expansion. For example, G may be rewritten as $$G = M(A')^* = \sum_j G^{(j)}$$

$$G^{(j)} = \text{Col}_j[M]\text{Row}_j[(A')^*].$$

Using this expansion, it is possible to re-express various solution features. For example, $$X_p = \sum_j X_p^{(j)}$$

$$X_p^{(j)} = G^{(j)}B.$$

This summation form is useful since it is possible to compute the j-th term in the sum following the j-th loop in the COP (since the j-th column vectors of M and A' no longer change after the j-th loop). The result is that the solution can be built up in increments. Also, it's possible to use this approach to incrementally compute other features of the solution, such as P, $X_h$, X, and G.

Finally, while the algorithm does not use a QR decomposition per se, it does effectively appear. However, it is what happens in addition to the QR decomposition which makes the above such a new and advantageous algorithm. Of course, the most distinguishing new feature is that the solution of a set of triangular equations is effectively replaced with more efficient (and elegant) matrix-matrix, and matrix-vector, multiplications. The elegance of an algorithm is important because it reduces the barrier to implementing the code in parallel, which by itself significantly raises the complexity.

Figure 23:
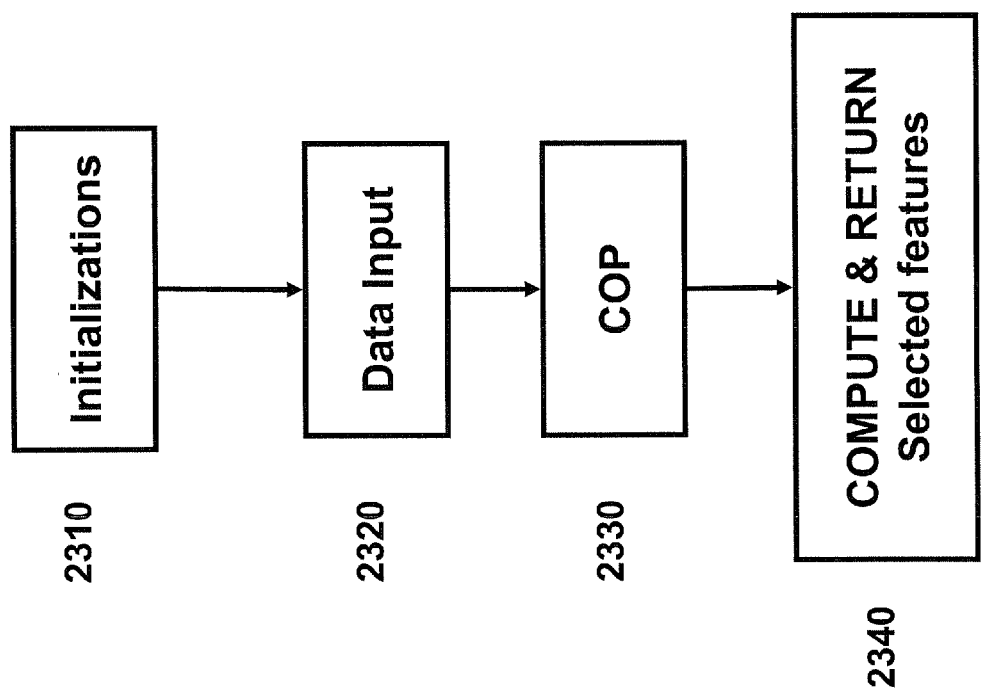
FIG. 23 illustrates a coarse-scale flowchart for an algorithm wherein the main steps are done sequentially in accordance with an embodiment of the present invention.
Figure 24:
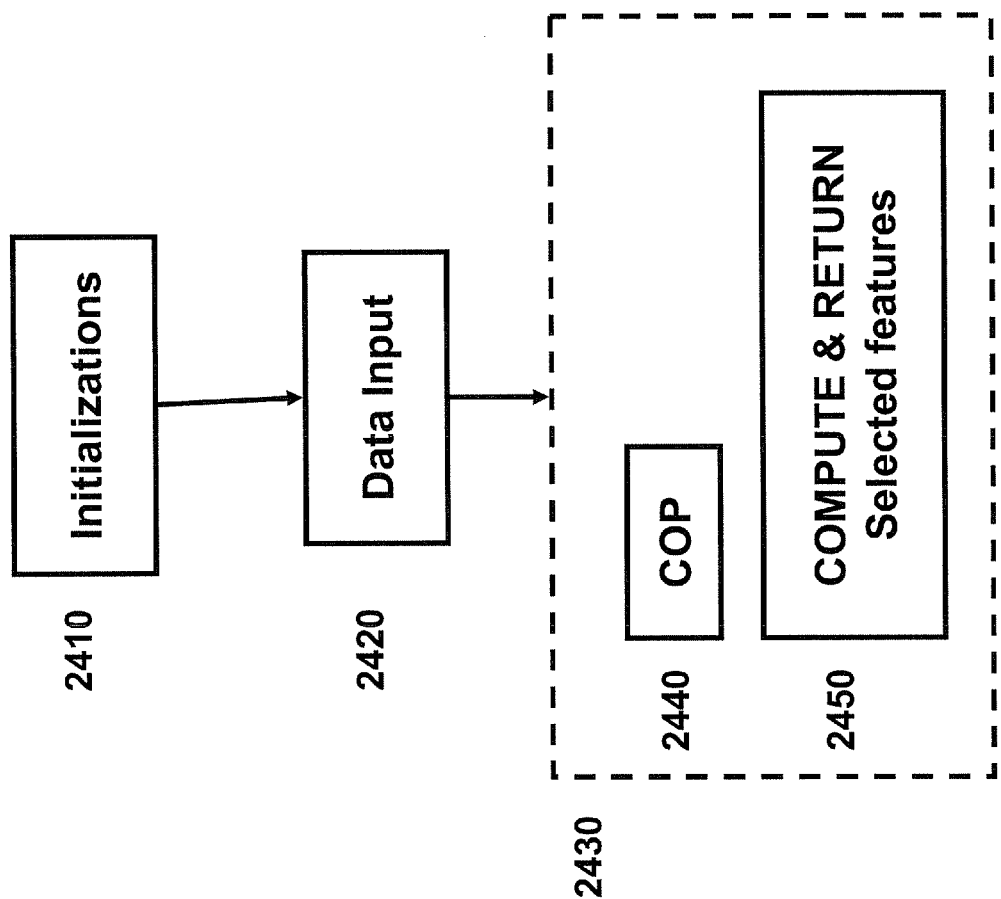
FIG. 24 illustrates a coarse-scale flowchart for an algorithm wherein a COP and computation/outputting of a solution are done concurrently in accordance with an embodiment of the present invention.
Figure 25:
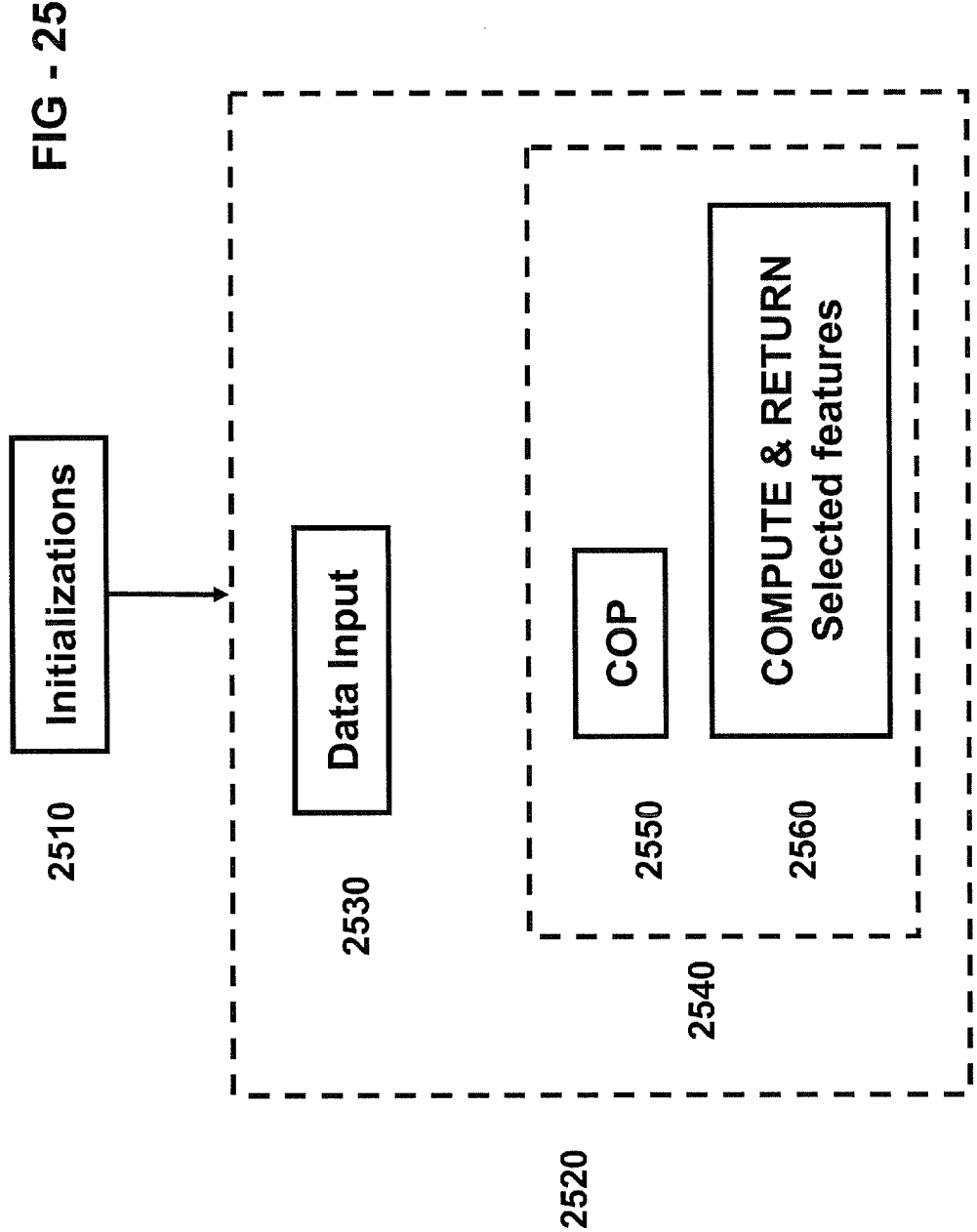
FIG. 25 illustrates a coarse-scale flowchart for an algorithm wherein data inputting, COP, and the computing/outputting of a solution are done concurrently in accordance with an embodiment of the present invention.
Figure 26:
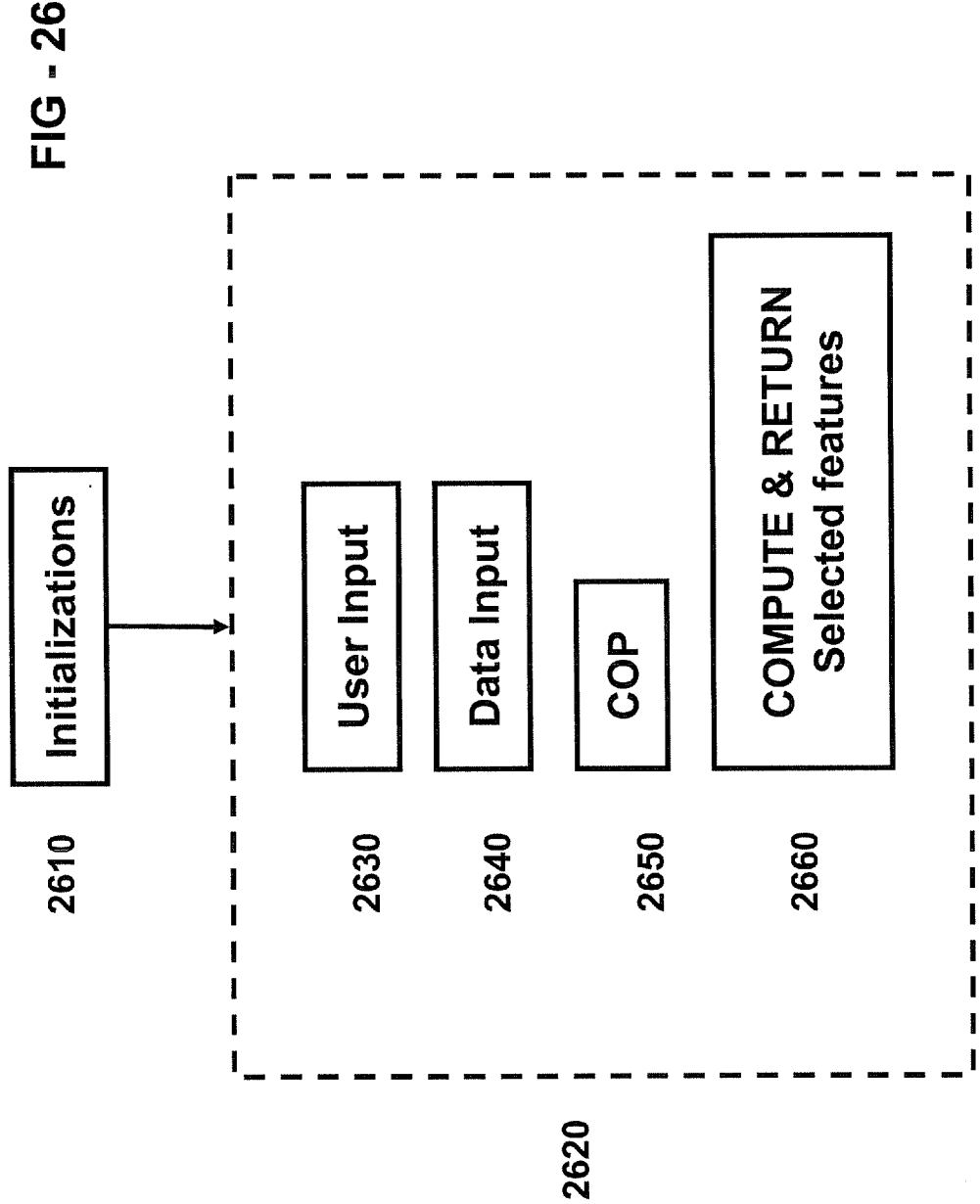
FIG. 26 illustrates a coarse-scale flowchart for an algorithm wherein all sub-processes are performed concurrently, or at least nearly so, in accordance with an embodiment of the present invention.

In formulating the above algorithm into a flow chart, attention will be paid not just to its variations but also to the order in which the steps are done: i.e., serially or in parallel. A reason for this is that the algorithm is suited for concurrent execution on modern computers, such as those with vector, parallel, and distributed architectures, and so it may well be implemented in all these manners. In addition, the flowcharts will first be shown at a coarse level of detail, and then at a moderate level. For example, if the steps of the above algorithm are done serially, a coarse level flowchart would be as in FIG. 23; the first embodiment is consistent with this. Note that the 2310 includes user input (e.g., feature set, eps, matrix dimensions), as well as program initializations (e.g., creating storage and initializing variables). When that is complete the data is read in at 2320, and the algorithm is performed at 2330 and 2340. It will be seen in a second embodiment that the steps of the COP and the formation of the solution may be done concurrently. In this case, the flowchart should be drawn as in FIG. 24; note that the steps inside the dashed box (i.e., 2430) are executed (nearly) simultaneously. Finally, in a third embodiment, it will be shown that it is possible to perform at least three of the steps concurrently. The appropriate coarse-scale flowchart for this case is FIG. 25; note how the data inputting in 2530 is done concurrently with 2540. A variation on this flowchart would have 2550 and 2560 performed concurrently. The final logical step in this progression is to also allow for user input during the running of the algorithm; this might be preferred should the user wish to decide on zero norm options while the program is running, for example. In this instance all the steps would be grouped together as in FIG. 26; note how the user input at 2630 was separated from the initializations at 2610.

The algorithm under discussion is intended to be used within computer software/hardware as a program. There are no notable restrictions on what kind of hardware or computer architecture is appropriate. For purposes of illustrative example only, an exemplary architecture is given in FIG. 27. It is meant to display a shared address space, with distributed memory and processors. In this example, communication is achieved via a bus (2720); it is also common to do so with message passing. Other interconnection topologies are also possible.

The processing elements are $P_{main}$ and $P_1$ through $P_n$. Each element includes a processor, registers, cache, memory, etc. $P_{main}$ is the main processor, and it is here that the program is launched by the user (2710). The permanent storage for the data (e.g., databases) is represented by $D_{main}$, $D_{extra}$, and $D_1$ through $D_n$. This is where the data for the matrices A and B are stored, as well as the output data M, G, etc. The input/output subsystems are not explicitly shown, and are taken to be built into the hardware.

Figure 28:
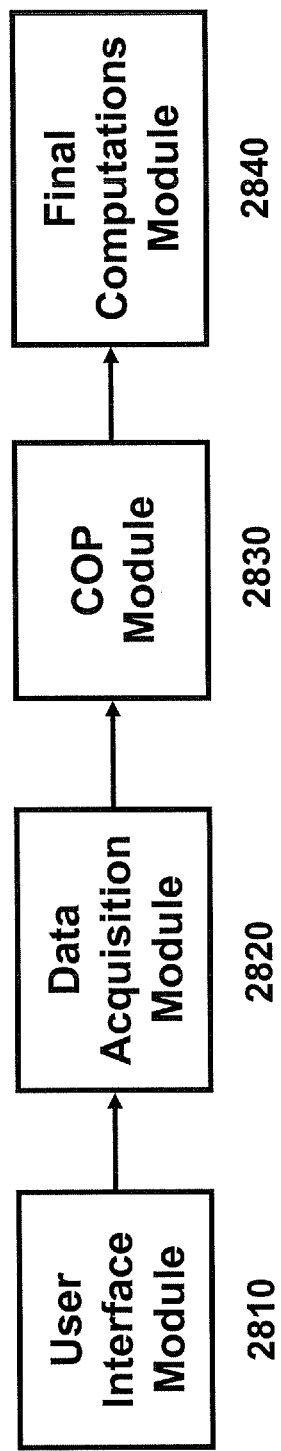
FIG. 28 shows modules of a program that utilize an algorithm in sequential execution in accordance with an embodiment of the present invention.

The main parts of this program are depicted in FIG. 28. It begins with the "user interface module" (2810), which interacts with both user and program. This module is responsible for accepting parameter specifications from the user and launching the program. Following that, control in the program is passed to the "data acquisition module" (2820). This module is responsible for retrieving the data set specified in 2810 and loading it into local memory (in each processing element) or local storage. If all the data cannot fit into memory, data will have to be moved between memory and storage during the program.

Following this, the data is in local memory/storage and ready to be used. The program then passes control to the "COP module" (2830), which performs the bulk of the computations. This module performs the computations and manipulations to carry out the column orthogonalizations previously outlined in FIGS. 19 through 22. When this module has completed execution, stored data that had represented A will now represent that for A'. Also, storage for an identity matrix that was created in 2810 will now represent the data for M. The next step involves a "final computation module" (2840). This module is responsible for carrying out computations behind the formulae that were given earlier. For example, this module computes a particular solution $X_p$ by forming a matrix product M(A')*B. When this module completes, the program terminates.

As an example, the above modules are revisited in the context of one of the applications discussed earlier—that of ranking web pages on the internet, which can be used in conjunction with an internet search engine. Ranking web pages may be modeled as a Markov process, in which the governing equation is Tx=x. The j-th component of the n dimensional vector x is the probability to be at the "j-th web page", and the (i, j)-th component of T represents a probability that a user will go to page #i, starting from page #j. Without getting into the details of this application, it suffices to know that T may be determined by statistical data, and that one is interested in computing x. As mentioned in the applications section, this is equivalent to solving Ax=b upon identifying A=T-$I_n$ and b=0. With respect to the modules, the user would select to compute the null space projection operator P in 2810, since this leads directly to $x_h$ ($x_p$ is zero). Thus the "feature set" consists of P. The data would be pulled in by 2820 and brought into local memory/storage. If T had been stored then it could be converted to T-$I_n$ at this point. Also, M is initialized to $I_n$. In 2830, the COP would act on T-$I_n$ and M, orthogonalizing the columns of A=T-$I_n$, and acting on M similarly (as described earlier); the result of this is A' and M. The module 2840 contains the final computations, which implement the mathematical ideas and algorithms mentioned earlier. In this example, the null space projection operator would be computed as P=$I_n$-GA; the relation $x_h$=Py allows one to compute $x_h$.

This example is only representative. There are many more to choose from, such as the myriad applications that take advantage of the "least squares" nature of the solution.

The following numerical example for this application uses the transition matrix $$T = \frac{1}{6} * \begin{bmatrix} 0 & 3 & 0 & 3 & 0 \\ 2 & 0 & 0 & 3 & 0 \\ 2 & 0 & 0 & 0 & 3 \\ 2 & 3 & 6 & 0 & 3 \\ 0 & 0 & 0 & 0 & 0 \end{bmatrix}.$$

Note that the columns sum to 1.0, as they should. The (truncated) null space projection operator that is computed in 2840 is $$P = \begin{bmatrix} 0 & 0 & 0 & 0.8999 & 0 \\ 0 & 0 & 0 & 0.7999 & 0 \\ 0 & 0 & 0 & 0.3 & 0 \\ 0 & 0 & 0 & 1.0 & 0 \\ 0 & 0 & 0 & 0.0 & 0 \end{bmatrix}.$$

At this point the program is essentially finished, as one of the features of the solution (i.e., P) has been computed. The solution is found by noting that $x_h$=Py is proportional to $y_4$ and $Col_4$[P], and since x must have components that sum to 1.0, normalization gives $$x_h = \begin{pmatrix} 0.2999 \\ 0.2666 \\ 0.1 \\ 0.3333 \\ 0 \end{pmatrix}.$$

The following is an example that takes advantage of the least-squares nature of the solution. Numerous experimental situations call for curve-fitting. In this circumstance, there are more sets of data than are needed to fit the points to the curve—i.e., the equations are over-determined. A classic example is that of tomography, such as CT-scans. The X-ray data taken is more than needed for a solution, but repeat measurements are made to help "average out" the errors. A similar but simpler application, more suitable for discussion herein, is that of fitting a position (s) versus time (t) curve to a set of data. The data for this example is ($s_i$, $t_i$): (-0.18, 0.1), (0.31, 0.2), (1.03, 0.3), (2.48, 0.4), (3.73, 0.5), where i=1, . . . , 5, and the curve is s=$a_0$+$a_1$t+$a_2t^2$. There are three unknowns ($a_0$, $a_1$, $a_2$), and thus the task is to solve five equations for the three unknowns; these equations are over-determined and inconsistent as well. The quantities in Ax=b are defined as $$A = \begin{bmatrix} 1 & t_1 & t_1^2 \\ 1 & t_2 & t_2^2 \\ 1 & t_3 & t_3^2 \\ 1 & t_4 & t_4^2 \\ 1 & t_5 & t_5^2 \end{bmatrix}, x = \begin{pmatrix} a_0 \\ a_1 \\ a_2 \end{pmatrix}, b = \begin{pmatrix} s_1 \\ s_2 \\ s_3 \\ s_4 \\ s_5 \end{pmatrix}.$$

Now consider the role of the modules in FIG. 28 with respect to this application. The user initiates the program in 2810, selecting $x_p$ as the sole component of the feature set. Next, the data would be pulled in by 2820 and brought into local memory/storage. At this point M is initialized to $I_n$. In 2830, the COP operates on A and M, orthogonalizing the columns of A, and acting on M similarly (as described earlier); the result of this is A' and M. In this case they are (in truncated form)

$$A' = \begin{bmatrix} 0.4472 & -0.6324 & 0.5345 \\ 0.4472 & -0.3162 & -0.2672 \\ 0.4472 & 0.0 & -0.5345 \\ 0.4472 & 0.3162 & -0.2672 \\ 0.4472 & 0.6324 & 0.5345 \end{bmatrix}, M = \begin{bmatrix} 0.4472 & -0.9486 & 1.8708 \\ 0.0 & 3.1622 & -16.0356 \\ 0.0 & 0.0 & 26.7261 \end{bmatrix}.$$

Finally, the module 2840 implements the steps behind the algorithm as described earlier, and returns the following particular (least-squares) solution $$x_p = \begin{pmatrix} -0.3980 \\ 0.3471 \\ 16.0714 \end{pmatrix}.$$

The above examples are exemplary only. There are many more to choose from.

Figure 27:
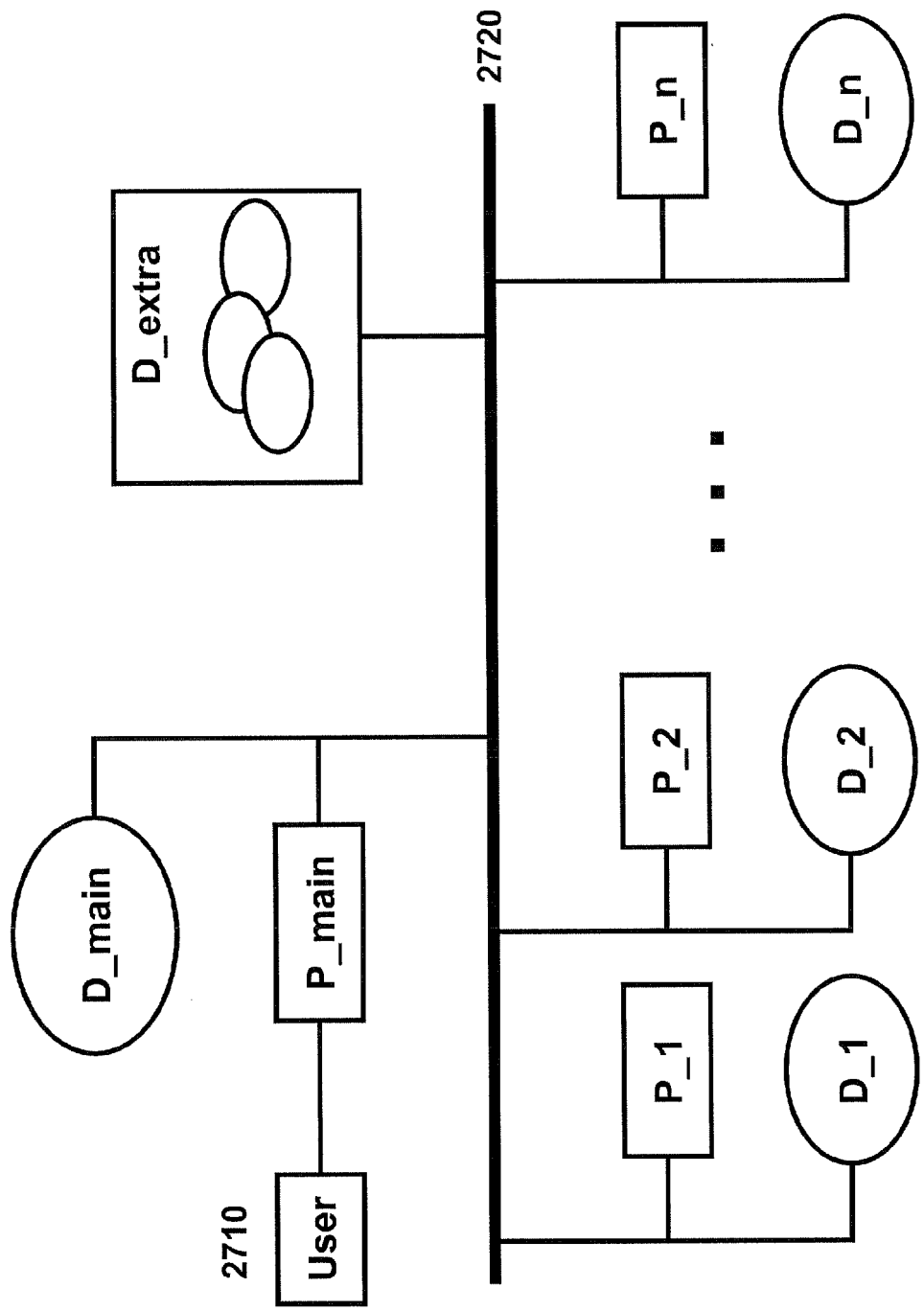
FIG. 27 depicts an exemplary architecture that is meant to display a shared address space, with distributed memory and processors, in accordance with an embodiment of the present invention.
Figure 29:
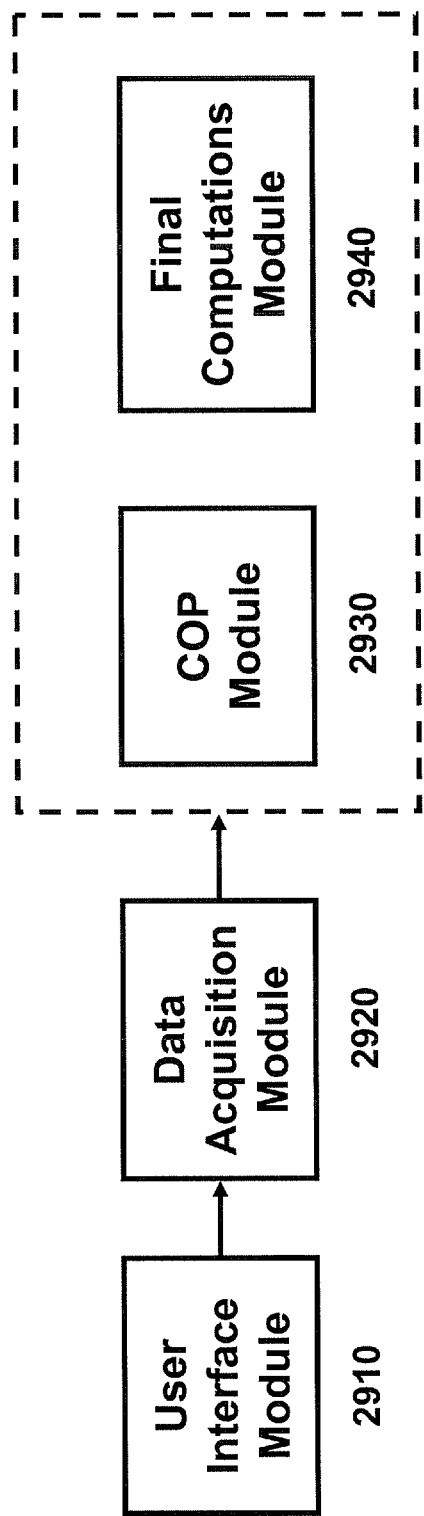
FIG. 29 shows modules of a program that utilize an algorithm in which certain modules are executed concurrently and others are done sequentially.
Figure 30:
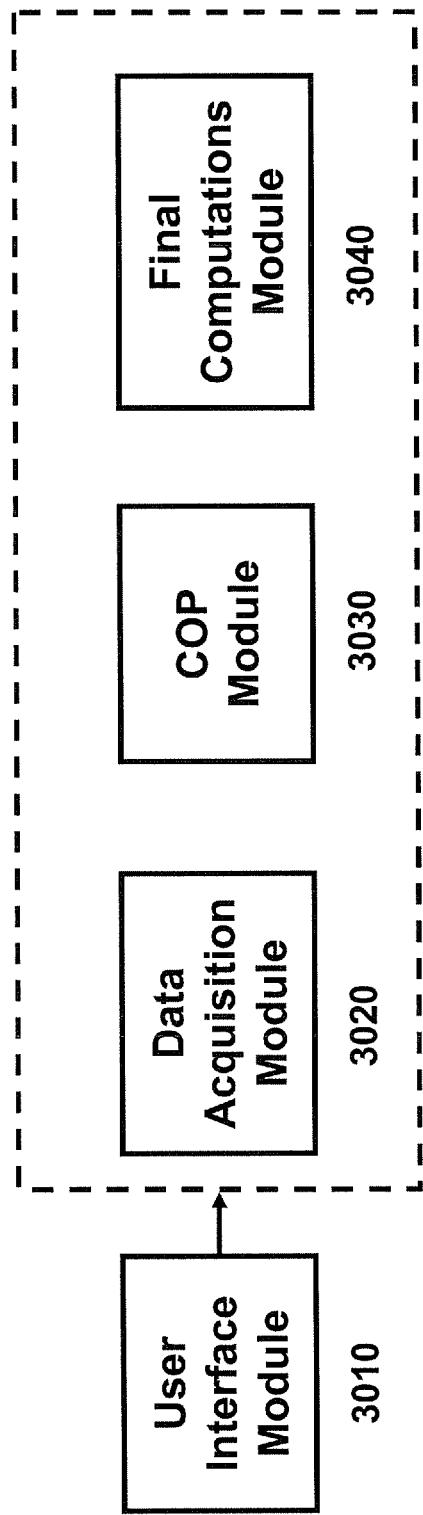
FIG. 30 shows modules of a program that utilize an algorithm in which certain modules are executed concurrently in accordance with an embodiment of the present invention.

Some final points regarding the usage of this program concern implementations that use concurrent processing. As FIG. 27 is given, it gives no special consideration to this possibility. As will be seen in some of the embodiments, some of the modules may be executed concurrently. For example, in the second embodiment, the COP and the computation of the solution are done concurrently. In terms of the modules, this is conceived as FIG. 29, in which the modules within the dashed box (i.e., 2930 and 2940) are computed concurrently. Also, the third embodiment displays more concurrency. This is similarly described in FIG. 30, in which the concurrent execution of 3020, 3030, and 3040 is denoted by enclosing them together in a box.

Exemplary Embodiments

Next, several algorithms that are based on the above formulae and ideas will be displayed. In the mathematical formulae and text, a prime on A (i.e., A') was used to indicate that A had changed. However, in the flowcharts to follow, primes will not be used and it will be understood that the entries in A are simply written over (as is the convention with computer code). Also, the dimensions of the matrices (i.e., m, n, and p) are taken to be global parameters, and do not need to be explicitly passed in function calls. Finally, these are not all the embodiments that are possible. They should not be viewed as limitations, but rather as examples.

Embodiment #1

Figure 31:
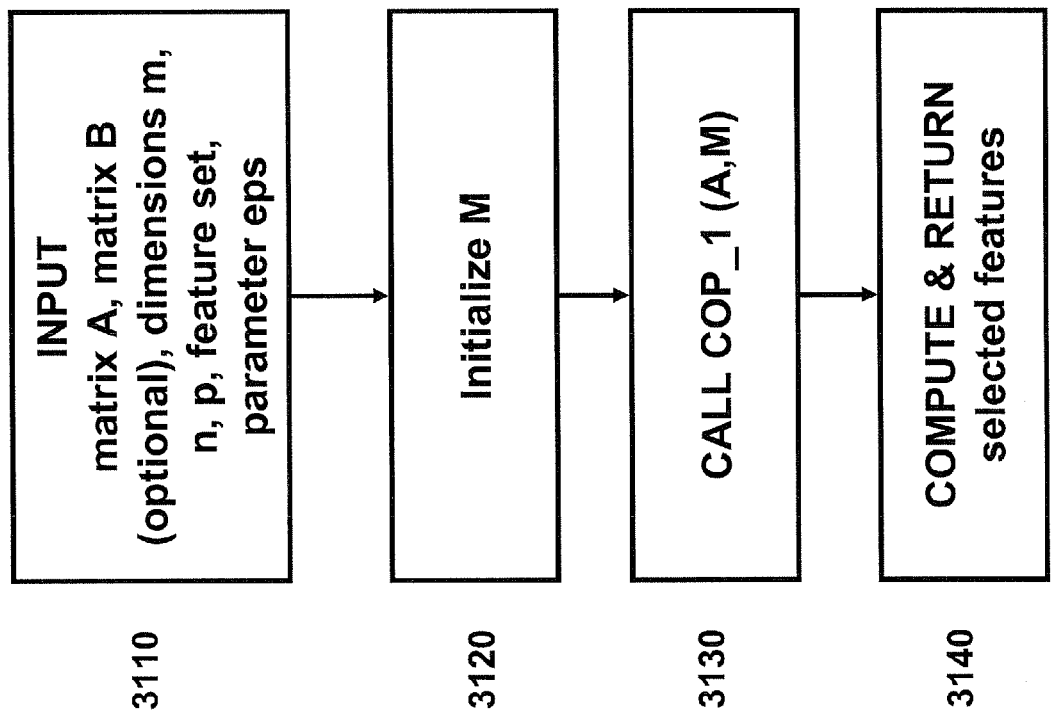
FIG. 31 illustrates a general sequence of steps for a first embodiment, in which AX=B is solved by computing a generalized inverse G in accordance with an embodiment of the present invention.

The first embodiment computes the solution of AX=B for an arbitrary number of B. An intended application is one that seeks to solve a set of linear equations while minimizing the storage requirements due to B. Another intended application is one that primarily seeks quantities such as G or P. As shown in the flowchart (FIG. 31), the algorithm begins at 3110 with the user supplying A (and optionally B and Y), the dimensions m, n, and p, along with the feature set and eps. The auxiliary matrix M is then created and initialized to an n×n identity matrix ($I_n$) at 3120. At 3130, $COP_i$ is called, and transforms A into A', and M (=$I_n$) into M (=$M_1 M_2 \ldots$). This step corresponds to transforming AX=B to A'M$^{-1}$X=B. Finally, at 3140, the aspects of the solution that were specified at 3110 in the "feature set" are computed and returned. The total set of available features in this embodiment is $\{X_p, X_h, X, G, P, M, A'\}$; from this the "feature set" may be chosen. This algorithm may be composed from operations on matrices and vectors, for example. This facilitates its implementation on modern vector and parallel processors.

This embodiment may be illustrated using the following data:

$$A = \begin{bmatrix} 0 & -3i & 0 \\ 2i & 1 & -1 \\ 4i & 2-3i & -2 \end{bmatrix}, B = \begin{bmatrix} 1 & -3i \\ 2i & 2 \\ 1+4i & 4-3i \end{bmatrix}.$$

Also, M is initialized as a 3×3 identity matrix at 3120. Following the call to $COP_1$ at 3130, A and M become $$A' = \begin{bmatrix} 0 & -i\sqrt{5/6} & 0 \\ i/\sqrt{5} & (2i/5)\sqrt{5/6} & 0 \\ 2i/\sqrt{5} & (-i/5)\sqrt{5/6} & 0 \end{bmatrix},$$

$$M = \begin{bmatrix} 1/(2\sqrt{5}) & (1/30)\sqrt{5/6}(6+5i) & -i/2 \\ 0 & (1/3)\sqrt{5/6} & 0 \\ 0 & 0 & 1 \end{bmatrix}.$$

If the user had included $X_p$ in the feature set, it would be computed as $$X_p = \begin{bmatrix} 5/6 & -i/2 \\ i/3 & 1 \\ 0 & 0 \end{bmatrix}.$$

Likewise, if G or P were included, the results would be $$G = \frac{1}{36} \begin{bmatrix} 6i-5 & 2-6i & -1-6i \\ 10i & -4i & 2i \\ 0 & 0 & 0 \end{bmatrix}, P = \begin{bmatrix} 0 & 0 & -i/2 \\ 0 & 0 & 0 \\ 0 & 0 & 1 \end{bmatrix}.$$

Recall that the general solution to AX=B is X=$X_p$+$X_h$, where $X_h$=PY and Y is a 3×2 matrix (with arbitrary entries from the complex number field.) The choice of the size of eps depends on many practical issues. However, if the above example were implemented with a precision of 15 decimal digits, it would suffice to take eps=$10^{-10}$. This value for eps may be used in the other embodiments as well.

Embodiment #2

This second embodiment (see FIG. 32) is an example of how to change the order of the steps in the first embodiment so that some of them may be executed concurrently. It takes advantage of the incremental updating of G that was discussed earlier. The algorithm begins at 3205 with the user inputting: A, (and optionally B and Y), the dimensions m, n, and p, the feature set, and eps. At 3210, various initializations are performed; in particular one sets M=$I_n$ and $X_p$=0. The reason for the latter initialization is that it will be incremented at 3265. The next step 3215 and indeed many of the other steps have already been seen in FIG. 19. One difference is at 3255, which now includes two parts that are executed concurrently: an orthogonalization step is done (3260), while the solution is updated (3265). In the case of the particular solution $X_p$, it would be updated at the j-th pass through 3265 to become $X_p$+$X_p^{(j)}$. Thus, when 3265 finishes, these would be the values for $X_p$ in the j-th loop for j=1, 2, and 3:

$$X_P = X_P^{(1)}$$

$$X_P = X_P^{(1)} + X_P^{(2)}$$

$$X_P = X_P^{(1)} + X_P^{(2)} + X_P^{(3)}.$$

Of course, it is possible to do something similar with other features of the solution, such as G or P; they were left out in order to help clarify the presentation. After j=n is reached, 3220 passes to 3245, and the results are returned. Also, at 3245 it is possible for additional computations to be made, and then returned. Which features are computed incrementally at 3265 and which are computed at the end at 3245 is at the discretion of the user. However, M may not be computed incrementally. The total set of available features in this embodiment is $\{X_p, X_h, X, G, P, M, A'\}$; from this the "feature set" may be chosen.

Figure 32:
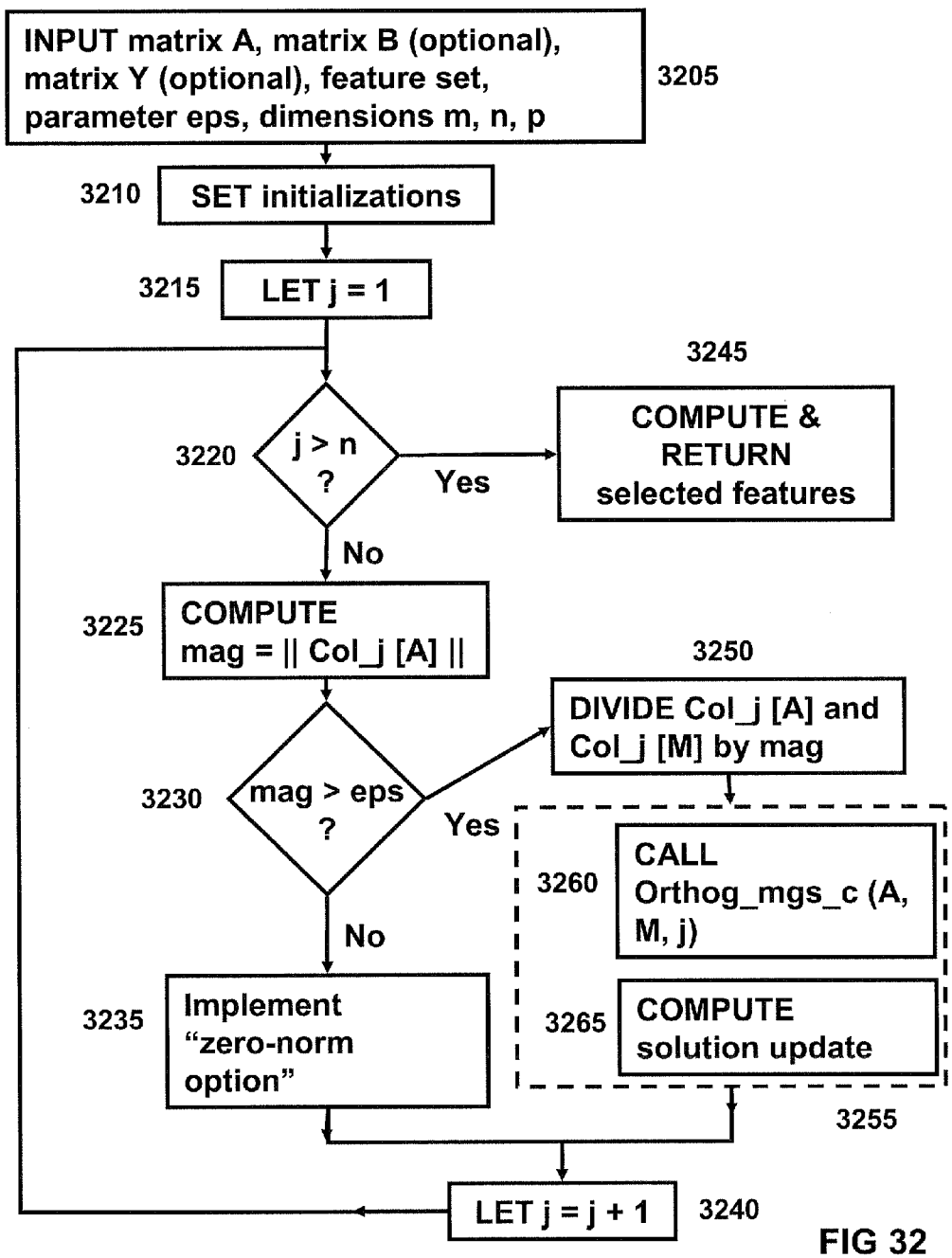
FIG. 32 illustrates a flowchart for a second embodiment, in which an orthogonalization step and a solution update are done concurrently in accordance with an embodiment of the present invention.

Such an elegant means of performing an online solution of AX=B is not known to already exist. Also, this embodiment highlights the fact that when parallelizing an algorithm, it can be an inappropriate limitation to demand that some calculations be done sequentially. Indeed, any order is acceptable, so long as it computes the variables as specified by the formulae. Also, an extension of this embodiment could instead work concurrently on blocks of columns, rather than individual columns (as shown in FIG. 32).

The flowchart (FIG. 32) may be illustrated using the same data as used previously. The updates to $X_p$ are the following $$X_P^{(1)} = \begin{bmatrix} 1-i/5 & -3/5-i \\ 0 & 0 \\ 0 & 0 \end{bmatrix},$$

$$X_P^{(2)} = \begin{bmatrix} -1/6+i/5 & 3/5+i/2 \\ i/3 & 1 \\ 0 & 0 \end{bmatrix}, X_P^{(3)} = \begin{bmatrix} 0 & 0 \\ 0 & 0 \\ 0 & 0 \end{bmatrix}.$$

The final value for $X_p$ (i.e., $X_P^{(1)}+X_P^{(2)}+X_P^{(3)}$), as well as all other quantities, are the same as found by the first embodiment.

Embodiment #3

Figure 33:
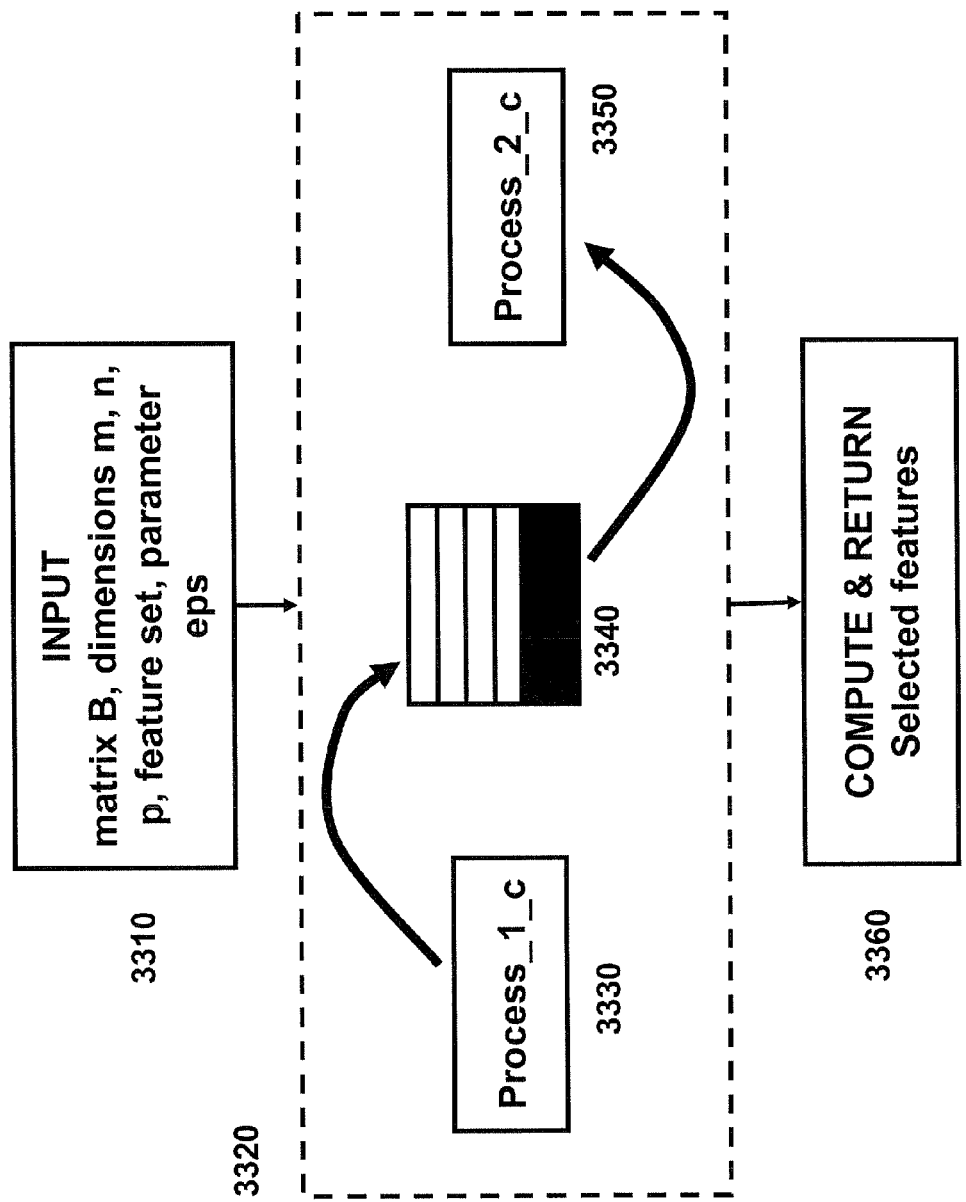
FIG. 33 shows a large-scale flowchart for a third embodiment, which is an "online" algorithm that processes data as it arrives in accordance with an embodiment of the present invention.
Figure 34:
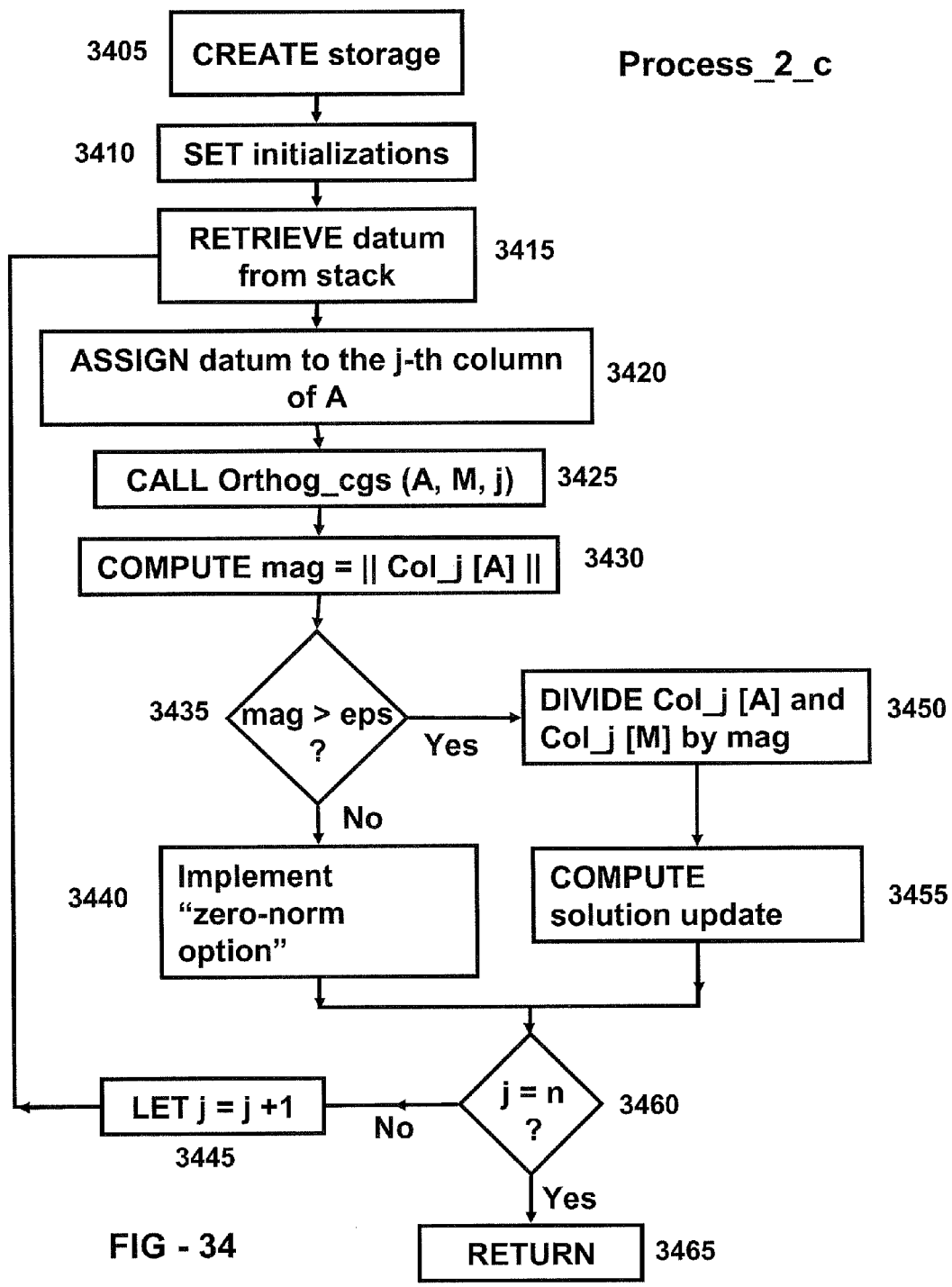
FIG. 34 shows a detailed flowchart corresponding to Process 2_c in accordance with an embodiment of the present invention.

This third embodiment (see FIGS. 33, 34) solves AX=B in a real-time case (i.e., online, as the data arrives). An ideal application for this algorithm is one in which the columns of A become available on a relatively slow time scale. This could happen, for example, if the computer is input/output-limited, if it takes a long time to compute the columns of A, or if it takes a long time to compute the solution relative to the time required to access the columns of A in one or more memory modules. The solution can be incrementally updated as subsets of one or more columns of A become available to the processors(s). The availability of the columns may be limited by many factors, such as the columns of A being moved into memory at a relatively slow pace, or the columns of A being transferred from one or more memory modules to one or more processor modules at a rate that is slow relative to the processing/computation speed. The current embodiment begins at 3310 with the user inputting the matrix B, the dimensions m, n, and p, the feature set, and the parameter eps. At 3320, there are two processes which may run concurrently: 3330 and 3350. The first process (3330) is responsible for creating and/or transferring the data onto the stack (3340), from where it is accessed by the second process (3350). For this embodiment, each datum produced by 3330 corresponds to the numbers in one of the n columns of A. Process 3340 may be conveniently implemented as a first-in first-out stack, although other data structures are possible. Process 3350 is shown in expanded detail in FIG. 34. It begins at 3405 by creating storage for the matrix A. The details of creating storage for other quantities, such as $X_p$, are suppressed. At 3410, certain initializations are done, such as setting j=1, M=$I_n$, and $X_p$=0 (if $X_p$ is being computed online). The next step is 3415, which is the start of a loop structure (over j). Step 3415 accesses data from 3340, when it is available; if data is not available, 3415 waits. This situation is common in threading/signaling applications, the details of which should be well-known to the practitioner and are therefore not further explained. When a datum has been retrieved by 3415, it is assigned as the j-th column of A in 3420. The steps from 3425 to 3460 have basically already been seen in the function $COP_2$ (A, M). One difference lies at step 3455, in which the solution is computed in an incremental way. After n columns of data have been retrieved by 3350 from 3340, the control step 3460 will pass to 3465. This will cause 3320 to exit and pass to 3360. At this point any computations that were not completed in 3455 may be done. Following this the program is complete.

This program is described as "online" because the computations (i.e., 3425 through 3460) are done concurrently or nearly concurrently with the data production process (3330). In fact, following the arrival of the last datum at 3340, there is very little work left to be done by 3350. Observe that in the other ("offline") algorithms, the total time involved is the time for the data to become available plus the time to solve AX=B. However, in this online case, the total time can be reduced, approximately, to only the time for the data to arrive. There are real-world examples where the delay due to the data availability is large enough for this to occur. In such circumstances, the extra time needed to solve AX=B is essentially zero with this algorithm. So with respect to this measure, this algorithm essentially cannot be improved upon. As another point of contrast, it is not feasible to similarly adapt the QR or LU methods to online versions, since both require full matrices at the outset in order to solve the triangular systems of equations (with back-substitution).

The total set of available features in this embodiment is $\{X_p, X_h, X, G, P, M, A'\}$; from this the "feature set" may be chosen. All may be computed incrementally at 3455 (as explained previously) except for M. Variations in addition to this are to concurrently compute multiple features within 3455. Another variation is to place 3425 and 3455 into separate, concurrent processes (as alluded to earlier). Still another variation is for 3350 to retrieve data from 3340 in blocks of columns, and operate on them concurrently; currently the columns are retrieved individually. These variations illustrate how this algorithm offers a rich set of possibilities for parallelization on modern computers.

In the following, the embodiment is used to process the same example data as used previously. In the expressions below, the "input data" for the columns of A are from the newly acquired datum that was retrieved by 3350 from 3340. Double-hyphens in a matrix mean that no data has yet been retrieved for those entries. Also, the "intermediate results" are how A and $X_p$ appear following the j-th update at 3455. After j=3, the updates are complete, and A may now be identified with A'.

j=1
input data:

$$Col_1[A] = \begin{pmatrix} 0 \\ 2i \\ 4i \end{pmatrix}$$

intermediate results:

$$A = \begin{bmatrix} 0 & -- & -- \\ i/\sqrt{5} & -- & -- \\ 2i/\sqrt{5} & -- & -- \end{bmatrix}, X_P = \begin{bmatrix} 1-i/5 & -3/5-i \\ 0 & 0 \\ 0 & 0 \end{bmatrix} \quad j=2$$

input data:

$$Col_2[A] = \begin{pmatrix} -3i \\ 1 \\ 2-3i \end{pmatrix}$$

intermediate results:

$$A = \begin{bmatrix} 0 & -i\sqrt{5/6} & -- \\ i/\sqrt{5} & (2i/5)\sqrt{5/6} & -- \\ 2i/\sqrt{5} & (-i/5)\sqrt{5/6} & -- \end{bmatrix}, X_P = \begin{bmatrix} 5/6 & -i/2 \\ i/3 & 1 \\ 0 & 0 \end{bmatrix} j=3$$

input data:

$$Col_3[A] = \begin{pmatrix} 0 \\ -1 \\ -2 \end{pmatrix}$$

intermediate results:

$$A = \begin{bmatrix} 0 & -i\sqrt{5/6} & 0 \\ i/\sqrt{5} & (2i/5)\sqrt{5/6} & 0 \\ 2i/\sqrt{5} & (-i/5)\sqrt{5/6} & 0 \end{bmatrix}, X_P = \begin{bmatrix} 5/6 & -i/2 \\ i/3 & 1 \\ 0 & 0 \end{bmatrix}.$$

Note that the update for j=3 has no effect; this is because the third column is linearly dependent on the first two.

Row Operations for Row Echelon Form

The algorithm to be described may be used to solve a consistent system of linear equations Ax=b for the vector x. It is based on the repeated application of row operations on Ax=b by applying the matrices $M_k$ (k=1, 2, 3, . . . ) from the left; this produces $$(\ldots M_2 M_1) Ax = (\ldots M_2 M_1) b$$

The $M_k$ are chosen so as to reduce A to row echelon form; the result is named A', where A'=MA and M=( . . . $M_2 M_1$). On the right side of the equation, the $M_k$ are not applied to b but rather are accumulated as a pre-factor. Thus, the original equation now appears as A' x=Mb. If the matrix A has rank r, then the algorithm will cause the bottom m-r rows of A' to be zero. Also, if the system of equations are consistent, the last m-r entries of the product Mb will be zero as well; this may be used as a test for consistency. The next step is to compute the product of M times b, and then solve the set of equations A' x=Mb; at this point the equations may be solved via back-substitution. This process yields a basis set for the null space of A, which will be denoted herein as N. Note that the matrices $M_k$ may be thought of as elementary matrices, although they need not be. What is of importance here is the end result they achieve. One way to efficiently accumulate M is to begin with M initialized as an m×m identity matrix. Then, the row operations may be applied to the augmented matrix [A|M]. Still another way is to store the entries for M in the unused locations in A (as they become available during the row operations). Finally, the equation A' x=Mb results independently of whether one explicitly constructs the $M_k$, or just implements their effect by directly applying row operations to A and $I_m$.

If one is later presented with an additional b, it is possible to reuse A' and M to again solve for x; this is a tremendous savings when faced with that situation. Also, in practice it is often convenient to proceed by performing these computations on the augmented matrix [A|$I_m$], which then leads to the result [A'|M]. A variation on this approach is to additionally perform elementary column operations to achieve full pivoting, rather than just the partial pivoting described above. Finally, this may be easily generalized to the case AX=B. There are existing algorithms which have some common features with the new algorithm, and will be discussed next. In contrast to this new algorithm, in Gaussian Elimination (GE) the row operations are applied directly to b, rather than accumulated as the factor M. The result is A' x=b', which can then be solved by back-substitution (b' is numerically equal to Mb). However, if one later tries to obtain a solution for a new b, this algorithm will have to be re-run from the beginning. Unlike the new algorithm, it is not possible to re-use any of the results from the initial computation. Also, note that both may be implemented in terms of augmented matrices, although it is not essential.

In the Gauss-Jordan (GJ) algorithm, the row operations are continued past what they achieve in GE, so that now A' is in a reduced row echelon form. The resulting equation is again A' x=b'. As described, it is less efficient than GE at solving Ax=b. However, if A is square, then it may be used to form a matrix inverse. In this case one transforms the augmented matrix [A|I] to [I|$A^{-1}$]. The LU algorithm begins with a factorization such as A=LU, where L(U) is a lower (upper) triangular matrix. Thus Ax=b becomes LUx=b, which can then be solved by two successive back-substitutions (i.e., first solve Ly=b for y, and then Ux=y for x). Although this algorithm proceeds very differently from GE, it has some underlying theoretical similarities with it, and thus the new method as well. However, it remains a distinct algorithm, as can be seen from its functionality. Like the new algorithm and unlike GE, the LU method can re-use some of its computations when solving Ax=b for a new b. But a difference between LU and the new method is that LU requires two solutions of triangular equations, while the new method requires only one (plus a matrix-vector multiply). This means the new method will perform more efficiently when it is used on modern, high-performance computers. Such machines are particularly efficient at computing matrix/vector computations, as their software is optimized for a distributed architecture; they frequently implement BLAS or PBLAS. Another feature of note is that when the new algorithm produces A' x=Mb, it may, under some circumstances, be considered as Ux=$L^{-1}$b, with the same definition of L and U. Thus with this new algorithm, the same factors of A appear, but in a more useful form. Another difference with the LU method is that the new algorithm is more versatile, as it can easily and elegantly handle A that are rectangular and/or rank-deficient. Extensions of LU for such cases are known as LSP factorizations, and are circuitous algorithms by comparison. Their added level of difficulty is expected to be problematic, as implementing the algorithms on modern parallel machines involve their own level of complexity. These differences reveal that the new algorithm is better able to solve Ax=b for multiple b and general A on high-performance computers.

The new algorithm should not be perceived as the most general version; a number of variations and simple extensions are possible, and they should be considered as being equivalent (by someone skilled in this field). For example, the new algorithm may be implemented with or without row and column permutations, just as they are in the variations of the LU method. However, as with the other elimination methods, row permutations (e.g., partial pivoting) leads to better stability, and so are normally implemented. A more general version of this variation is to allow for other operations on A (and b) during the solution process; an example is pre-conditioning on A. Another variation is that the new algorithm could be easily modified to solve AX=B rather than Ax=b; it was for reasons of clarity in exposition that the latter was chosen. Still another variation is that the algorithm could be modified to explicitly compute an analogous LU factorization (for general A), as well as compute the rank of A and check for near rank-degeneracy. Finally, one might consider computing Ax=b twice (to improve the solution quality), and in so doing overlap portions of the first and second iteration of solving Ax=b.

Figure 35:
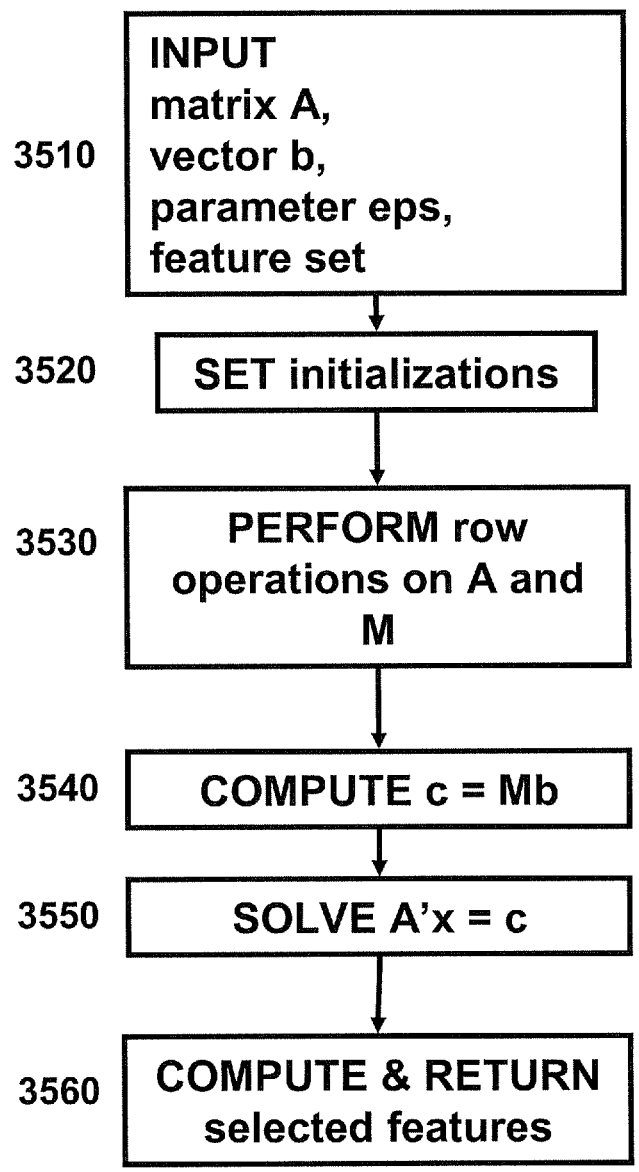
FIG. 35 illustrates a flowchart for an algorithm in which the main steps are executed sequentially in accordance with an embodiment of the present invention.
Figure 36:
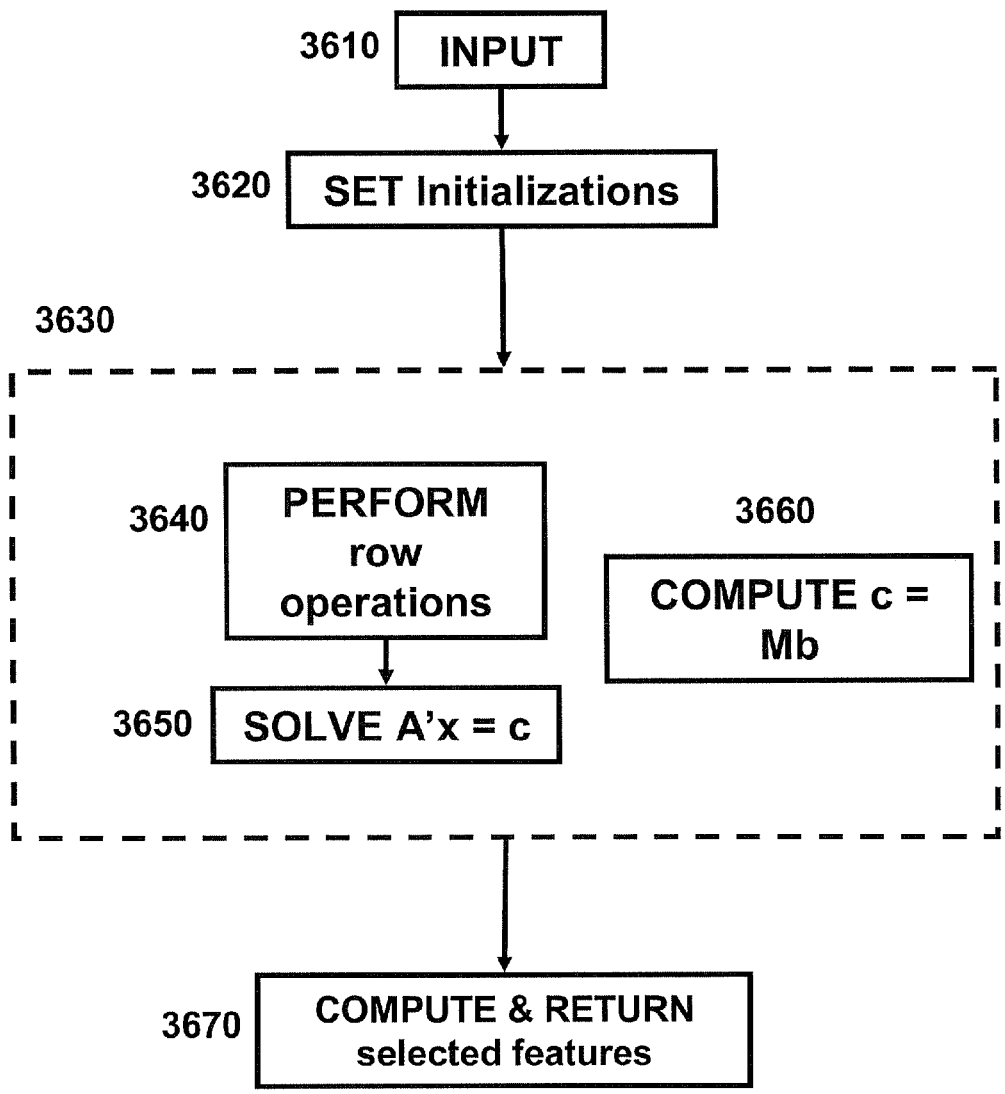
FIG. 36 illustrates a flowchart for an algorithm in which a computation Mb is performed concurrently with other steps of the algorithm in accordance with an embodiment of the present invention.
Figure 37:
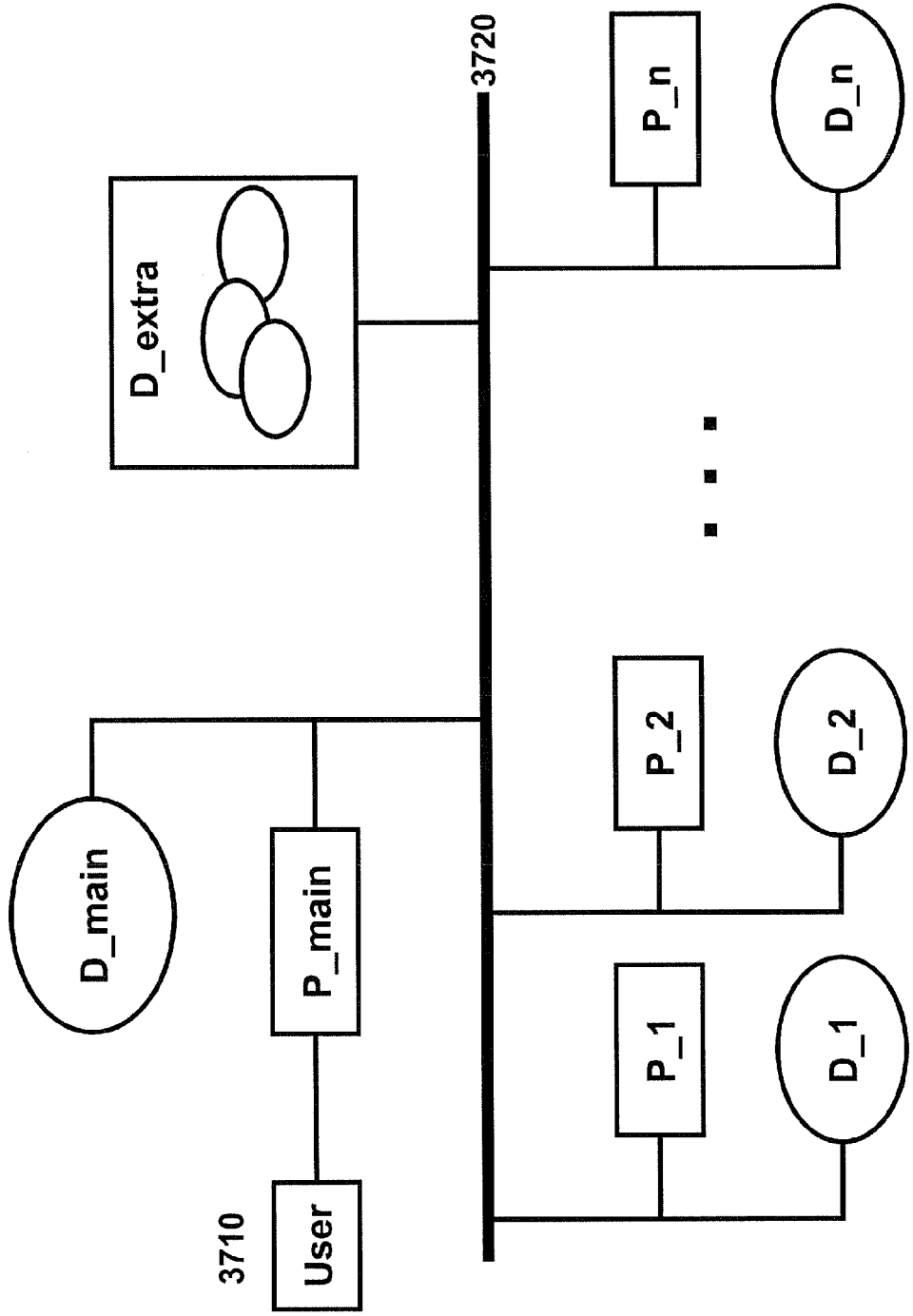
FIG. 37 shows an exemplary architecture that is meant to display a shared address space, with distributed memory and processors, in accordance with an embodiment of the present invention.

In formulating the above algorithm into a flow chart, attention will be paid not just to its variations but also to the order in which the steps are done: i.e., serially or in parallel. If it is implemented on a traditional, serial computer, it would appear as in FIG. 35. At 3510 all the appropriate input is entered—the data as well as user input. At 3520 initializations are performed, such as creating storage and initializing variables. The next step, 3530, includes applying the row operations to A and M. At this point one effectively has derived the equations A' x=Mb. At 3540 the multiplication between M and b is made and stored in the vector c. Next, at 3550, the equation A' x=c is solved. Since it is in a standard form, any of the usual serial or parallel methods may be used, such as those based on back-substitution. Finally, at 3560 the features of the solution selected by the user are computed and/or returned to him/her. While FIG. 35 shows the algorithm in a serial format, it is not necessary; it is possible to perform various parts in parallel. The most obvious one is to concurrently compute c=Mb during steps 3530 and 3550; this new version is depicted in FIG. 36. Steps 3610, 3620, and 3670 are the same as the steps 3510, 3520, and 3560, respectively. The main difference is with 3630, in which 3660 is done concurrently with the processes 3640 and 3650; observe though that 3640 should precede 3650. Examples of this concurrency will be given in a second embodiment, in which 3660 is done concurrently with 3640 (cf. 4130). In a third embodiment, step 3660 is performed concurrently with 3650 (cf. 4240). In the embodiments to follow, a greater amount of detail will be given. Also note that within 3530 or 3640 the operations on A and M may be performed concurrently. The algorithm under discussion is intended to be used within computer software/hardware as a program. There are not any notable restrictions as to what kind of hardware or computer architecture is appropriate. For purposes of illustrative example only, an exemplary architecture is given in FIG. 37. It is meant to display a shared address space, with distributed memory and processors. In this example, communication is achieved via a bus (3720); it is also common to do so with message passing. Other interconnection topologies are also possible.

The processing elements are $P_{main}$ and $P_1$ through P. Each element includes a processor, registers, cache, memory, etc. $P_{main}$ is the main processor, and it is here that the program is launched by the user (3710). The permanent storage for the data (e.g., databases) is represented by $D_{main}$, $D_{extra}$, and $D_1$ through $D_n$. This is where the data for the matrices A and B are stored, as well as the output data M, G, etc. The input/output subsystems are not explicitly shown, and are taken to be built into the hardware.

Figure 38:
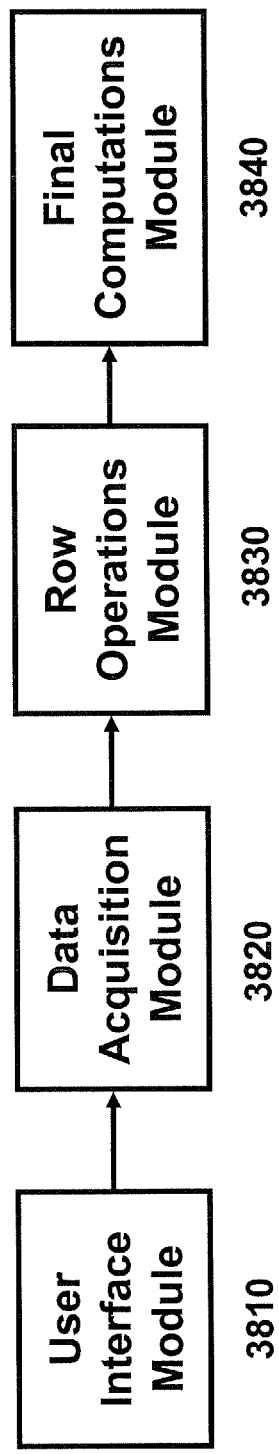
FIG. 38 depicts modules of a program that utilize an algorithm in which the modules are executed sequentially in accordance with an embodiment of the present invention.

The main parts of this program are depicted in FIG. 38. It begins with the "user interface module" (3810), which interacts with both user and program. This module is responsible for accepting parameter specifications from the user and launching the program. Following that, control in the program is passed to the "data acquisition module" (3820). This module is responsible for retrieving the data set specified in the user interface 3810 and loading it into local memory (in each processing element) or local storage. If all the data cannot fit into memory, data can be moved between memory and storage during the program. Following this, the data is in local memory/storage and ready to be used. The program then passes control to the "row operations module" (3830), which performs the bulk of the computations. In relation to FIG. 35, the steps 3530 and 3540 are performed here. When this module has completed, the stored data that had represented A will now represent that for A'. Also, the storage for the identity matrix that was created in 3810 will now represent the data for M, and the product c=Mb will have been formed as well. The next major step is the "final computation module" (3840). This section of the program is responsible for solving the equation A' x=c and computing the features specified at the outset (e.g., the particular solution, or a basis for the null space). It is equivalent to 3550 and 3560 from FIG. 35. When this module completes, the program terminates.

As a further example, the above modules may be discussed in the context of one of the applications discussed earlier-that of ranking web pages on the Internet; this is of paramount importance for an internet search engine. This situation may be modeled as a Markov process, in which the governing equation is Tx=x. The j-th component of the n dimensional vector x is the probability to be at the "j-th web page", and the (i,j)-th component of T represents the probability the user will go to page #i, starting from page #j. Without getting into the details of this application, it suffices to know that T may be determined by statistical data, and that one is interested in computing x. As mentioned above in the applications section, this is equivalent to solving Ax=b upon identifying $A=T-I_n$, and b=0. This scenario makes M irrelevant and so M will be ignored. With respect to the modules, the user would select to compute the null space projection operator P in 3810, since this leads directly to $x_h$ ($x_P$ is zero). Thus the "feature set" includes P. The data would be pulled in by 3820 and brought into local memory/storage. If T had been stored, then it could be converted to $T-I_n$ at this point. In 3830 the row operations would be done on $T-I_n$, causing $A=T-I_n$ to be in row echelon form (as described earlier); the result of this is A'. The module 3840 contains the final computations of the features selected by the user. Finally, this example is only representative. There are many more to choose from.

Figure 39:
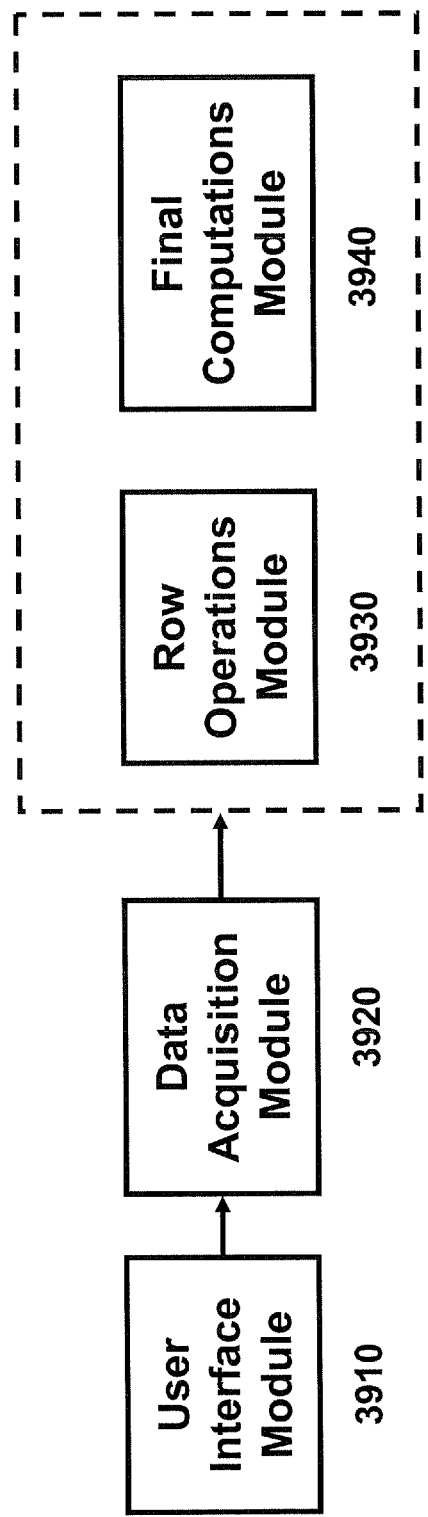
FIG. 39 shows modules of a program that utilize an algorithm in which certain modules are executed concurrently and others are done sequentially in accordance with an embodiment of the present invention.

In certain embodiments, implementations may use concurrent processing in the execution of some of the modules. As FIG. 38 is given, the system gives no special consideration to this possibility. However, for example, in an embodiment, part of the row operations (3830) and part of the final computations (3840) can be done concurrently. FIG. 39 illustrates that modules 3930 and 3940 can be computed concurrently.

Exemplary Embodiments

Next, several applications that are based on the above formulae and ideas will be presented. In each, the set of available features is $\{x_p, x_h, x, M, A', N\}$; from this the "feature set" may be chosen. Depending on circumstances, a user may only be interested in a subset of features, which is defined as the "feature set". The user should specify this at the beginning of each algorithm. Also, the dimensions of the matrices (i.e., m, n, and p) are taken to be global parameters, and do not need to be explicitly passed in function calls. Finally, these are not all the embodiments that are possible. They should not be viewed as limitations, but rather as examples.

Embodiment #1

Figure 40:
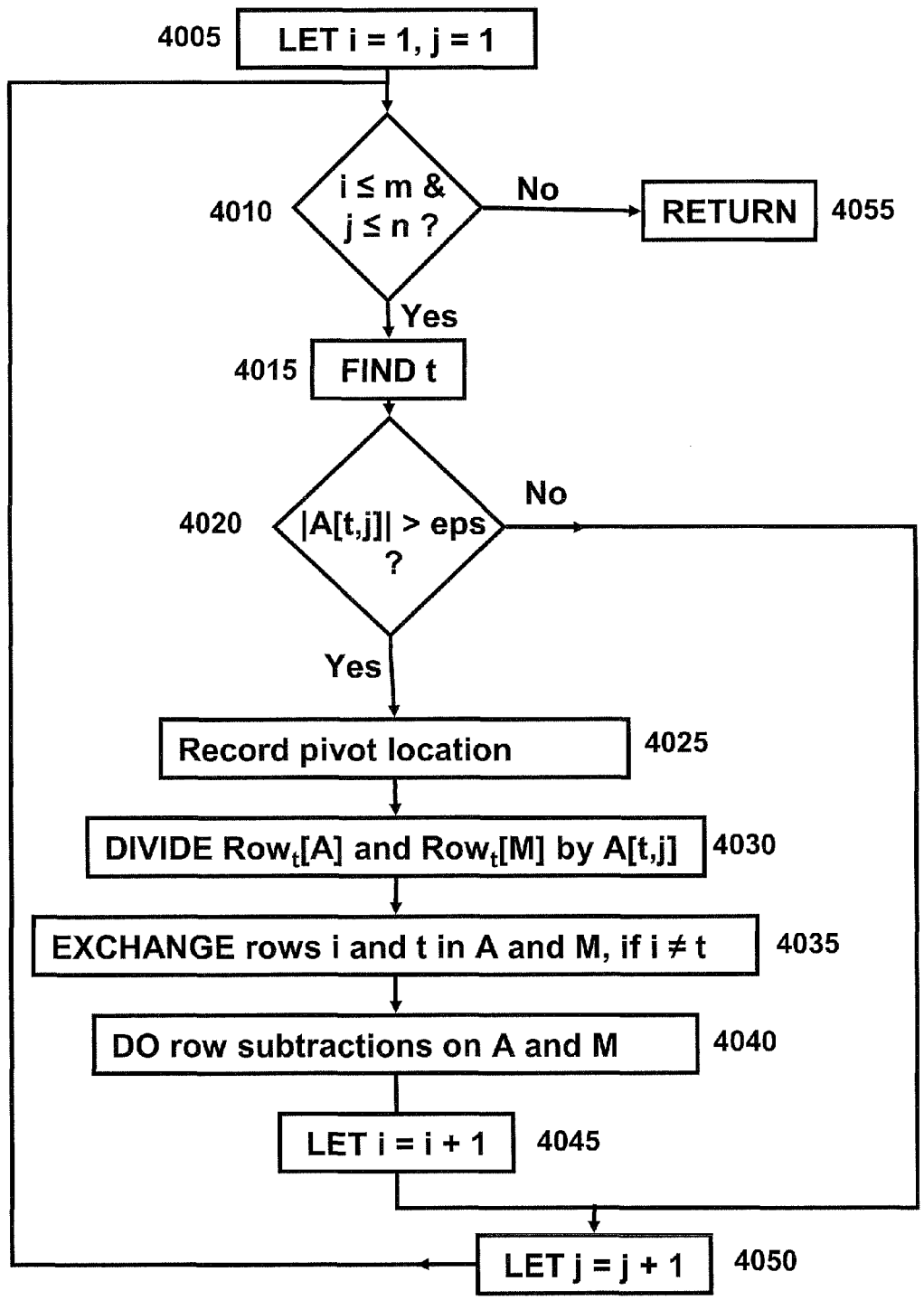
FIG. 40 shows a detailed example of steps involved in an algorithm in accordance with an embodiment of the present invention.

An application of this first embodiment is to solve a consistent system of linear equations for general A and for possibly multiple instances of b. The flowchart for this embodiment is essentially FIG. 35, but some additional words are useful. In 3520, the storage that is created could, for example, be for M, x, N, and arrays for pivot locations. Also, the initialization that is done at 3520 could be for the number of pivots, for example. The row operations that were done in 3530 are shown in more detail in FIG. 40, in which partial pivoting is used. The variable t in 4015 denotes the value of i for which $|a_{ij}|$ is largest; this determines the pivot point for the j-th column. Note that while the row operations are decided on by the content in A (cf. 4015, 4020), the operations themselves are applied to both A and M (cf. 4030, 4035, 4040). These operations are the usual ones, consisting of linear transformations on the row vectors of A and M. Also, 3540 may be efficiently implemented on a modern computer, since it includes a matrix/vector operation. Finally, an extension of this embodiment could instead work on blocks of rows concurrently; the flowchart in FIG. 40 only operates on individual rows concurrently.

This embodiment may be illustrated using the following data:

$$A = \begin{bmatrix} 0 & -3i & 0 \\ 2i & 1 & -1 \\ 4i & 2-3i & -2 \end{bmatrix}, b = \begin{bmatrix} 1 \\ 2i \\ 1+4i \end{bmatrix}.$$

Also, M is initialized as a 3×3 identity matrix in 3520. Following the operations performed in 3530, A and M become $$A' = \begin{bmatrix} 1 & -3/4-i/2 & i/2 \\ 0 & 1 & 0 \\ 0 & 0 & 0 \end{bmatrix}, M = \begin{bmatrix} 0 & 0 & -i/4 \\ i/3 & 0 & 0 \\ 1/2 & 1 & -1/2 \end{bmatrix}.$$

If they were included in the feature set (specified in 3510) the particular and homogenous solution would be computed as $$x_p = \begin{bmatrix} 5/6 \\ i/3 \\ 0 \end{bmatrix}, x_h = d\begin{bmatrix} -1/2 \\ 0 \\ 1 \end{bmatrix}.$$

where d is an arbitrary complex number. The choice of the size of eps depends on many practical issues. However, if the above example were implemented with a precision of 15 decimal digits, it would suffice to take eps=$10^{-10}$. This value for eps may be used in the other embodiments as well.

Embodiment #2

Figure 41:
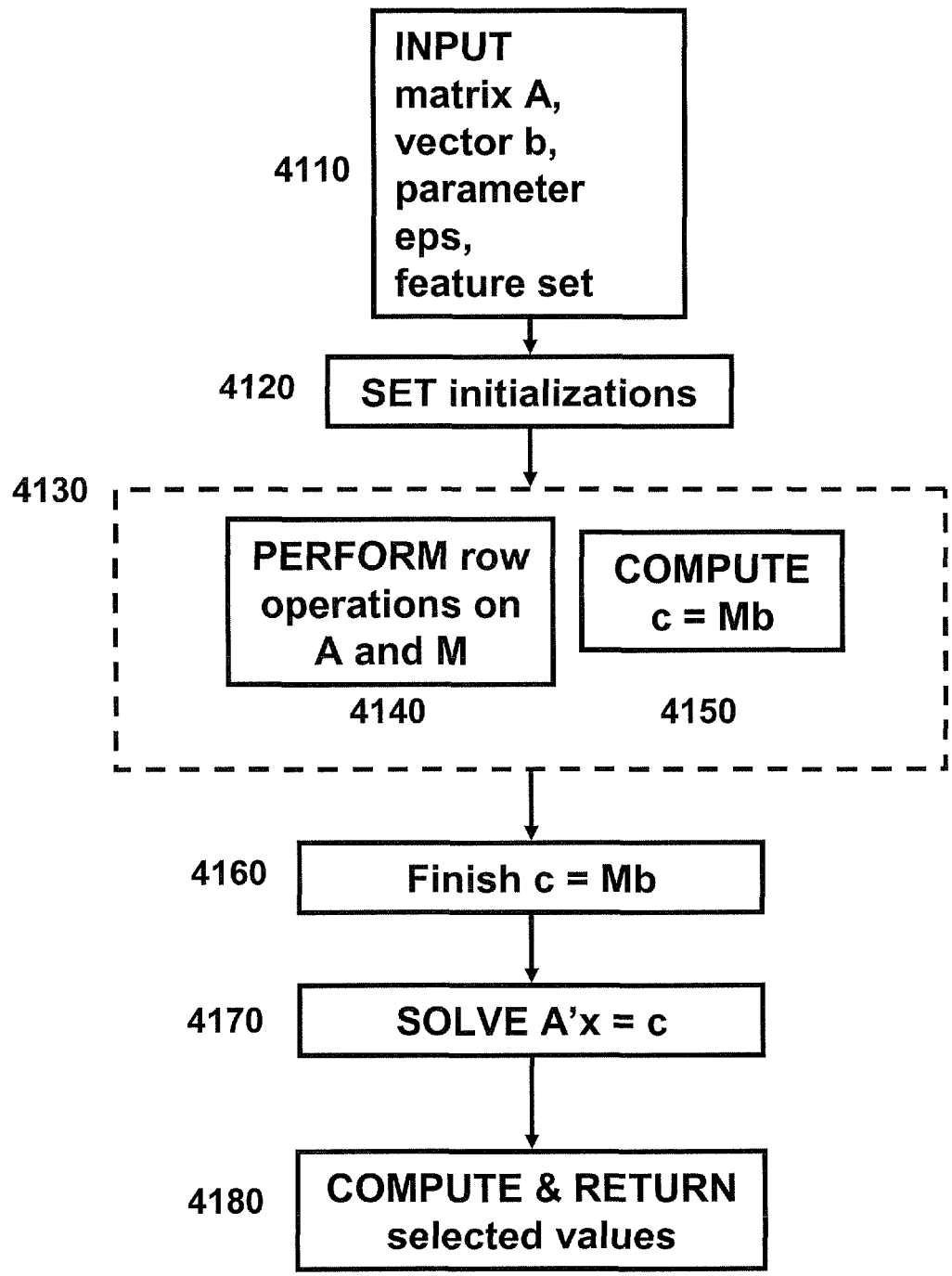
FIG. 41 illustrates a flowchart for a second embodiment, in which Mb is computed concurrently with row operations on A and M in accordance with an embodiment of the present invention.

This second embodiment is a specific case of the flowchart given in FIG. 36, in which 3640 and 3660 are computed concurrently. The algorithm begins at 4110 with the user supplying A; the dimensions m, n, and p; the feature set; and eps. At 4120, initializations are done, such as setting M equal to an m×m identity matrix ($I_m$), creating storage for the array c, and initializing variables and arrays that will track the locations of the pivot points. At 4130, two processes are executed concurrently: the row operations on A and M at 4140, and the computation of Mb at 4150. While 4140 is working on the i-th row of A, 4150 is working on the (i−1)-st row of M. Thus 4140 and 4150 operate essentially concurrently; a single remaining step in the computation of Mb is done at 4160. Note that there are other ways to overlap 4140 and 4150. Next, at 4170, the system of equations represented by A' x=c are solved; this part is standard since A' is in row echelon form. At 4180, the features selected by the user of the algorithm are computed and returned. Finally, an extension of this embodiment could instead work on blocks of rows concurrently; the flowchart in FIG. 41 operates on individual rows concurrently.

Embodiment #3

Figure 42:
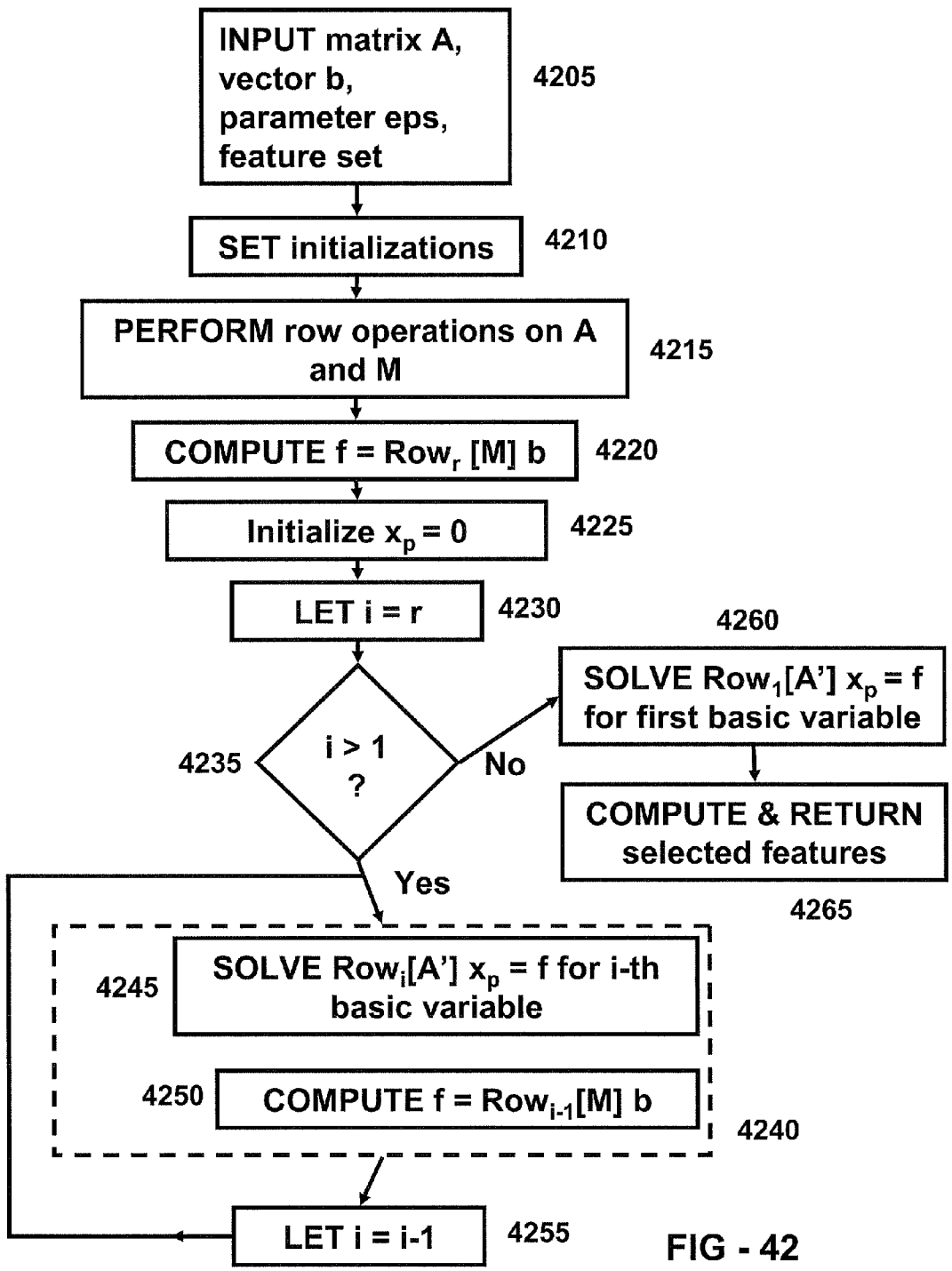
FIG. 42 illustrates a flowchart for a third embodiment, in which c=Mb is computed concurrently with solving A'x=c in accordance with an embodiment of the present invention.

This third embodiment is a specific case of the flowchart given in FIG. 36, in which 3650 and 3660 are computed concurrently. The first two steps, 4205 and 4210, are the same as 3810 and 3820, and so will not be discussed here. At 4215, the row operations on A and M are performed, as have been discussed for 3530 or 3640; it is here that the rank (r) of A is revealed as the number of nonzero rows in A'. The remaining steps, with the exception of 4265, include computing c=Mb and solving A' x=c. At 4220, a preparatory step for 4240 is performed; note that since b is a column vector, f is a scalar. The main loop begins at 4230 at i=r, the last nonzero row of A'. In this loop, two steps are computed concurrently: the (I−1)-st row of Mb (4250), and the i-th basic variable of the particular solution $x_p$ (4245). In other words, computing c=Mb and solving A' x=c are overlapped. Once the control structure (4235, 4255) has finished decrementing from r to 1, it passes to 4260 where the remaining basic variable for $x_p$ is computed. After this the features specified by the user are computed and/or returned at 4265. Finally, an extension of this embodiment could instead work on blocks of rows concurrently; the flowchart in FIG. 42 provides an illustration of operation on individual rows concurrently.

The previous aspects and embodiments have used matrix-based computations, which as discussed earlier are ideally computed in a parallel environment. As discussed earlier, this has the advantage of reducing power consumption and memory traffic, thereby allowing the overall computation to proceed more quickly and efficiently.

One or more of the components of the systems and/or steps of the methods described above may be implemented alone or in combination in hardware, firmware, and/or as a set of instructions in software, for example. Certain embodiments may be provided as a set of instructions residing on a computer-readable medium, such as a memory, hard disk, DVD, or CD, for execution on a general purpose computer or other processing device.

Certain embodiments of the present invention may omit one or more of these steps and/or perform the steps in a different order than the order listed. For example, some steps may not be performed in certain embodiments of the present invention. As a further example, certain steps may be performed in a different temporal order, including simultaneously, than listed above.

Thus, certain embodiments provide a technical effect of improved solution of systems of linear equations. Certain embodiments use row and/or column orthonormalization procedures to solve systems of linear equations in concurrent computing environments.

Several embodiments are described above with reference to drawings. These drawings illustrate certain details of specific embodiments that implement the systems and methods and programs of the present invention. However, describing the invention with drawings should not be construed as imposing on the invention any limitations associated with features shown in the drawings. The present invention contemplates methods, systems and program products on any machine-readable media for accomplishing its operations. As noted above, the embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the invention are described in the general context of method steps which may be implemented in one embodiment by a program product including machine-executable instructions, such as program code, for example in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represents examples of corresponding acts for implementing the functions described in such steps.

An exemplary system for implementing the overall system or portions of the invention might include a general purpose computing device in the form of a computer, including a processing unit, a system memory, and a system bus or network communication channel that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. The computer may be a parallel processing computer, for example.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

Those skilled in the art will appreciate that the embodiments disclosed herein may be applied to the formation of any processing system for solving systems of linear equations. Certain features of the embodiments of the claimed subject matter have been illustrated as described herein; however, many modifications, substitutions, changes and equivalents will now occur to those skilled in the art. Additionally, while several functional blocks and relations between them have been described in detail, it is contemplated by those of skill in the art that several of the operations may be performed without the use of the others, or additional functions or relationships between functions may be established and still be in accordance with the claimed subject matter. It is, therefore, to be understood that the appended claims are intended to cover all such modifications and changes as fall within the true spirit of the embodiments of the claimed subject matter.

The invention claimed is:

1. A system for reducing memory traffic and power consumption in a processing environment by efficiently solving a consistent set of linear equations represented by AX=B, said system comprising:
   one or more memory modules, wherein said one or more memory modules store the matrices A and B; and
   one or more processor modules, wherein said one or more processor modules:
   a) transform the rows of augmented matrix [A|B] to form [A'|B'], such that the rows of A' are zero, effectively zero, or part of an orthonormal set, and form one or more solution features, including at least one of:
   i) a particular solution formed as (A')*B', and ii) a null space projection operator formed as $I_n-(A')^*A'$;

b) transform the rows of augmented matrix $[A|I_m]$ to form $[A'|M]$, such that the rows of A' are zero, effectively zero, or part of an orthonormal set, and form one or more solution features, including at least one of:

i) a generalized inverse G formed as $(A^*)M$, ii) a particular solution formed as $(A')^*MB$ or GB, and iii) a null space projection operator formed as $I_n-(A')^*A'$ or $I_n-GA$; or c) transform the rows of augmented matrix $[A|B|I_m]$ to form $[A'|B'|M]$, such that the rows of A' are zero, effectively zero, or part of an orthonormal set; and form one or more solution features, including at least one of:

i) a generalized inverse G formed as $(A')^*M$, ii) a particular solution formed as $(A')^*B'$, $(A')^*MB$ or GB, and iii) a null space projection operator formed as $I_n-(A')^*A'$ or $I_n-GA$.

2. The system of claim 1, wherein the one or more memory modules and the one or more processor modules are arranged as part of a parallel computing architecture.

3. The system of claim 1, wherein the one or more processor modules comprise at least one of:
a) two or more processor modules;
b) one or more multi-core processors;
c) one or more many-core processors;
d) one or more redundant functional units;
e) one or more vector processors;
one or more superscalar processors; and
g) one or more processor modules that use instruction-level parallelism.

4. The system of claim 1, wherein the one or more processor modules concurrently perform at least some computational steps involved in transforming the rows, forming the one or more solution features, or both.

5. The system of claim 1 in an "online" computing environment,
wherein the matrix A comprises a first plurality of subsets of one or more rows,
wherein the matrix B comprises a second plurality of subsets of one or more rows, and
wherein the one or more processor modules form at least one of the one or more solution features by incrementally updating at least one intermediate solution feature as each corresponding subset of the first and second plurality of subsets becomes available.

6. The system of claim 5, wherein the one or more memory modules and the one or more processor modules are arranged as part of a parallel computing architecture.

7. The system of claim 5, wherein the one or more processor modules comprise at least one of:
a) two or more processor modules;
b) one or more multi-core processors;
c) one or more many-core processors;
d) one or more redundant functional units;
e) one or more vector processors;
f) one or more superscalar processors; and
g) one or more processor modules that use instruction-level parallelism.

8. The system of claim 1, wherein the matrix A represents a Jacobian of transformation between a position referenced to an articulated structure and one or more joint parameters corresponding to said articulated structure, wherein the matrix B represents a desired change in said position, and wherein at least one of the one or more solution features represents a change in said one or more joint parameters.

9. The system of claim 8, wherein the articulated structure comprises one of:
a) a computer-animated articulated structure in a virtual space; and
b) a physical articulated structure.

10. A system for reducing memory traffic and power consumption in a processing environment by efficiently solving a set of linear equations represented by AX=B with an auxiliary matrix M initialized as $I_n$, said system comprising:
one or more memory modules, wherein said one or more memory modules store the matrices A, B and M; and
one or more processor modules, wherein said one or more processor modules use one or more direct methods of solving linear s stems of equations to:
a) transform the columns of A and M to effectively form $A'M^{-1}X=B$, such that the columns of A' are zero, effectively zero, or part of an orthonormal set; and
b) form one or more solution features, including at least one of
i) a generalized inverse G formed as $M(A')^*$,
ii) a particular solution formed as GB or $M(A')^*B$, and
iii) a null space projection operator formed as $I_n-GA$ or $I_n-M(A')^*A$.

11. The system of claim 10, wherein the one or more memory modules and the one or more processor modules are arranged as part of a parallel computing architecture.

12. The system of claim 10, wherein the one or more processor modules comprise at least one of:
a) two or more processor modules;
b) one or more multi-core processors;
c) one or more many-core processors;
d) one or more redundant functional units;
e) one or more vector processors;
f) one or more superscalar processors; and
g) one or more processor modules that use instruction-level parallelism.

13. The system of claim 10, wherein the one or more processor modules perform at least some computational steps concurrently.

14. The system of claim 10 in an "online" computing environment, wherein the matrix A comprises a plurality of subsets of one or more columns, and
wherein the one or more processor modules form at least one of the one or more solution features by incrementally updating at least one intermediate solution feature as each of the plurality of subsets becomes available.

15. The system of claim 14, wherein the one or more memory modules and the one or more processor modules are arranged as part of a parallel computing architecture.

16. The system of claim 14, wherein the one or more processor modules comprise at least one of:
a) two or more processor modules;
b) one or more multi-core processors;
c) one or more many-core processors;
d) one or more redundant functional units;
e) one or more vector processors;
f) one or more superscalar processors; and
g) one or more processor modules that use instruction-level parallelism.

17. The system of claim 10, wherein the matrix A represents a Jacobian of transformation between a position referenced to an articulated structure and one or more joint parameters corresponding to said articulated structure, wherein the matrix B represents a desired change in said position, and wherein at least one of the one or more solution features represents a change in said one or more joint parameters.

18. The system of claim 17, wherein the articulated structure comprises one of:
   a) a computer-animated articulated structure in a virtual space; and
   b) a physical articulated structure.

19. A system for reducing memory traffic and power consumption in a processing environment by efficiently solving a consistent set of linear equations represented by AX=B with an auxiliary matrix M initialized as $I_m$, said system comprising:
   one or more memory modules, wherein said one or more memory modules store the matrices A, B and M; and
   one or more processor modules, wherein said one or more processor modules use one or more direct methods of solving linear s stems of equations to:
      a) transform the rows of A and M to form A'X=MB, such that M reduces A to row echelon form; and
      b) form a solution by computing a matrix C=MB and solving A'X=C.

20. The system of claim 19, wherein the one or more memory modules and the one or more processor modules are arranged as part of a parallel computing architecture.

21. The system of claim 19, wherein the one or more processor modules comprise at least one of:
   a) two or more processor modules;
   b) one or more multi-core processors;
   c) one or more many-core processors;
   d) one or more redundant functional units;
   e) one or more vector processors;
   f) one or more superscalar processors; and
   g) one or more processor modules that use instruction-level parallelism.

* * * * *